（12） United States Patent
Itogawa et al.

(10) Patent No.: US 11,128,222 B2
(45) Date of Patent: Sep. 21, 2021

(54) DC/DC CONVERTER

(71) Applicant: Mitsubishi Electric Corporation, Chiyoda-ku (JP)

(72) Inventors: Yuki Itogawa, Chiyoda-ku (JP); Takeshi Amimoto, Chiyoda-ku (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/622,630

(22) PCT Filed: Mar. 29, 2018

(86) PCT No.: PCT/JP2018/013086
§ 371 (c)(1),
(2) Date: Dec. 13, 2019

(87) PCT Pub. No.: WO2019/038979
PCT Pub. Date: Feb. 28, 2019

(65) Prior Publication Data
US 2020/0274443 A1 Aug. 27, 2020

(30) Foreign Application Priority Data
Aug. 23, 2017 (JP) .............................. JP2017-159991

(51) Int. Cl.
H02M 3/335 (2006.01)
H02M 1/00 (2006.01)

(52) U.S. Cl.
CPC ... H02M 3/33584 (2013.01); H02M 3/33576 (2013.01); H02M 1/0058 (2021.05)

(58) Field of Classification Search
CPC ............................................. H02M 3/335–42
See application file for complete search history.

(56) References Cited
U.S. PATENT DOCUMENTS 6,067,237 A * 5/2000 Nguyen ............ H02M 3/33584
363/132
2002/0141216 A1* 10/2002 Ishihara ................... H02P 5/74
363/132
(Continued)

FOREIGN PATENT DOCUMENTS

CH 707 553 A2 8/2014
DE 112015004164 T5 6/2017
(Continued)

OTHER PUBLICATIONS

International Search Report dated May 29, 2018 in PCT/JP2018/013086 filed Mar. 29, 2018, 2 pages.
(Continued)

Primary Examiner — Peter M Novak
(74) Attorney, Agent, or Firm — Xsensus LLP

(57) ABSTRACT

A reactor has one end connected to a neutral point of a transformer and the other end connected to a primary-side power supply. The transformer has almost no effective flux linkage for zero-phase current and has a phase difference between the primary side and the secondary side. A first bridge circuit and a second bridge circuit are connected to both ends of the transformer, and electric power of the primary-side power supply is controlled by the duty ratio of the first bridge circuit. The switching pattern of the second bridge circuit is phase-shifted in the leading direction and the lagging direction with reference to the switching pattern of the first bridge circuit, thereby achieving control such that soft switching operation can be performed even when the voltage ratio between the primary-side power supply and the secondary-side power supply fluctuates and the amount of transmission power is reduced.

12 Claims, 48 Drawing Sheets

(56) References Cited

U.S. PATENT DOCUMENTS

| | | | |
|---|---|---|---|
| 2005/0258796 A1* | 11/2005 | Kusaka | B60L 50/40 |
| | | | 318/801 |
| 2009/0290389 A1 | 11/2009 | Ueno et al. | |
| 2012/0249100 A1* | 10/2012 | Pan | H02M 3/337 |
| | | | 323/271 |
| 2013/0147431 A1* | 6/2013 | Lim | B60W 10/26 |
| | | | 320/109 |
| 2014/0347767 A1 | 11/2014 | Nakamura et al. | |
| 2015/0295497 A1* | 10/2015 | Perreault | H02M 3/3376 |
| | | | 363/21.03 |
| 2016/0211758 A1 | 7/2016 | Uchihara et al. | |
| 2018/0063932 A1* | 3/2018 | Leibl | H02M 3/33569 |
| 2018/0198373 A1* | 7/2018 | Torrico-Bascope | H02M 3/337 |

FOREIGN PATENT DOCUMENTS

| | | |
|---|---|---|
| JP | 9-252576 A | 9/1997 |
| JP | 2005-110384 A | 4/2005 |
| JP | 2009-148107 A | 7/2009 |
| JP | 2010-4724 A | 1/2010 |
| JP | 2014-230460 A | 12/2014 |
| JP | 2015-27196 A | 2/2015 |
| JP | 2016-73121 A | 5/2016 |

OTHER PUBLICATIONS

Ax Ryu Sudo et al., "Improvement of Light-Load Efficiency of Three-Phase Dual Active Bridge Isolated Bidirectional DC/DC Converter by Employing Y-Δ Transformation", IEEJ Transactions on Industry Applications, vol. 133, No. 6, 2013, pp. 595-608.

N.H. Baars et al., "A Three-Level Three-Phase Dual Active Bridge DC-DC Converter with Star-Delta Connected Transformer", IEEE, 2016, 6 pages.

Sangwon Lee et al., "A Three-Phase Current-Fed Push-Pull Dc-Dc Converter With Active Clamp for Fuel Cell Applications", IEEE Transactions on Power Electronics, vol. 26, No. 8, Aug. 2011, pp. 2266-2277.

Awneesh K. Tripathi et al., "A Comparative Study of Three-Phase Dual Active Bridge Topologies and Their Suitability for D-Q Mode Control", IEEE Energy Conversion Congress and Exposition, 2012, pp. 1719-1724.

Rohit Suryadevara et al., "Three-Phase Current-Fed Soft-Switching DC-DC Converter", IEEE 26th International Symposium on Industrial Electronics, 2017, pp. 899-904.

German Office Action dated Feb. 3, 2021 in German Application No. 11 2018 004 721.0.

* cited by examiner

WINDING CONFIGURATION EXAMPLE WITH TOROIDAL CORES

WINDING CONFIGURATION EXAMPLE WITH TOROIDAL CORES

| MAIN OPERATION PHASE | | Ph.1 | Ph.2 | Ph.3 | Ph.4 | Ph.5 | Ph.6 | Ph.7 | Ph.8 |
|---|---|---|---|---|---|---|---|---|---|
| PRIMARY-SIDE BRIDGE CIRCUIT 10 | SW12 | OFF | ON | ON | OFF | OFF | OFF | ON | ON |
| | SW11 | ON | OFF | OFF | ON | ON | ON | OFF | OFF |
| | SW14 | OFF | OFF | ON | ON | ON | OFF | OFF | ON |
| | SW13 | ON | ON | OFF | OFF | OFF | ON | ON | OFF |
| | SW16 | OFF | OFF | OFF | OFF | ON | ON | ON | ON |
| | SW15 | ON | ON | ON | ON | OFF | OFF | OFF | OFF |

FIG.13

| MAIN OPERATION PHASE | | PH.1 | PH.2 | PH.3 | PH.4 | PH.5 | PH.6 | PH.7 | PH.8 | PH.9 | PH. 7-2 | PH. 2-3 | PH. 3-4 | PH. 4-5 | PH. 5-6 | PH. 6-7 |
|---|---|---|---|---|---|---|---|---|---|---|---|---|---|---|---|---|
| SECONDARY-SIDE BRIDGE CIRCUIT 20 | SW22 | OFF | ON | ON | OFF | OFF | OFF | OFF | ON | OFF | ON | ON | ON | OFF | OFF | OFF |
| | SW21 | OFF | OFF | OFF | OFF | ON | ON | OFF | OFF | ON | OFF | OFF | OFF | ON | ON | ON |
| | SW24 | OFF | OFF | OFF | ON | ON | OFF | OFF | OFF | ON | OFF | OFF | ON | ON | OFF | OFF |
| | SW23 | OFF | ON | OFF | OFF | OFF | OFF | ON | OFF | OFF | ON | ON | OFF | OFF | OFF | ON |
| | SW26 | OFF | OFF | OFF | OFF | OFF | ON | ON | ON | OFF | ON | OFF | OFF | OFF | ON | ON |
| | SW25 | OFF | OFF | ON | ON | OFF | OFF | OFF | OFF | ON | OFF | ON | ON | ON | OFF | OFF |

DC/DC CONVERTER

TECHNICAL FIELD

The present disclosure relates to a DC/DC converter and more specifically to power loss reduction in a DC/DC converter.

BACKGROUND ART

A DC/DC converter in which the coupling type of a transformer is the same on the primary side and the secondary side has conventionally been known. Such a DC/DC converter can reduce switching loss by soft switching technique (ZVS (Zero Voltage Switching) method) but has a problem in that the soft switching technique is unable to be applied in a low output region.

As a technique that solves this problem, PTL 1 discloses a DC/DC conversion circuit including an AC/DC conversion circuit, a transformer, and a DC/AC conversion circuit, in which the coupling types of the transformer are different on the primary-side circuit and the secondary-side circuit.

CITATION LIST

Patent Literature

PTL 1: Japanese Patent Laying-Open No. 2015-27196

SUMMARY OF INVENTION

Technical Problem

Unfortunately, in the conventional technique described in PTL 1, there is a limit to a voltage ratio between the primary-side power supply and the secondary-side power supply, and the application to a power supply whose voltage fluctuates, such as a storage battery, is difficult. The present invention is therefore aimed to provide a DC/DC converter capable of reducing power loss even when voltage fluctuates.

Solution to Problem

A DC/DC converter illustrated in the present disclosure includes a transformer having a neutral point at least in a primary-side winding, a first reactor connected between the neutral point and a primary-side power supply, a first bus pair configured with a first positive line and a first negative line, a storage unit connected between the first positive line and the first negative line, a first bridge circuit connected between the first bus pair and the primary-side winding, a second bus pair configured with a second positive line and a second negative line, and a second bridge circuit connected between a secondary-side winding of the transformer and the second bus pair. A secondary-side power supply is connected to the second bus pair.

Advantageous Effects of Invention

The present invention enables operation in a wider range of voltage ratio between the primary-side power supply and the secondary-side power supply, compared with conventional techniques. Accordingly, power loss can be reduced even when voltage fluctuates.

BRIEF DESCRIPTION OF DRAWINGS

FIG. 13 is a diagram illustrating the operating states of semiconductor devices in main operation phases in secondary-side bridge circuit 20.

DESCRIPTION OF EMBODIMENTS

Figure 1:
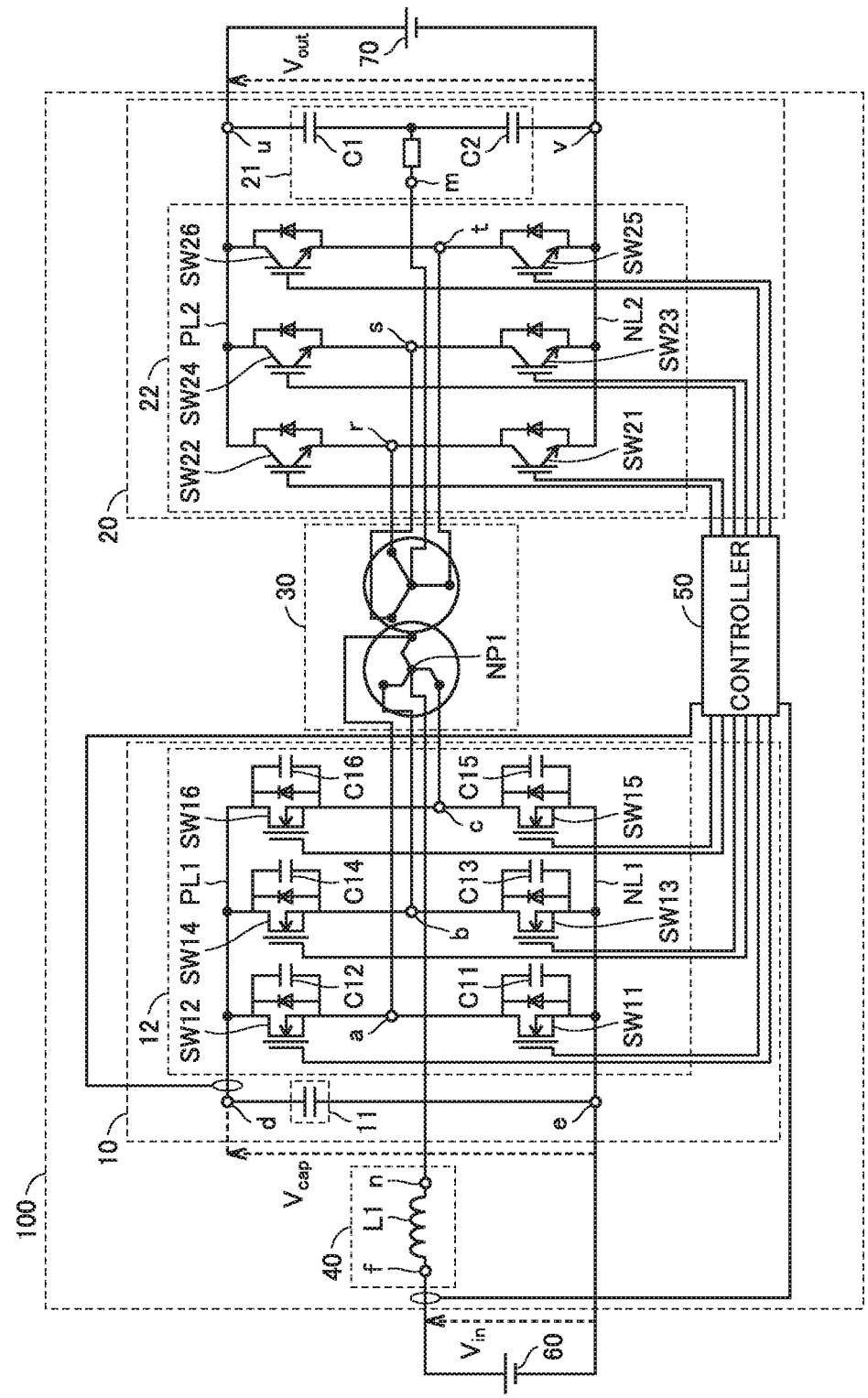
FIG. 1 is a main circuit configuration diagram of DC/DC converter 100 (zigzag-Y connection type) in a first embodiment.

Preferred embodiments of the present invention for carrying out the present invention will be described below with reference to the drawings. In the following embodiments, an ideal state is assumed in which voltage reduction in switching elements and diodes in the circuits, wiring resistance, and inductance, parasitic capacitance, and magnetizing inductance of the transformer are negligible. The same or corresponding parts are denoted by the same reference numerals in the following drawings and a description thereof will not be repeated. The description below provides only working examples and is not intended to limit modes of the present invention to the following embodiments.

First Embodiment (Description of Overall Configuration)

First of all, an overall configuration of a DC/DC converter in a first embodiment will be described. FIG. 1 is a main circuit configuration diagram of a DC/DC converter 100 in the present embodiment.

DC/DC converter 100 includes a primary-side bridge circuit 10, a secondary-side bridge circuit 20, a transformer 30, a reactor unit 40, and a controller 50. DC/DC converter 100 is connected between a direct-current primary-side power supply 60 and a direct-current secondary-side power supply 70.

In DC/DC converter 100 of the present embodiment, one end of reactor L1 is connected to a neutral point NP1 of transformer 30 having almost no effective flux linkage for zero-phase current when Clarke transformation is performed on current flowing through transformer 30, and the other end of reactor L1 is connected with primary-side power supply 60. Primary-side bridge circuit 10 and secondary-side bridge circuit 20 are connected to both ends of transformer 30, a storage unit 11 having a capacitor is connected to the buses (PL1, NL1) of primary-side bridge circuit 10, and secondary-side power supply 70 is connected to the buses (PL2, NL2) of secondary-side bridge circuit 20. DC/DC converter 100 is characterized in that it can adjust the ratio between voltage of primary-side power supply 60 and bus voltage of secondary-side bridge circuit 20 by adjusting the voltage ratio between primary-side power supply 60 and primary-side storage unit 11 by switching of primary-side bridge circuit 10.

One terminal f of reactor unit 40 is connected to the high voltage side of primary-side power supply 60. Low voltage-side terminal e of primary-side bridge circuit 10 is connected to the low voltage side of primary-side power supply 60. The other terminal n of reactor unit 40 is connected to neutral point NP1 of transformer 30.

Primary-side storage unit 11 is connected between low voltage-side terminal e and high voltage-side terminal d of primary-side bridge circuit 10. Primary-side storage unit 11 includes an energy storing element such as capacitor or battery and has the function as a voltage source.

High voltage-side terminal u of secondary-side bridge circuit 20 is connected to the high voltage side of secondary-side power supply 70. Low voltage-side terminal v of secondary-side bridge circuit 20 is connected to the low voltage side of secondary-side power supply 70.

Secondary-side storage unit 21 is connected to high voltage-side terminal u of secondary-side bridge circuit 20 and low voltage-side terminal v of secondary-side bridge circuit 20.

Secondary-side storage unit 21 includes an energy storing element such as capacitor or battery and has the function as a voltage source. Secondary-side storage unit 21 is connected to the secondary-side neutral point terminal of transformer 30 at connection point m.

Transformer 30 is a three-phase transformer, and primary-side bridge circuit 10 has a three-phase first bridge circuit 12. First bridge circuit 12 has six switching elements SW11, SW12, SW13, SW14, SW15, and SW16 and capacitors C11, C12, C13, C14, C15, and C16 connected in parallel with these switching elements, respectively. However, external capacitors C11, C12, C13, C14, C15, and C16 may be replaced by parasitic capacitances of the switching elements at equivalent positions in the circuit configuration.

In FIG. 1, the switching elements are depicted by the symbol of MOSFET (Metal-Oxide-Semiconductor Field-Effect Transistor) or IGBT (Insulated Gate Bipolar Transistor). However, the switching elements as depicted in the circuit diagram are not necessarily used. A variety of switching elements can be applied as desired, and not only silicon-based elements but also SiC-MOSFETs and GaN-HEMTs (High Electron Mobility Transistors) based on wideband gap semiconductor such as SiC and GaN may be used as switching elements.

At connection point a, the high voltage side of switching element SW11 and the low voltage side of switching element SW12 are connected. At connection point b, the high voltage side of switching element SW13 and the low voltage side of switching element SW14 are connected. At connection point c, the high voltage side of switching element SW15 and the low voltage side of switching element SW16 are connected.

Hereinafter, a set of two switches connected in series may be called a leg, and each of the switches may be called an arm, specifically, the high voltage-side switch may be called an upper arm and the low voltage-side switch may be called a lower arm with respect to the connection point.

First bridge circuit 12 is connected to the primary-side phase terminals of transformer 30 at connection point a, connection point b, and connection point c.

Secondary-side bridge circuit 20 has a three-phase second bridge circuit 22. Second bridge circuit 22 has six switching elements SW21, SW22, SW23, SW24, SW25, and SW26.

At connection point r, the high voltage side of switching element SW21 and the low voltage side of switching element SW22 are connected. At connection point s, the high voltage side of switching element SW23 and the low voltage side of switching element SW24 are connected. At connection point t, the high voltage side of switching element SW25 and the low voltage side of switching element SW26 are connected.

Second bridge circuit 22 is connected to the secondary-side phase terminals of transformer 30 at connection point r, connection point s, and connection point t.

The configuration of transformer 30 will now be described. FIG. 1 shows a case where transformer 30 is configured in the zigzag-Y connection type. Transformer 30 is configured such that zero-phase current when Clarke transformation ($\alpha\beta 0$ transformation) is performed on the phase currents on the primary side does not induce magnetic flux inside the core of the transformer, and has a phase difference between the primary side and the secondary side.

Figure 2:
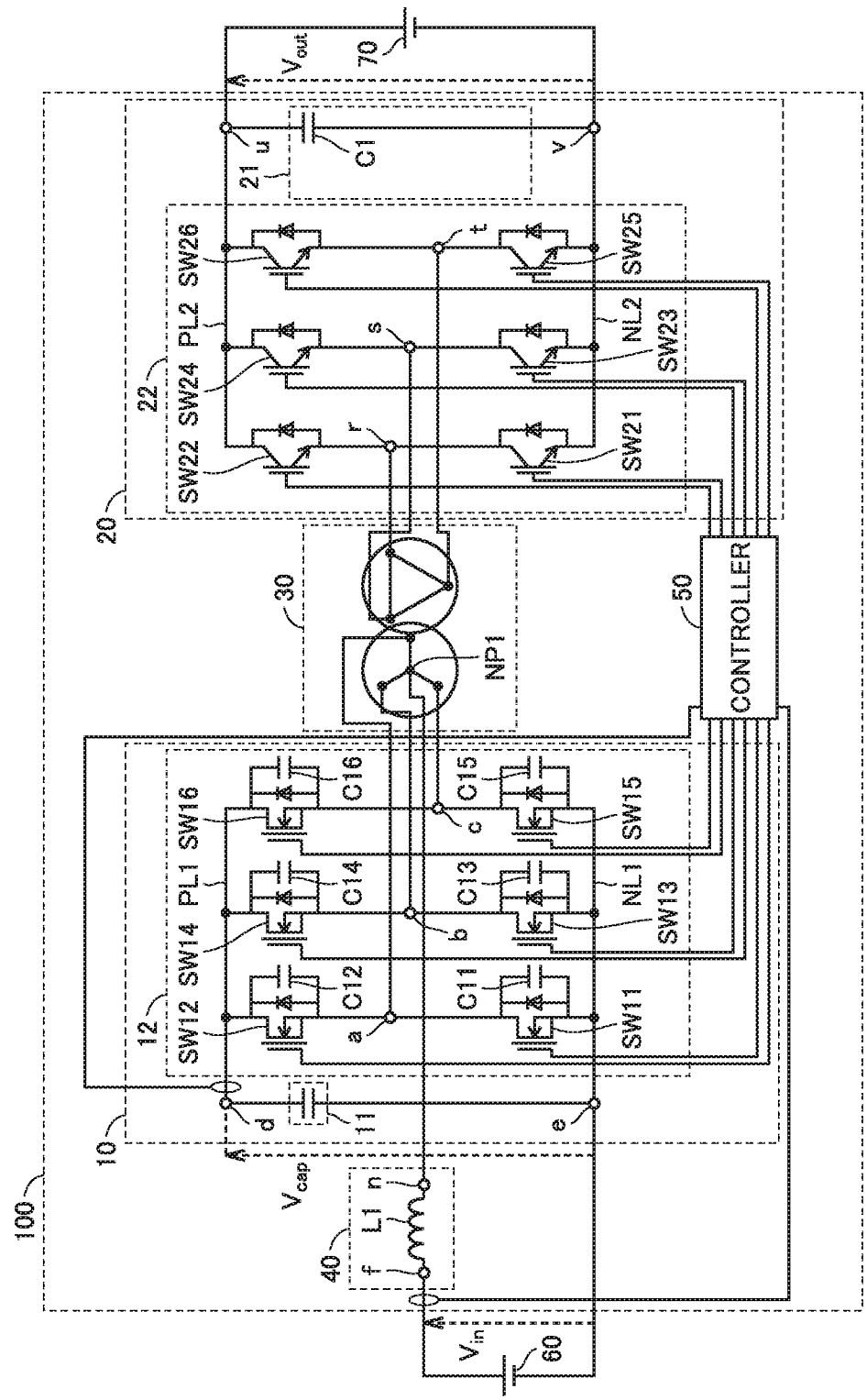
FIG. 2 is a main circuit configuration diagram of a first modification (Y-Δ connection type) of DC/DC converter 100.

FIG. 2 is a main circuit configuration diagram of a first modification of DC/DC converter 100 in the first embodiment. FIG. 1 shows a case where transformer 30 is configured in the zigzag-Y connection type, whereas FIG. 2 shows a circuit diagram in a case where transformer 30 is configured in the Y-$\Delta$ connection type. The other part of the configuration in the modification in FIG. 2 is similar to the DC/DC converter in FIG. 1 and a description is not repeated.

Figure 3:
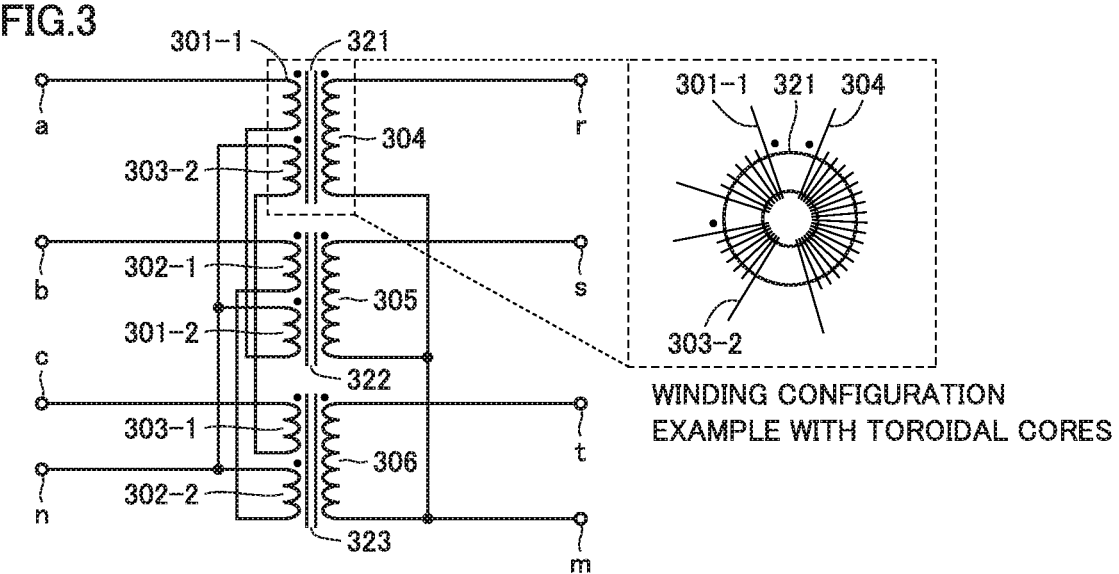
FIG. 3 is a diagram showing a configuration example of a three-phase transformer (zigzag-Y connection type) including a plurality of toroidal cores in combination.
Figure 4:
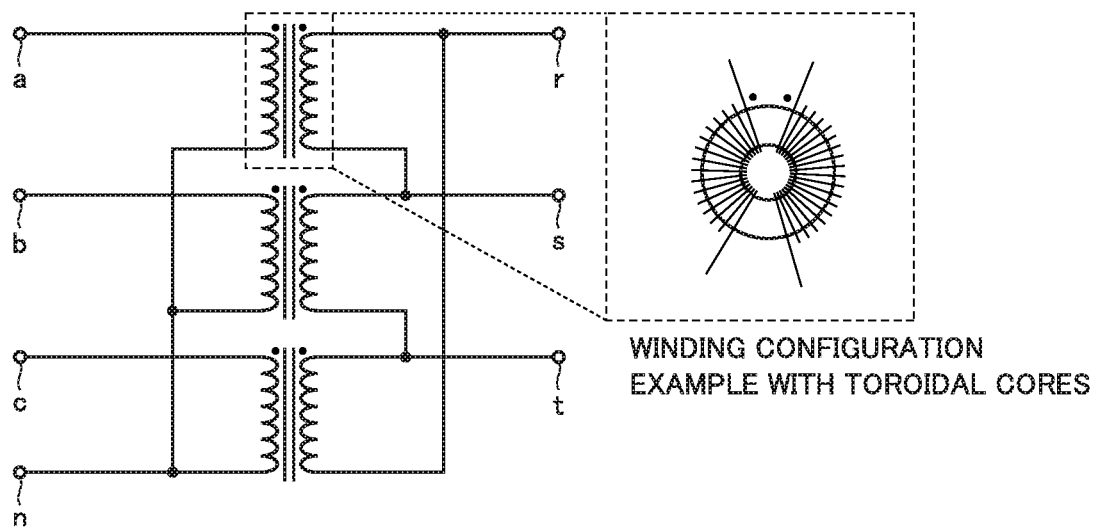
FIG. 4 is a diagram showing a configuration example of a three-phase transformer (Y-Δ connection type) including a plurality of toroidal cores in combination.
Figure 5:
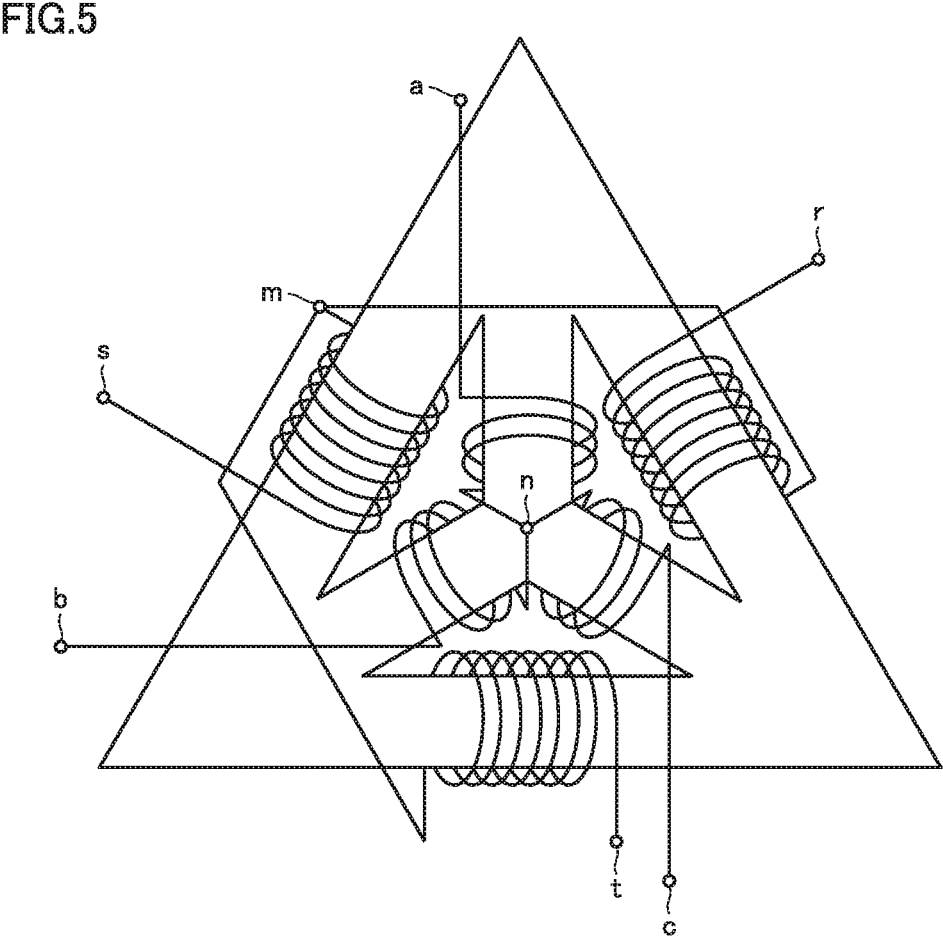
FIG. 5 is a diagram showing a configuration example of a three-phase transformer (Y-Y connection type) using a core with a symmetric magnetic circuit.
Figure 6:
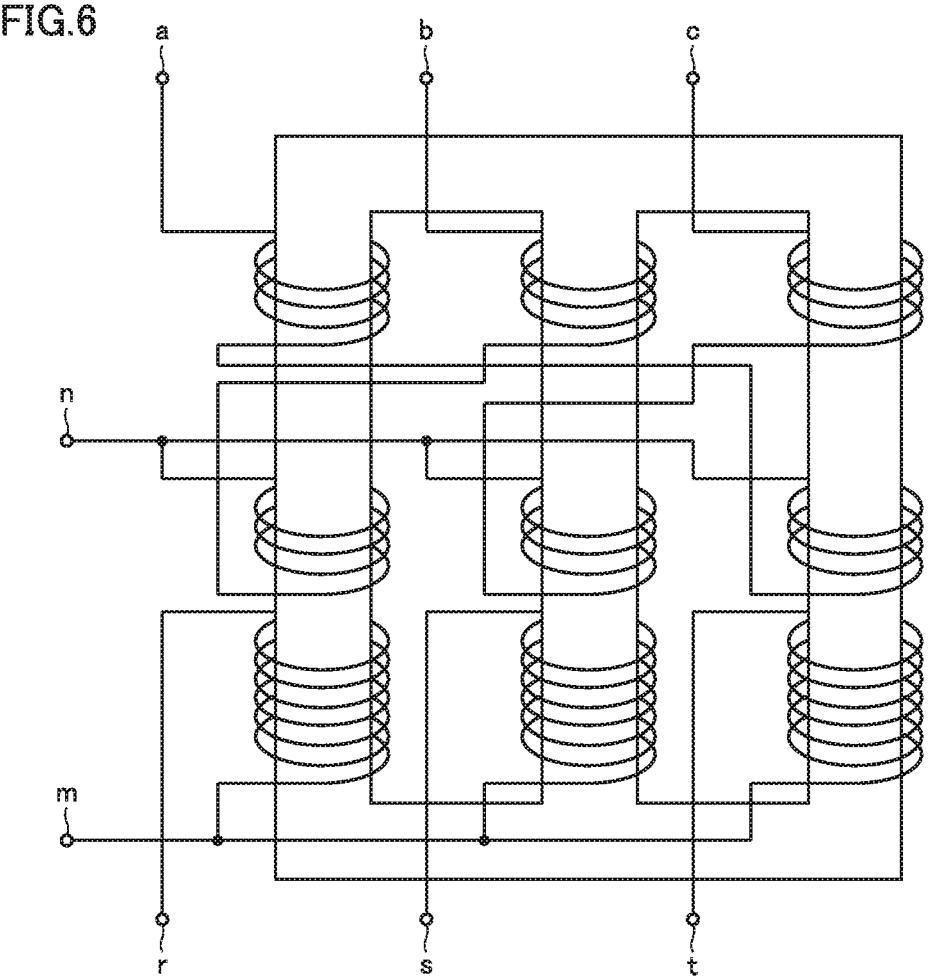
FIG. 6 is a diagram showing a configuration example of a three-phase transformer (zigzag-Y connection type) using a three-pillar-shaped core.
Figure 7:
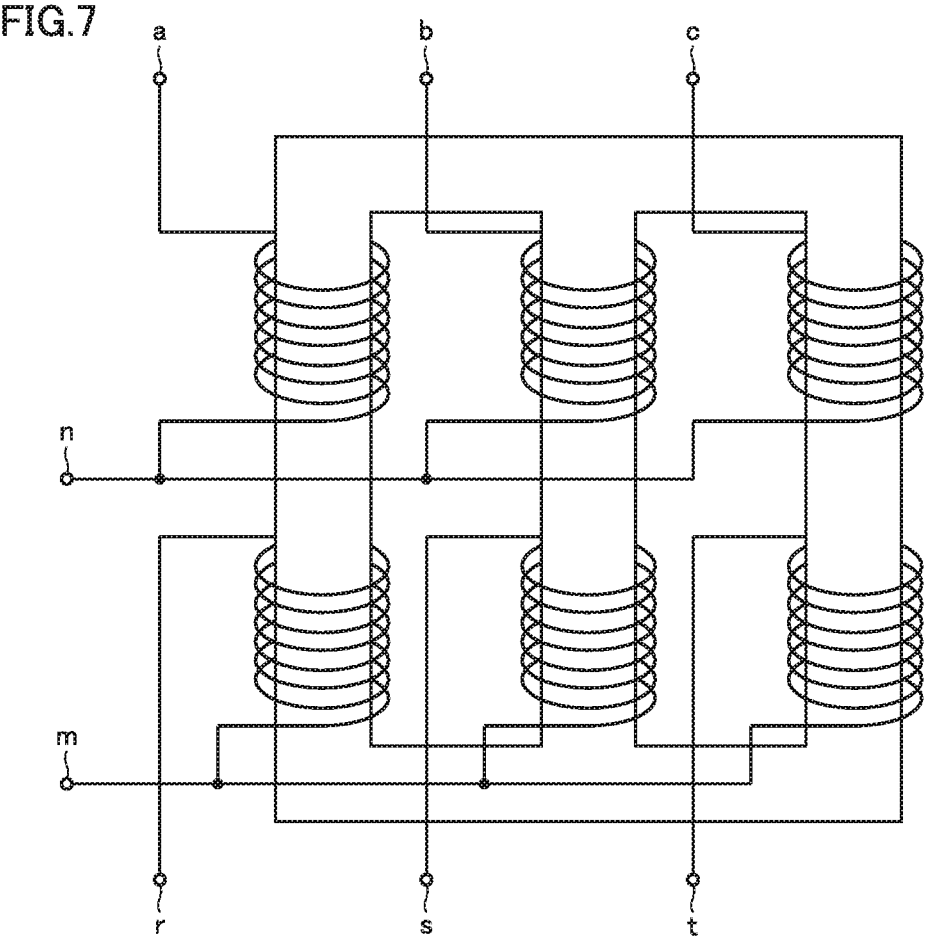
FIG. 7 is a diagram showing a configuration example of a three-phase transformer (Y-Δ connection type) using a three-pillar-shaped core.

The configuration of transformer 30 is susceptible to other modifications in addition to the configuration shown in FIG. 2. The configuration of a combination of a plurality of cores (toroidal cores) as shown in FIG. 3 or FIG. 4, the configuration using a core with a symmetric magnetic circuit as shown in FIG. 5, or the configuration implemented with a three-pillar-shaped core, such as a three-phase transformer with commercial frequency as illustrated in FIG. 6 or FIG. 7 may be employed. Connection points a, b, c, n, r, s, t in to F 4 to FIG. 7 respectively correspond to connection points a, b, c, n, r, s, t in FIG. 1 or FIG. 2.

When cores are magnetically coupled to each other, a symmetric configuration of a magnetic circuit as shown in FIG. 5 is desirable. Alternatively, as shown in FIG. 6 or FIG. 7, a three-pillar-shaped core such as a three-phase transformer with commercial frequency may be used to cancel magnetic flux produced by zero-phase current.

Specifically, as shown in FIG. 4, when the Y-$\Delta$ connection type using a plurality of cores is employed, zero-phase current flowing through the primary-side winding produces a magnetic field. However, the magnetic field produced by zero-phase current flowing through the primary-side winding usually induces circulating current in the secondary-side winding, and the magnetic field produced by circulating current flowing in the $\Delta$ connection of the secondary-side winding and the magnetic field produced by zero-phase current flowing through the primary-side winding are balanced, so that flux linkage produced by zero-phase current flowing through the primary-side winding is canceled.

As shown in FIG. 3 or FIG. 6, when a transformer is configured in the zigzag-Y connection type in which the primary-side winding is divided into plural parts, currents flowing through the primary-side winding can cancel magnetic flux and therefore zero-phase current does not induce current in the secondary-side winding, advantageously reducing copper loss. In the secondary-side winding, a neutral point is created, which is electrically connected to the neutral point of the secondary-side bus voltage, thereby suppressing common mode potential oscillation of the secondary-side winding.

As shown in FIG. 4 or FIG. 7, when a transformer is configured in the Y-Δ connection type, a two-winding transformer having a simple structure or an open-end connection three-phase transformer can be used. This configuration is advantageous in that design and manufacturing are easy. However, since circulating current flowing inside the Δ connection occurs in proportion to zero-phase current in the primary-side winding, copper loss increases and, in addition, there are disadvantages such as the possibility of causing biased magnetization due to voltage drop of winding resistance. When cores are magnetically coupled to configure a single core, induction of secondary-side winding current by zero-phase current in the primary-side winding does not always occur even in the Y-Δ configuration.

In order to suppress magnetic flux induced by zero-phase current of the primary-side terminal, a matching magnetic field may be induced on the magnetic path of a magnetic field produced in the core, or magnetic resistance may be equivalently increased by an open magnetic path to prevent magnetic flux. Both of these methods are examples of the method of preventing a magnetic field produced in the core by zero-phase current of the primary-side terminal from inducing magnetic flux, and any other configurations that achieve a similar function may be employed.

The method of cancelling magnetic flux produced by zero-phase current and the method of shifting a phase between the primary-side winding and the secondary-side winding have been long discussed commonly in the field of three-phase transformers with commercial frequency. According to the present embodiment, a circuit configuration including transformer 30, reactor unit 40, first bridge circuit 12, and second bridge circuit 22 as main components makes the most of the degree of freedom of current path of transformer 30.

Figure 8:
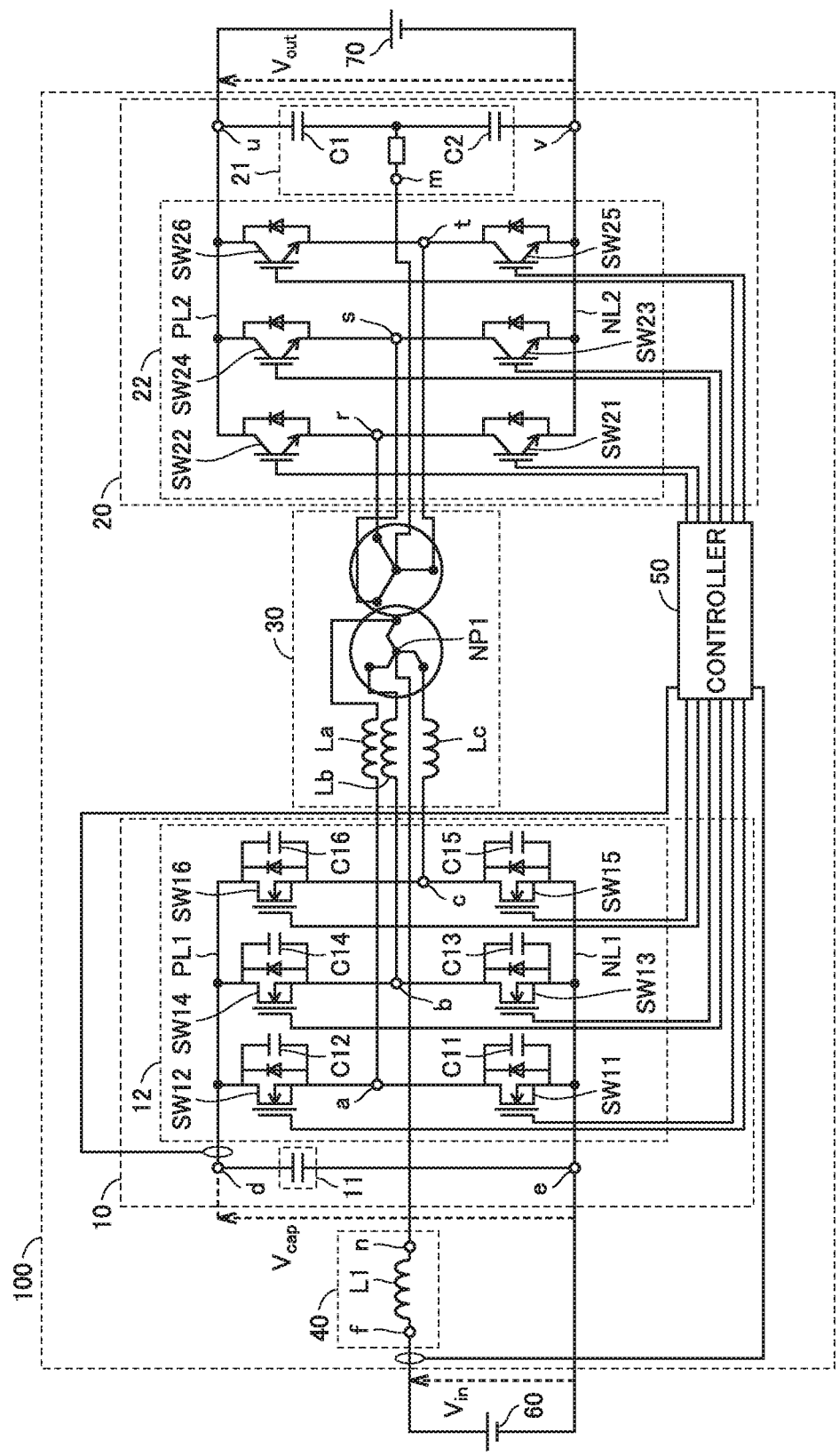
FIG. 8 is a main circuit configuration diagram of a second modification of DC/DC converter 100.
Figure 9:
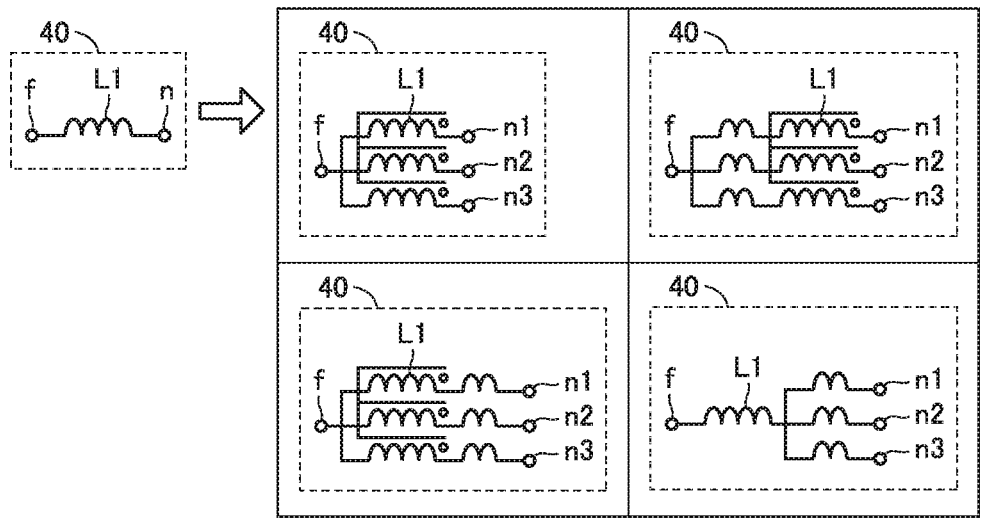
FIG. 9 is a diagram showing a modification of reactor unit 40.

FIG. 8 is a main circuit configuration diagram of a second modification of DC/DC converter 100. In the configuration shown in FIG. 8, reactors La, Lb, Lc supplementing a leakage inductance component of transformer 30 are respectively inserted between transformer 30 and connection points a, b, c in the primary-side circuit portion. Although not shown, reactors supplementing a leakage inductance component of transformer 30 may be inserted between transformer 30 and connection points r, s, t in the secondary-side circuit portion. Alternatively, three phase windings connected to neutral point NP1 of three-phase transformer 30 may be disconnected, and three individual terminals newly formed may be connected to terminals n1, n2, n3 of reactors modified separately as shown in FIG. 9. In such examples, equivalent modification may be made to transformer 30 and peripheral auxiliary elements in the electric circuit, magnetic circuit, or a combination of electric/magnetic circuits.

When magnetic flux produced by zero-phase current is canceled, the potential of terminal n connected to neutral point NP1 of transformer 30 is the average of potentials applied to connection point a, connection point b, and connection point c connected to the primary-side phase terminals of transformer 30, because of limitation in energy.

In practice, voltage caused by the leakage inductance component is present between the terminals of transformer 30, and the magnetic flux is not always canceled completely due to error in winding. Therefore, the potential of terminal n does not always agree with the average of potentials of connection point a, connection point b, and connection point c. In the following description, it is assumed that the potential of terminal n agrees with the average of potentials applied to connection point a, connection point b, and connection point c, for the sake of simplicity, although the present invention is not limited thereto.

(Description of Operation)

The operation of the DC/DC converter will now be described. The following description is premised on an ideal state with no variation in leakage inductance.

In an ideal state with no biased magnetization of the transformer, with no variation in leakage inductance, with no individual differences among switching elements, and with no variation in wiring impedance, the switching element of each phase of first bridge circuit 12 operates with the same duty ratio.

Figure 10:
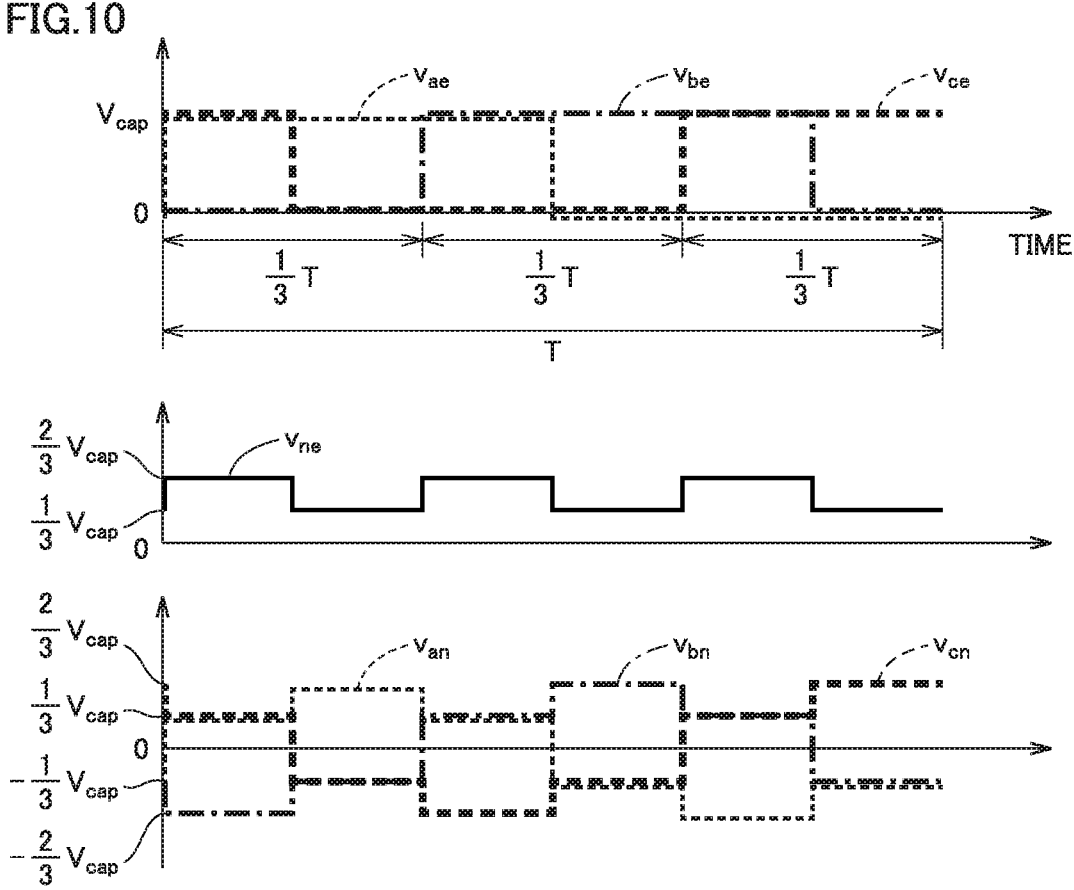
FIG. 10 is a waveform diagram showing an example of terminal-to-terminal voltage waveform of transformer 30 in FIG. 1.

FIG. 10 is a waveform diagram showing an example of terminal-to-terminal voltage waveform of transformer 30 in FIG. 1. In FIG. 10, voltages Vae, Vbe, Vce, Vne are potential differences of connection points a, b, c and terminal n, respectively, with reference to terminal e. Voltages Van, Vbn, Vcn are potential differences of connection points a, b, c, respectively, with reference to terminal n. Voltage Vcap is a potential difference of terminal d with reference to terminal e.

The timings when the phase legs of first bridge circuit 12 switch the switches are shifted by ⅓ of the switching period T, and voltages Vae, Vbe, Vce applied to connection point a, connection point b, connection point c have waveforms with phases shifted by 120°.

The operation of first bridge circuit 12 as described above is called multi-phase operation or carrier phase shift operation in a multi-parallel driven chopper circuit and commonly known.

In FIG. 10, the waveforms of the phases are phase-shifted by ⅓ of the switching period with reference to the rise time of voltages Vae, Vbe, Vce of the connection points of the phases. This is an example of phase shift methods, and the voltage fall time may be used as a reference, or the center of the upper arm ON time or the center of the lower arm ON time may be used as a reference.

In a common PWM (Pulse Width Modulation) method using triangular wave carrier, the phase of triangular wave carrier for generating a switching pattern is phase-shifted by 120° to implement a similar multiphase operation.

However, when leakage inductance or the number of turns of the transformer varies, a distortion that makes three phases asymmetric occurs in current that transmits electric power on the primary side and the secondary side, in a coordinate space when phase voltages and phase currents of transformer 30 undergo αβ0 transformation. In order to correct such a distortion of current, it is necessary to adjust voltage output from first bridge circuit 12 or second bridge circuit 22 or both. In this case, it is not always necessary to phase-shift the primary-side carrier by 120° but it may be preferable to adjust the phase shift amount for correction.

As shown in FIG. 10, when first bridge circuit 12 outputs a voltage phase-shifted by 120° to each connection point of transformer 30, the average value of voltages applied to connection point a, connection point b, and connection point c is output to neutral point NP1 of transformer 30, and rectangular wave voltage Vne with amplitude ⅓ and three times frequency is output to terminal n of reactor L1.

Since primary-side power supply 60 is connected to one terminal f of reactor unit 40 and neutral point NP1 of transformer 30 is connected to the other terminal n, the difference between power supply voltage Vin of primary-side power supply 60 and the average value of output voltage of first bridge circuit 12 is applied to reactor L1.

The duty ratio of each phase of first bridge circuit 12 is increased/reduced and adjusted by the same amount for all of three phases, whereby voltage applied to reactor L1 can be controlled irrespective of unbalanced voltage between phases responsible for biased magnetization of transformer 30.

In other words, current flowing through reactor L1 can be controlled by adjusting the average value of the phase duty ratios of first bridge circuit 12. That is, primary-side zero-phase current of transformer 30 connected to first bridge circuit 12 is determined by the average value of output duty ratios of the phases of first bridge circuit 12.

Ideally, zero-phase current can be controlled without causing biased magnetization only by controlling the average value of output duty ratios in first bridge circuit 12. However, when biased magnetization occurs in transformer 30 in practice for some reason, the biased magnetization phenomenon can be suppressed by changing the balance of duty ratios of the phases.

First bridge circuit 12 performs multiphase operation (carrier phase shift operation). Therefore, when the phase currents of transformer 30 flow to primary-side storage unit 11, a period of time in which current of only one of the a phase, the b phase, and the c phase flows exists at the time out of phase by 120° during one period of switching, or a period of time in which current of only one of the a phase, the b phase, and the c phase does not flow exists at the time out of phase by 120° during one period of switching.

Therefore, when current flowing through primary-side storage unit 11 is detected in controller 50, it is detected while the phase during one period of switching is shifted by 120°, whereby variation in phase currents of transformer 30 can be detected. That is, primary-side storage unit 11 is provided with a current detecting sensor to detect biased magnetization current of transformer 30.

As a matter of course, in addition to detection of all phase currents of the three-phase transformer, with detection points equal to or more than the number of degrees of freedom of current derived from Kirchhoffs current law, it is possible to detect biased magnetization current regardless of detection points and detection methods.

Figures 11, 12:
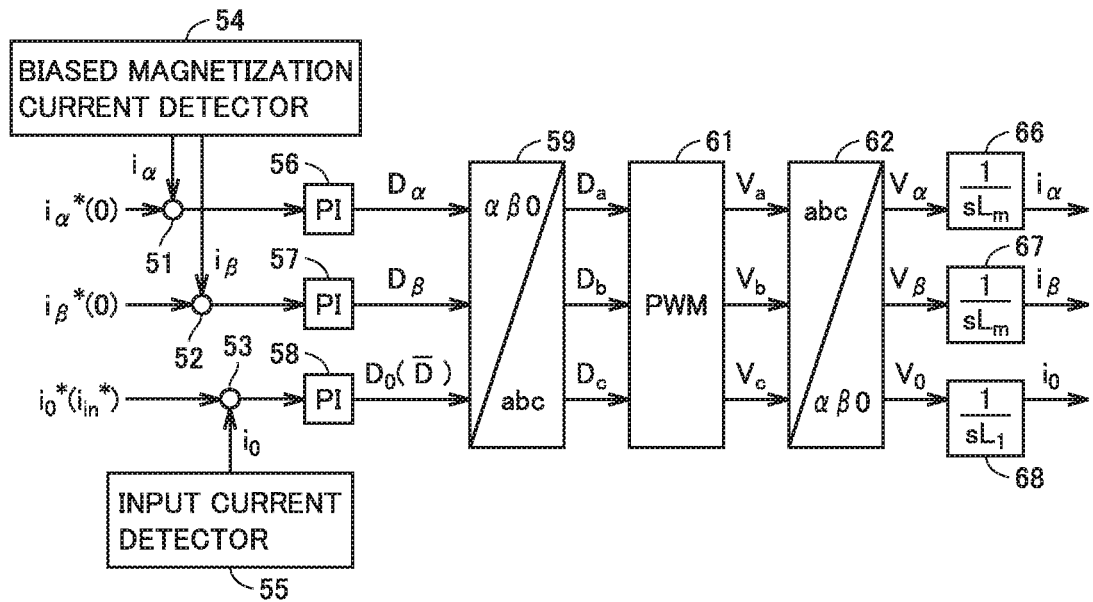
FIG. 11 is a control block diagram in a case where biased magnetization current and zero-phase current are separately input.
FIG. 12 is a diagram illustrating the operating states of semiconductor devices in main operation phases in primary-side bridge circuit 10.

In general, since the magnetizing inductance of a transformer is extremely large, the response speed necessary for suppressing biased magnetization is sufficiently slower than the response speed of current control of reactor L1. Furthermore, when $\alpha\beta0$ transformation is performed on the voltage from terminal f connected to the high voltage side of primary-side power supply 60 to connection point a, connection point b, connection point c on the primary side of transformer 30, a component contributing to biased magnetization current and a component contributing to zero-phase current can be separated and considered independently. FIG. 11 is a control block diagram in a case where the detected biased magnetization current and zero-phase current are independently input. This control block includes a sensor 54 detecting biased magnetization current, a sensor 55 detecting input current, subtractors 51 to 53 calculating difference current from command values $i\alpha^*$, $i\beta^*$, and $i0^*$, PI controllers 56 to 58 executing PI (proportional integral) control, an $\alpha\beta0$/abc transformer 59, a PWM controller 61, an abc/$\alpha\beta0$ transformer 62, and voltage-current converters 66 to 68.

It is the average of the phase duty ratios that affects zero-phase current, and it is a deviation of the phase duty ratios that affects biased magnetization current. Here, in current control for reactor L1, PI controller 58 performs PI control such that current of reactor L1 follows command value $i0^*$, where current flowing through reactor L1 or zero-phase current of transformer 30 is a detected value and the average duty ratio of first bridge circuit 12 is the amount of operation. By contrast, in control of suppressing biased magnetization current, PI controllers 56, 57 perform PI control such that biased magnetization current becomes zero, where the biased magnetization current of transformer 30 is a detected value and a deviation from the average value of the phase duty ratios is the amount of operation. Accordingly, the current control for reactor L1 and the control of suppressing biased magnetization current can be considered independently.

In an ideal state free from biased magnetization, current passing through reactor L1 is divided into three and flows through the primary-side winding of transformer 30 as zero-phase current.

Zero-phase current flowing through the primary-side winding does not transmit electric power to second bridge circuit 22, and when only the zero-phase current is extracted based on the principle of superposition, primary-side bridge circuit 10 behaves as if it is a three-parallel bidirectional chopper circuit. This three-parallel bidirectional chopper circuit functions as a transformer by partially coupling the reactors of bidirectional chopper circuits connected in parallel and cancelling magnetic flux, in which the volume of the magnetic element as a whole is reduced compared with no coupling.

The power transmission amount between primary-side power supply 60 and primary-side storage unit 11 can be controlled by controlling current of reactor L1 with the duty ratio of first bridge circuit 12.

In the present embodiment, the switching waveform of second bridge circuit 22 is phase-shifted while the switching pattern of first bridge circuit 12 is kept, whereby electric power is transmitted between primary-side storage unit 11 and secondary-side storage unit 21.

(Description of Operation Effect)

The operation effect of the DC/DC converter according to the first embodiment will now be described.

FIG. 12 is a diagram showing possible states of the switches of first bridge circuit 12. FIG. 13 is a diagram showing possible states of the switches of second bridge circuit 22.

In FIG. 12 and FIG. 13, "ON" indicates that the switch or the diode or both are conducting, and "OFF" indicates that the switch and the diode are cut off.

Hereinafter, Ph.1 to Ph.8 indicate possible states (phases) of the switches of first bridge circuit 12, and PH.1 to PH.9 and PH.7-2, PH.2-3, PH.3-4, PH.4-5, PH.5-6, and PH.6-7 indicate possible states (phases) of the switches of second bridge circuit 22.

There is correlation between the applied amount of phase shift between first bridge circuit 12 and second bridge circuit 22 and the transmission power amount transmitted between first bridge circuit 12 and second bridge circuit 22 through transformer 30. Here, we discuss a method of applying a phase shift between first bridge circuit 12 and second bridge circuit 22.

Figure 14:
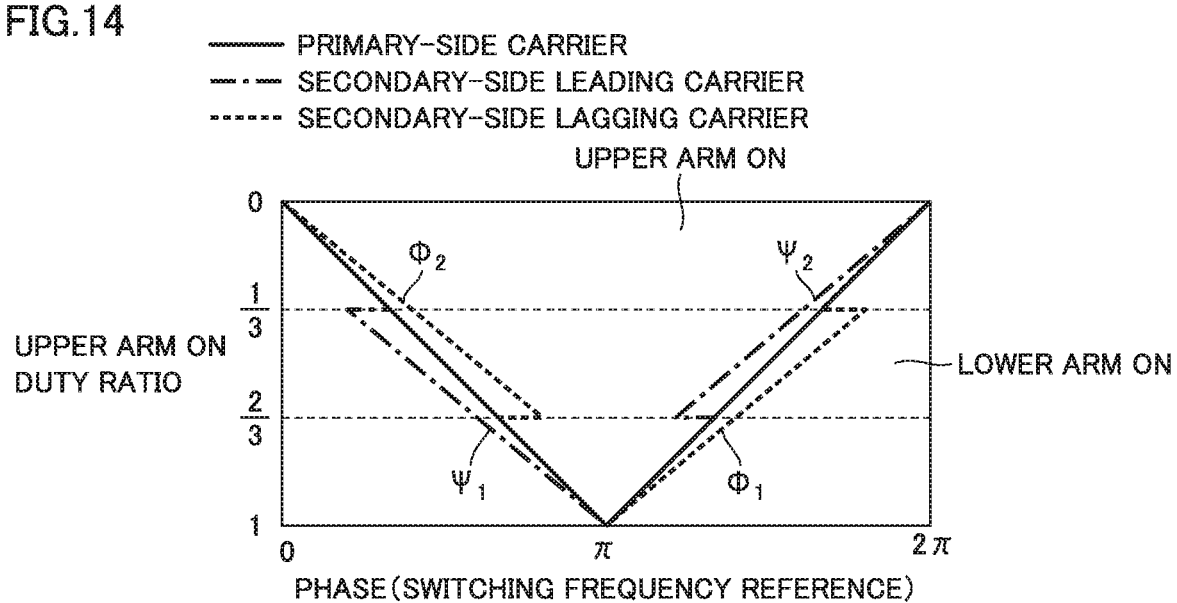
FIG. 14 is a diagram illustrating the relation between switching carrier of first bridge circuit 12 and switching carrier of second bridge circuit 22.
Figure 15:
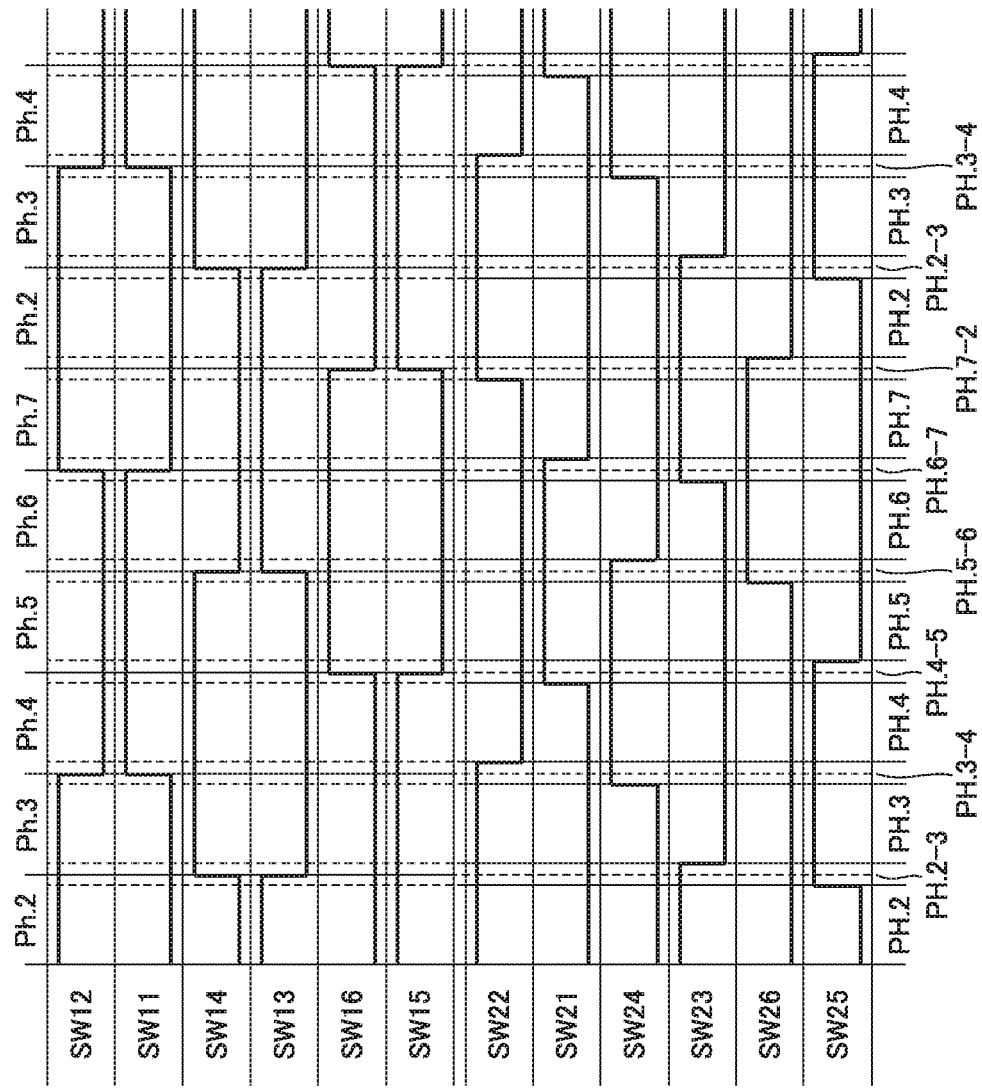
FIG. 15 is a waveform diagram showing the switching timing of semiconductor devices in the main operation mode according to the first embodiment.

FIG. 14 is a diagram illustrating the relation between the switching carrier of first bridge circuit 12 and the switching carrier of second bridge circuit 22 as an example. FIG. 15 is a waveform diagram showing the switching timing of semiconductor devices in a main operation mode according to the first embodiment.

In the case of first bridge circuit 12, switching by common triangular wave carrier comparison is performed as primary-side carrier. By contrast, in the case of second bridge circuit 22, switching is performed by a combination of leading carrier comparison employing leading phase shifts Ψ1, Ψ2 and lagging carrier comparison employing lagging phase shifts Φ1, Φ2.

When the phase shift amount is zero, the secondary-side carrier in FIG. 14 overlaps the primary-side carrier.

In the case of first bridge circuit 12, as is the case with PWM with the common triangular wave carrier comparison method, the primary-side triangular wave carrier shown in FIG. 14 crosses the command value waveform of the duty ratio, whereby as shown in FIG. 15, the conducting/cut off states of the upper arm and the lower arm in one leg are switched at the same timing (SW11 to SW16). By contrast, in the case of second bridge circuit 22, the conducting/cut off states of the upper arm and the lower arm in one leg are not necessarily switched at the same timing and may be switched at different timings, for example, as shown in FIG. 15 (SW21 to SW26).

The paragraph above includes the wording that the upper arm and the lower arm in one leg of primary-side bridge circuit 12 are switched at "the same timing". However, this wording is used to emphasize the difference between the switching method in primary-side bridge circuit 12 and the switching method in secondary-side bridge circuit 22 for the sake of convenience and is not intended to exclude the applicability of dead time. It is preferable to apply a dead time as appropriate even in performing ZVT operation described later.

Figure 16:
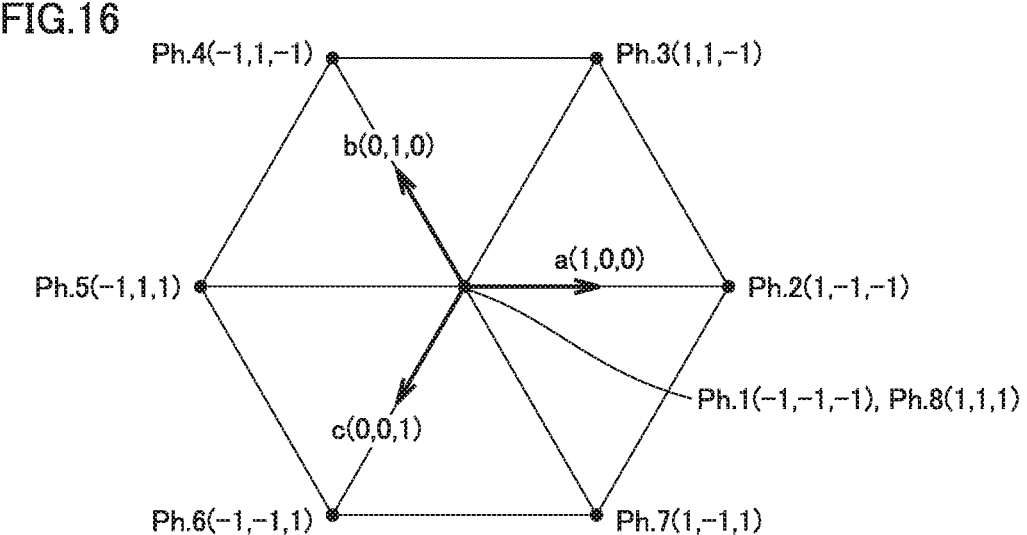
FIG. 16 is a diagram showing the relation between ON/OFF state and vector potential of the switches of first bridge circuit 12.

FIG. 16 is a diagram showing the relation between the ON/OFF state and the vector potential of the switches of first bridge circuit 12. FIG. 16 shows the relation between the main operation phase and the vector potential in the case where the output voltage of first bridge circuit 12 (primary side) undergoes Clarke transformation (αβ0transformation) and is projected onto the αβ plane.

Figure 17:
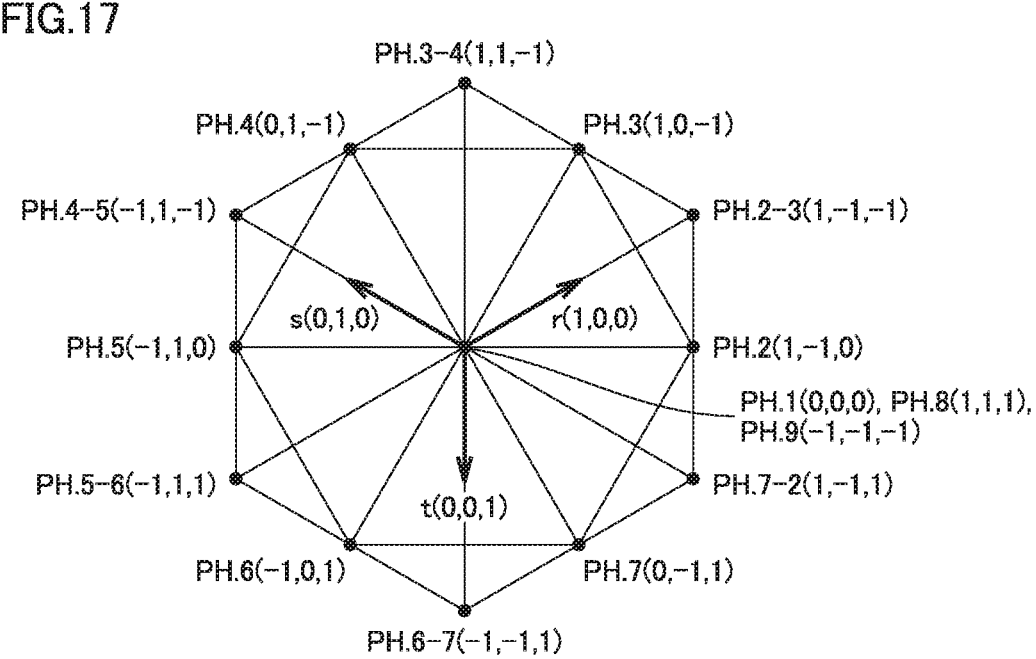
FIG. 17 is a diagram showing the relation between ON/OFF state and vector potential of the switches of second bridge circuit 22.

FIG. 17 is a diagram showing the relation between the ON/OFF state and the vector potential of the switches of second bridge circuit 22. FIG. 17 shows the relation between the main operation phase and the vector potential in the case where the output voltage of second bridge circuit 22 (secondary side) undergoes Clarke transformation (αβ0 transformation) and is projected onto the a plane.

The position denoted by a point in FIG. 16 and FIG. 17 is a vector potential in the main phase when the bus voltage is set to a constant value, and FIG. 16 and FIG. 17 illustrate the relative relation between the vector voltages corresponding to the phases. In FIG. 16, vector a (1, 0, 0), vector b (0, 1, 0), and vector c (0, 0, 1) are unit vector potentials indicating the effect on the vector potential in the drawing when the upper arms of the legs connected to connection point a, connection point b, and connection point c in FIG. 1 are in the conducting state. Similarly, in FIG. 17, vector r (1, 0, 0), vector s (0, 1, 0), and vector t (0, 0, 1) are unit vector potentials indicating the effect that appears in the drawing when the upper arms of the legs connected to connection point r, connection point s, and connection point t in FIG. 1 are in the conducting state.

The switches in second bridge circuit 22 switch so as to mainly output a vector potential corresponding to the vector potential output by first bridge circuit 12 or an appropriate vector potential in FIG. 17 in which the output state of one or more switches is switched from the corresponding vector potential, in accordance with the switching timing indicated by the carrier of secondary-side bridge circuit 22, in accordance with the phase difference of the transformer.

As for the method of determining a switching timing of second bridge circuit 22, for example, the duty ratio may be changed to control the switching timing of second bridge circuit 22 to consequently obtain the same switching pattern, rather than changing the carrier as shown in FIG. 14. The method of determining a switching timing of second bridge circuit 22 as described above is only by way of example, and numerous logically equivalent methods are possible and any other methods may be used. For example, in the process of implementation on a microcomputer, if the method of modifying a carrier is not common, modulating the duty ratio equivalently might be more convenient and advantageous.

Transformer 30 has a phase difference of 30° between the primary-side phase terminals and the secondary-side terminals. In the present embodiment, the vector potential shown in FIG. 16 is output by first bridge circuit 12 and the vector potential shown in FIG. 17 is output by second bridge circuit 22, whereby the power transmission between primary-side storage unit 11 and secondary-side storage unit 21 is controlled.

The symbols shown in FIG. 16 indicate as follows: "1" refers to the upper arm ON and the lower arm OFF, "−1" refers to the upper arm OFF and the lower arm ON. For example, Ph.2(1, −1, −1) corresponds to the main operation phase Ph.2 in FIG. 12. Ph.2(1, −1, −1) means that the upper arm is ON and the lower arm is OFF in the leg having connection point a, the upper arm is OFF and the lower arm is ON in the leg having connection point b, and the upper arm is OFF and the lower arm is ON in the leg having connection point c.

The vector potential shown in FIG. 17 has a point (PH.2-3, PH.3-4, PH.4-5, PH.5-6, PH.6-7, PH.7-2) corresponding to a state in which the leg of second bridge circuit 22 outputs a neutral point potential.

In the circuit in FIG. 1, second bridge circuit 22 regards the OFF-OFF state of switches of second bridge circuit 22 (defined as a state in which the upper and lower switches of the leg are both OFF) as a state of outputting a neutral point potential.

Figure 18:
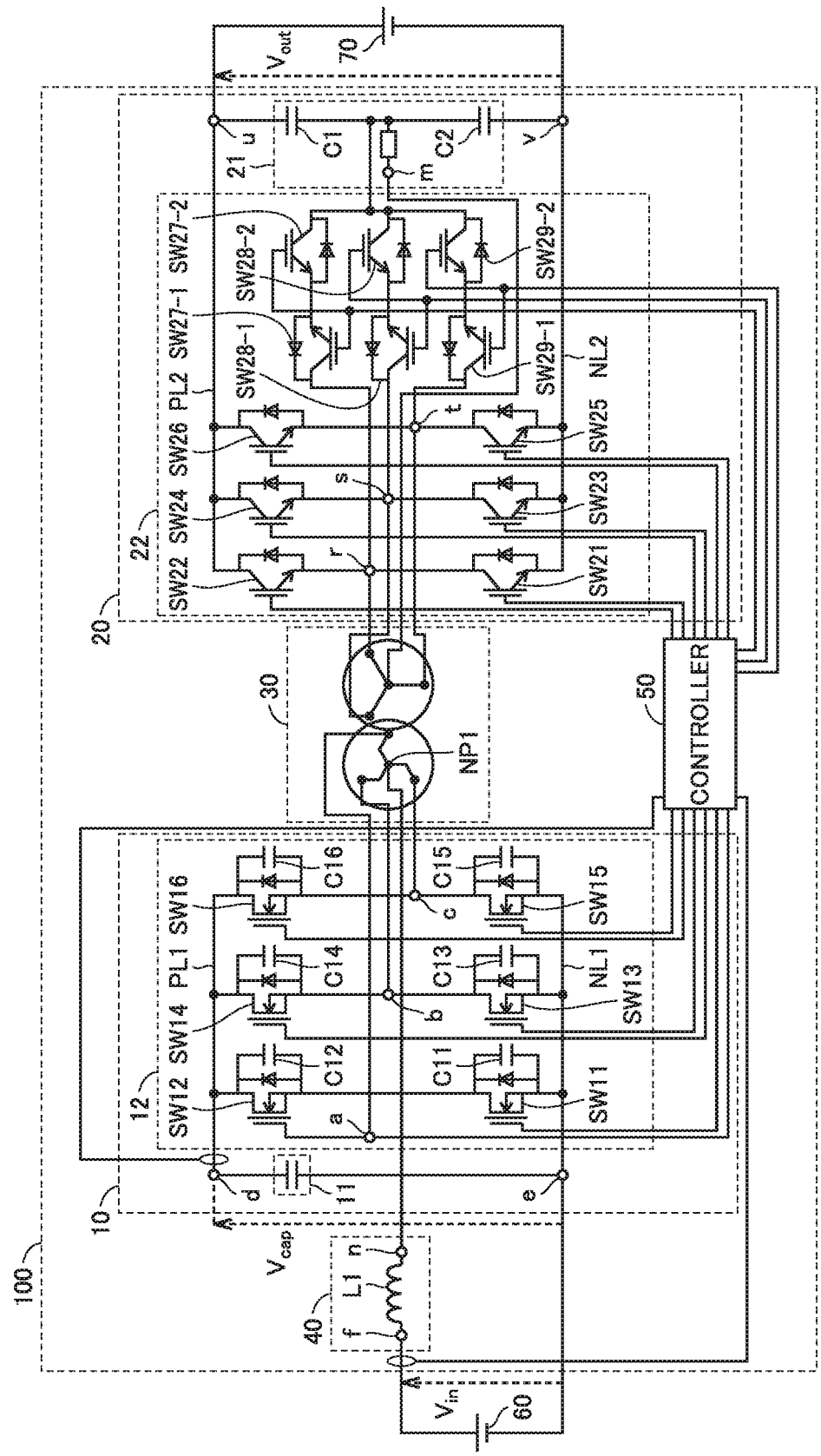
FIG. 18 is a diagram of a modification in which the output of second bridge circuit 22 is a three-level inverter configuration.

As shown in FIG. 18, second bridge circuit 22 may be a three-level inverter configuration which outputs a neutral point potential. That is, second bridge circuit 22 may be configured with a three-level inverter such as a NPC (neutral point clamp) circuit or a TNPC (T-type neutral point clamp) circuit. In this case, in the OFF-OFF state, the switches (for example, SW27-1, SW27-2) connected to a neutral point potential are brought into the ON state to achieve operation similar to the configuration in FIG. 1.

The symbols shown in FIG. 17 indicate as follows: "1" refers to the upper arm ON and the lower arm OFF, "−1" refers to the upper arm OFF and the lower arm ON, and "0" refers to the upper arm and the lower arm OFF. For example, PH.2(1, −1, 0) corresponds to the main operation phase PH.2 in FIG. 13 and means that the upper arm is ON and the lower arm is OFF in the leg having connection point r, the upper arm is OFF and the lower arm is ON in the leg having connection point s, and the upper arm and the lower arm are OFF in the leg having connection point t.

In operation of DC/DC converter 100, it is necessary to apply vector potentials with the same phase to transformer 30 having a phase difference of 30° between the primary-side phase terminals and the secondary-side phase terminals.

Transformer 30 has a phase difference of 30° between the primary-side phase terminals and the secondary-side phase terminals. The state in which vector potentials with the same phase are applied to the primary-side phase terminals and the secondary-side phase terminals of transformer 30 corresponds to a state in which the connection point potential of one leg in first bridge circuit 12 or second bridge circuit 22 attains a neutral point potential.

Thus, the leg of second bridge circuit 22 may have the OFF-OFF state which corresponds to the state of outputting a neutral point potential. The connection point potential of the leg in the OFF-OFF state in second bridge circuit 22 is determined by the vector potential output by first bridge circuit 12. When the switching state of first bridge circuit 12 is Ph.2, Ph.3, Ph.4, Ph.5, Ph.6, Ph.7, the switching state of second bridge circuit 22 is PH.2, PH.3, PH.4, PH.5, PH.6, PH.7 correspondingly, the phases of both ends of transformer 30 are matched, and the potential of the connection point of the leg in the OFF-OFF state is exactly the neutral point potential.

However, variation in leakage inductance, variation in coupling inductance unintended in the design stage, or a parasitic component exist in the three-phase transformer. Therefore, when the vector potential output by first bridge circuit 12 is transmitted to second bridge circuit 22 through the coupling of the transformer, the connection point potential of the leg in the OFF-OFF state is not always the neutral point potential. It is definitely possible that the connection point potential of the leg in the OFF-OFF state is shifted from the neutral point potential or the potential oscillates due to switching.

Possible approaches for suppressing the effect due to variation in transformer 30 include a method of enhancing the coupling of the three-phase transformer and separately inserting a reactor at a position corresponding to leakage inductance, a method of adjusting the switching timing of the primary-side phases, and a method of adjusting the switching timing of the secondary-side phases.

Possible methods of suppressing oscillation include a method of forcedly stopping oscillation by configuring second bridge circuit 22 as a three-level circuit, a method of inserting a resistor between connection point m and a point where the low voltage side of voltage-dividing capacitor C1 and the high voltage side of voltage-dividing capacitor C2 in the secondary-side storage unit are connected to suppress oscillation, and a method of inserting a resistor between a point where the low voltage side of voltage-dividing capacitor C1 and the high voltage side of voltage-dividing capacitor C2 in secondary-side storage unit are connected and connection point r, connection point s, or connection point t of the secondary-side phases to suppress oscillation.

In a leg in the OFF-OFF state, current responsible for a resonance phenomenon may flow through a capacitance component such as parasitic capacitance parallel to the switch, but main circuit current continuously transmitting main power of the converter does not flow. Therefore, current flows through the switches in the ON state in the remaining two legs not in the OFF-OFF state in second bridge circuit 22, whereby power transmission occurs between primary-side storage unit 11 and secondary-side storage unit 21.

(Description of Operation Effect)

The operation effect of the DC/DC converter will now be described in more detail.

The switching pattern shown in FIG. 15 illustrates a state in which a leading phase shift and a lagging phase shift are applied in the same amount.

In the DC/DC converter according to the present embodiment, in general, when the applied amount of leading phase shift increases, the power transmission amount in the regenerative direction increases, whereas when the applied amount of lagging phase shift increases, the power transmission amount in the powering direction increases.

The amount of phase shift to be applied between the primary-side carrier and the secondary-side carrier is determined with reference to the primary-side carrier. A variety of methods for determining the applied amount of phase shift for secondary-side bridge circuit 22 are possible. For example, Expressions (1) to (4) below can be defined for each of leading phase shifts $\Psi_1$, $\Psi_2$ and lagging phase shifts $\Phi_1$, $\Phi_2$. Here, leading variable $\psi$ and lagging variable $\varphi$ are defined, and the average value of the on duty ratio of the upper arm of first bridge circuit 12 is denoted as D. Here, the relation between the primary-side carrier and the secondary-side carrier is as shown in FIG. 14. In FIG. 14, the state in which the phase shift amount is zero refers to a state in which the secondary-side carrier overlaps the primary-side carrier as a reference.

[Expression 1]

$$\Phi_1 = \begin{cases} 0 & \left(\frac{2}{3} < D < 1\right) \\ D \cdot \phi & \left(0 < D < \frac{2}{3}\right) \end{cases} \quad (1)$$

[Expression 2]

$$\Phi_2 = \begin{cases} (1-D) \cdot \phi & \left(\frac{1}{3} < D < 1\right) \\ 0 & \left(0 < D < \frac{1}{3}\right) \end{cases} \quad (2)$$

[Expression 3]

$$\Psi_1 = \begin{cases} 0 & \left(\frac{2}{3} < D < 1\right) \\ D \cdot \varphi & \left(0 < D < \frac{2}{3}\right) \end{cases} \quad (3)$$

[Expression 4]

$$\Psi_2 = \begin{cases} (1-D) \cdot \varphi & \left(\frac{1}{3} < D < 1\right) \\ 0 & \left(0 < D < \frac{1}{3}\right) \end{cases} \quad (4)$$

Figure 19:
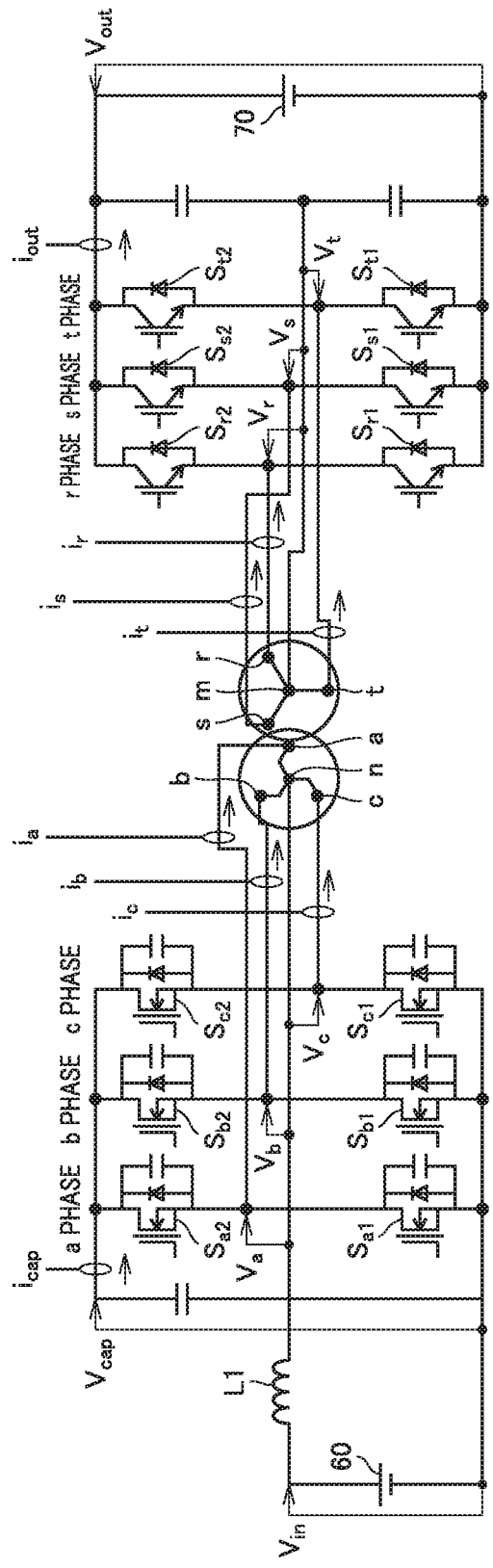
FIG. 19 is a circuit diagram with reference signs of current and voltage used in explanation of power transmission in the first embodiment.
Figure 20:
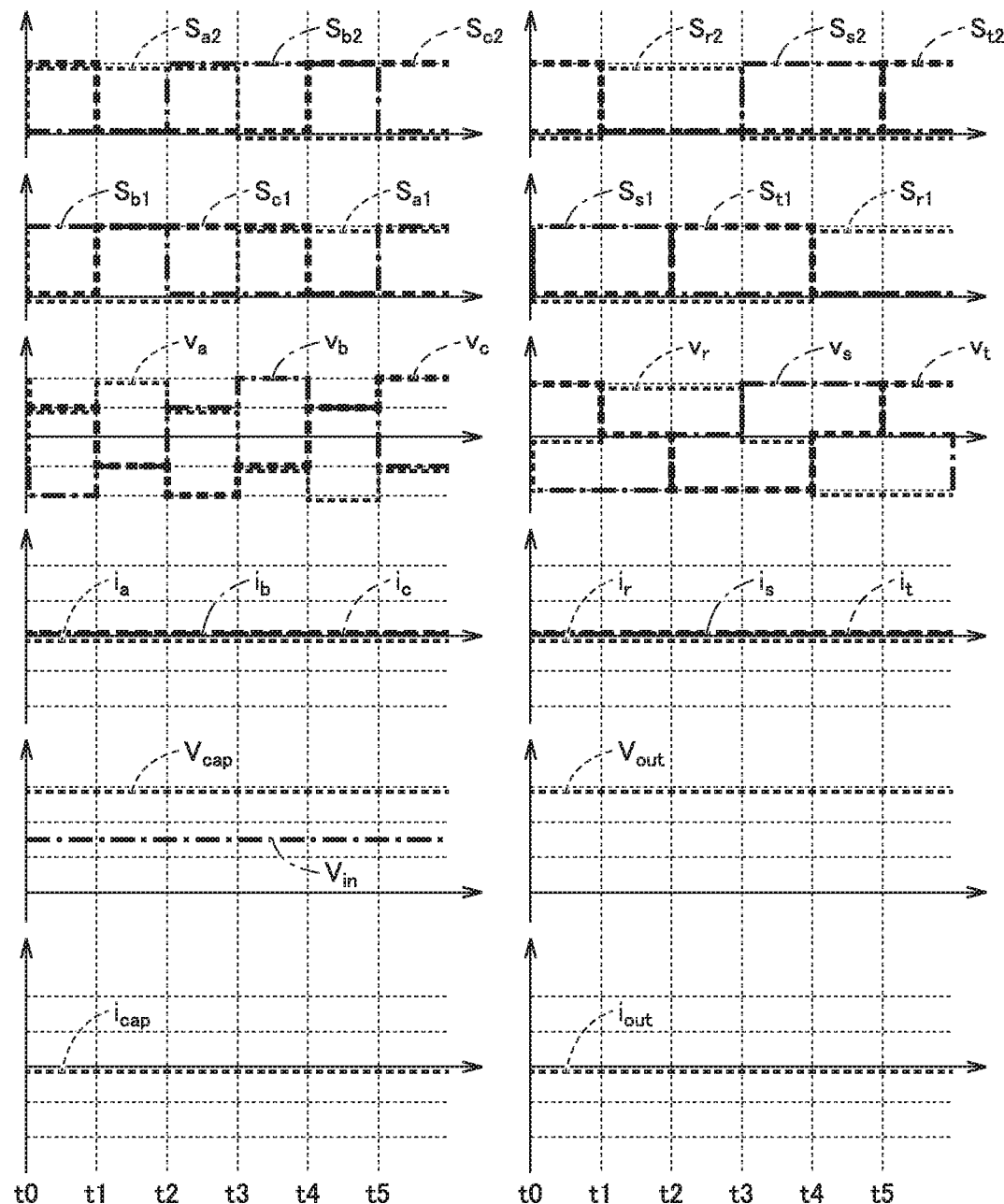
FIG. 20 is a diagram showing the output waveform in which neither leading nor lagging phase shift is applied (Duty=50%).
Figure 21:
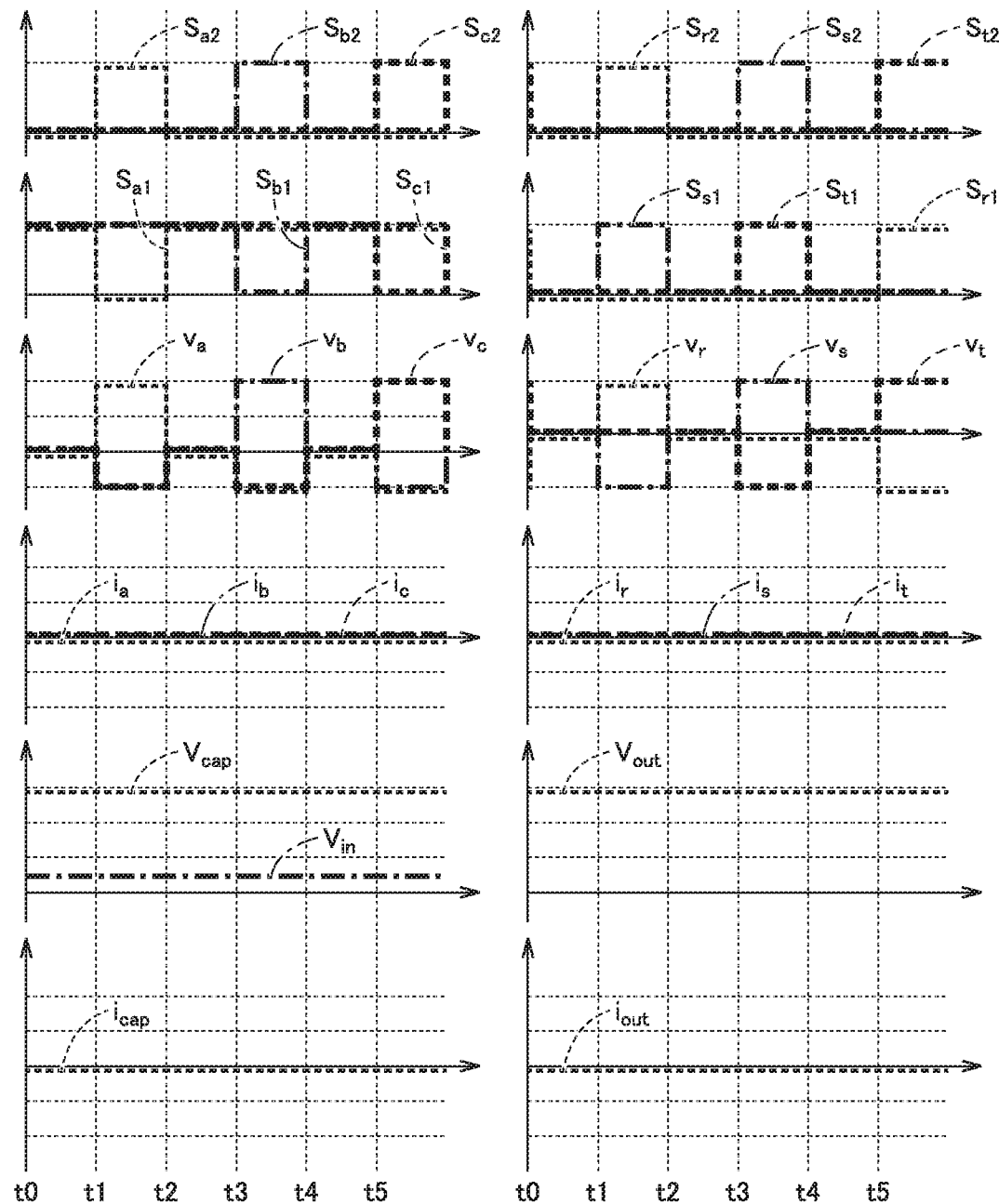
FIG. 21 is a diagram showing the output waveform in which neither leading nor lagging phase shift is applied (Duty=16.7%).
Figure 22:
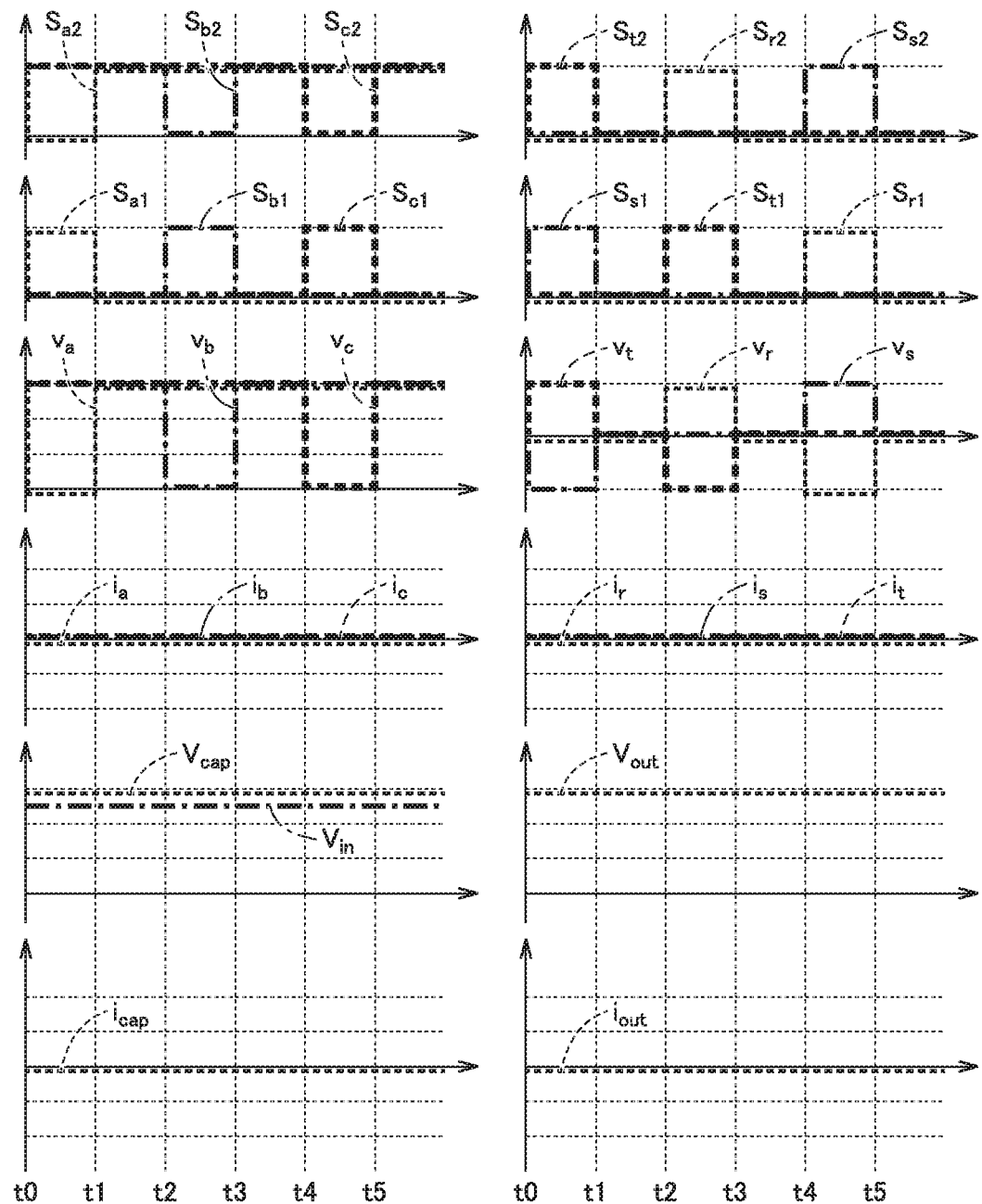
FIG. 22 is a diagram showing the output waveform in which neither leading nor lagging phase shift is applied (Duty=83.3%).
Figure 23:
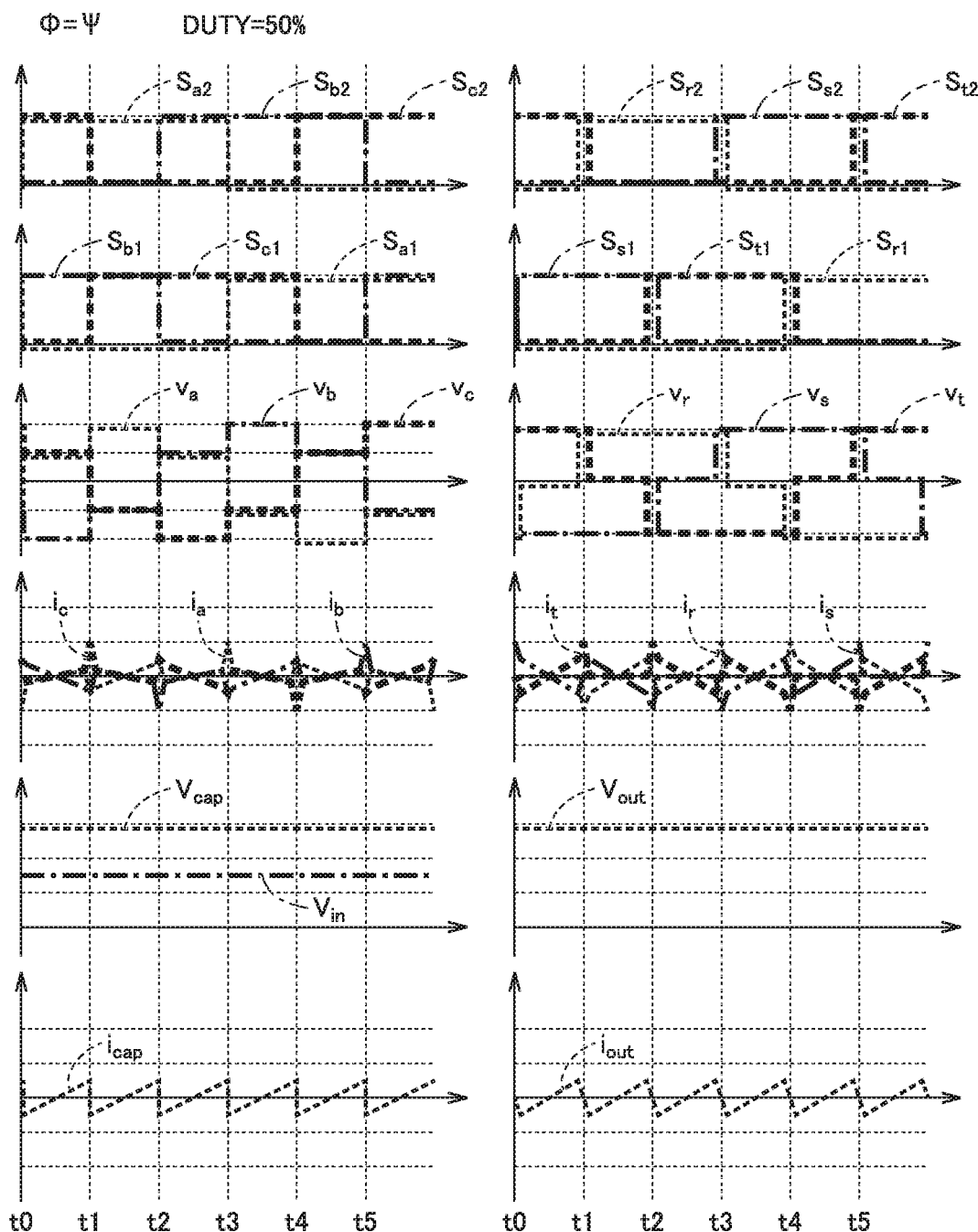
FIG. 23 is a waveform diagram in the case where a leading phase shift and a lagging phase shift are applied in the same amount (Duty=50%).

When neither a leading phase shift nor a lagging phase shift is applied, first bridge circuit 12 and second bridge circuit 22 output "vector potentials in a correspondence relation" to each other. The on duty ratio of the upper arm of first bridge circuit 12 is hereinafter simply referred to as "duty ratio". FIG. 19 is a circuit diagram illustrating reference signs of current and voltage used in explanation of power transmission in the first embodiment. FIG. 20 is a diagram showing an output waveform when the duty ratio is 50%. FIG. 21 is a diagram showing an output waveform when the duty ratio is 16.7%. FIG. 22 is a diagram showing an output waveform when the duty ratio is 83.3%. In these waveform diagrams, a portion where a plurality of lines overlap is depicted such that they are slightly shifted up and down for the sake of clarity. The waveform diagrams subsequent to FIG. 23 are processed similarly.

When voltage is applied to transformer 30 by first bridge circuit 12 (Ph.2, Ph.3, Ph.4, Ph.5, Ph.6, Ph.7), the state (PH.2, PH.3, PH.4, PH.5, PH.6, PH.7) in which two legs are conducting that corresponds to each case in second bridge circuit 22 is the "vector potentials in a correspondence relation".

When the switches in first bridge circuit 12 are all in the lower arm ON state (Ph.1) or the upper arm ON state (Ph.8), voltage is not applied to transformer 30. In this case, the switches in second bridge circuit 22 are in the OFF-OFF state in all of the legs (PH.1), are all in the upper arm ON state (PH.8), or are all in the lower arm ON state (PH.9).

In FIG. 20, FIG. 21, and FIG. 22, the ratio between voltage Vcap of primary-side storage unit 11 and voltage Vout of secondary-side storage unit 21 is 1:4n/3 when the turns ratio of the three-phase transformer with zigzag-Y connection shown in FIG. 1 is 1:n, and the ratio is 1:2n/3 when the turns ratio of the three-phase transformer with Y-Δ connection shown in FIG. 2 is 1:n.

The state of voltage ratio noted in the paragraph above is defined as a state in which voltage Vcap of primary-side storage unit 11 and voltage Vout of secondary-side storage unit 21 are balanced. In the present embodiment, transmission of power through transformer 30 occurs when the voltage of primary-side storage unit 11 is higher than the balanced state.

The circuit operation when a leading phase shift or a lagging phase shift or both are applied will now be described. FIG. 20 to FIG. 37 show the waveforms under each condition of duty ratio and phase shift.

In the waveforms in FIG. 20 to FIG. 37, current of primary-side power supply 60, which is obvious from the phase currents of transformer 30 according to Kirchhoff's current law, and voltage of neutral connection point n, which is obvious from the phase voltages of transformer 30 according to Kirchhoff's voltage law, are not illustrated.

Figure 24:
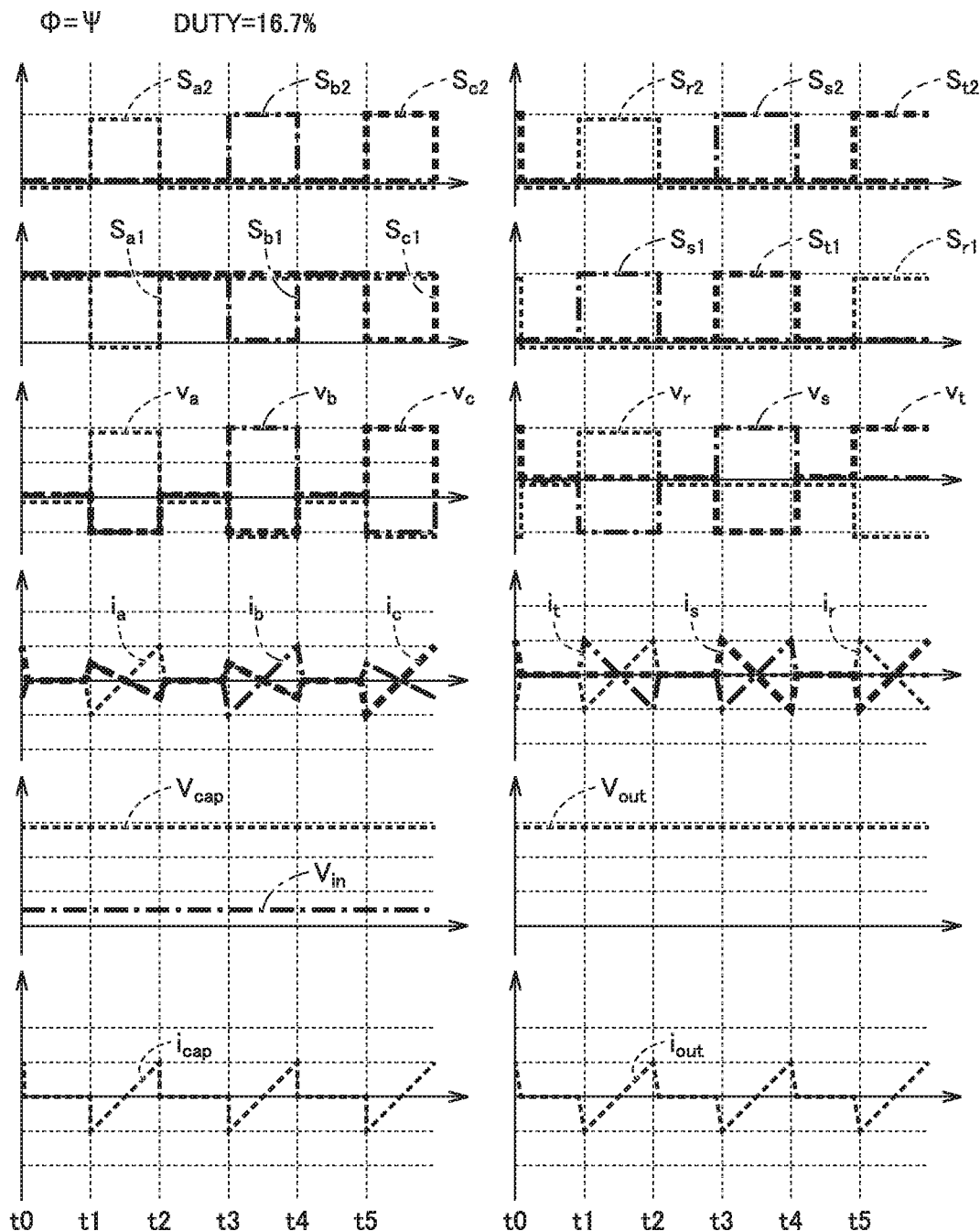
FIG. 24 is a waveform diagram in the case where a leading phase shift and a lagging phase shift are applied in the same amount (Duty=16.7%).
Figure 25:
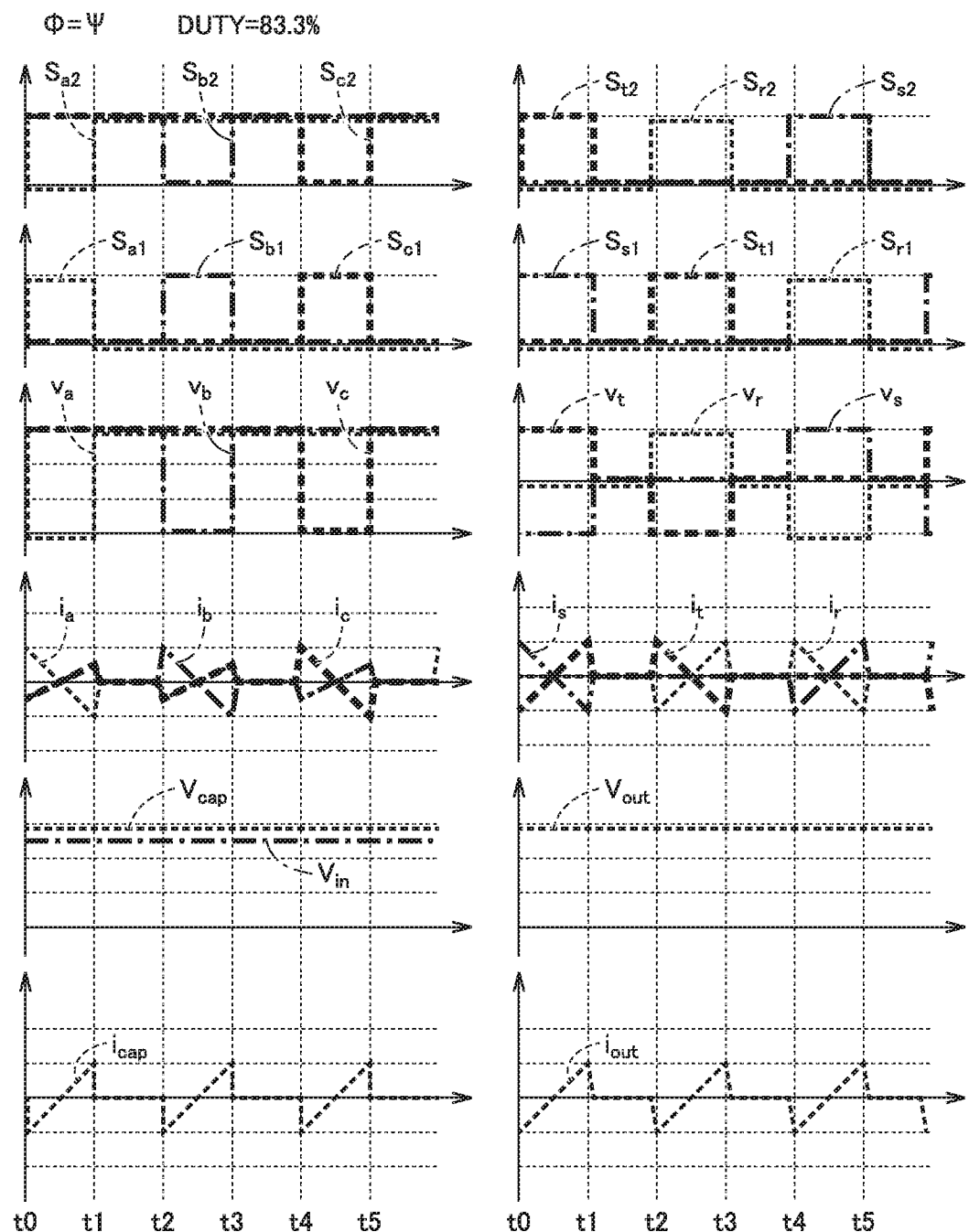
FIG. 25 is a waveform diagram in the case where a leading phase shift and a lagging phase shift are applied in the same amount (Duty=83.3%).

The leading phase shift and the lagging phase shift have the power transmission action in the regenerative direction and the powering direction, respectively, and cancel out each other. When the leading phase shift and the lagging phase shift are applied in the same amount, electric power merely moves back and forth between primary-side storage unit 11 and secondary-side storage unit 21, and the average transmission power amount is zero. FIG. 23 to FIG. 25 are waveform diagrams in the case where a leading phase shift and a lagging phase shift are applied in the same amount. FIG. 23 shows the waveform with duty ratio 50%, FIG. 24 shows the waveform with duty ratio 16.7%, and FIG. 25 shows the waveform with duty ratio 83.3%.

First bridge circuit 12 uses capacitors C11 to C16 connected in parallel to perform zero voltage transition (hereinafter referred to as ZVT) operation when the upper and lower switches are switched.

ZVT is a soft switching method well known in the DAB (Dual Active Bridge) method. The MOSFET or IGBT allowing current to flow in the forward direction is turned off, and the current is commutated to the capacitor connected in parallel in the upper/lower arm so that the capacitor is charged/discharged. Here, the connection point potential of the upper/lower arm varies in accordance with charging/discharging of the capacitor. In this way, switching of connection point potential by soft switching is achieved by switching the connection point potential to feed current to the anti-parallel diode on the opposite-side arm and turning on the MOSFET or IGBT on the opposite-side arm when current flows through the anti-parallel diode.

In the waveforms in FIG. 23, FIG. 24, and FIG. 25, both leading and lagging phase shifts are applied to the secondary-side switches, whereby electric power moves back and forth between the primary-side circuit and the secondary-side circuit through the transformer, current flows through first bridge circuit 12 in a direction suitable for performing switching by ZVT, and switching of the switches can be performed by soft switching. Current does not flow in second bridge circuit 22 during turning-on or turning-off, and switching of the switches can be performed by soft switching (ZCS: Zero Current Switching).

Figure 26:
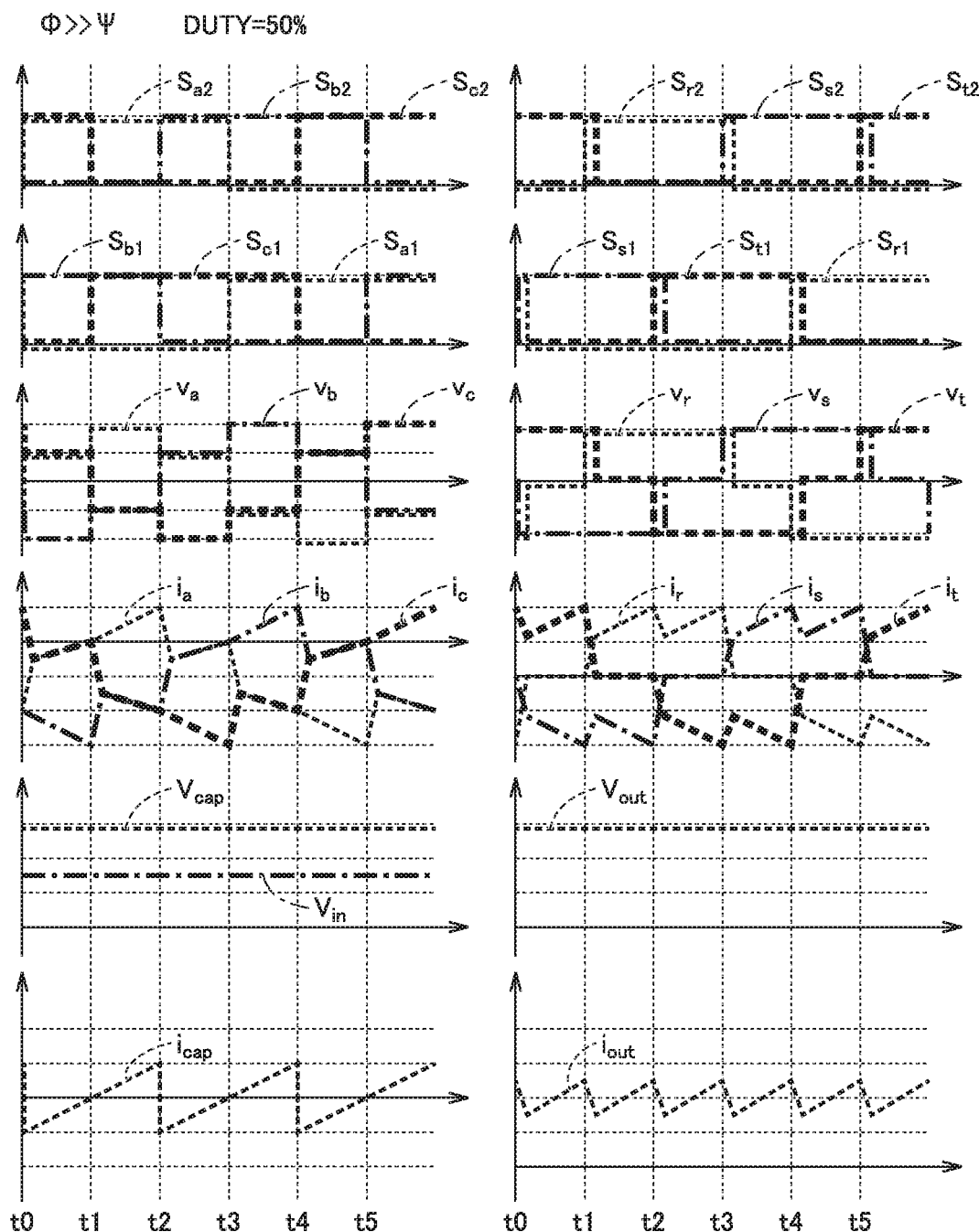
FIG. 26 is an operation waveform diagram in powered operation in which a lagging phase shift is applied (Duty=50%).
Figure 27:
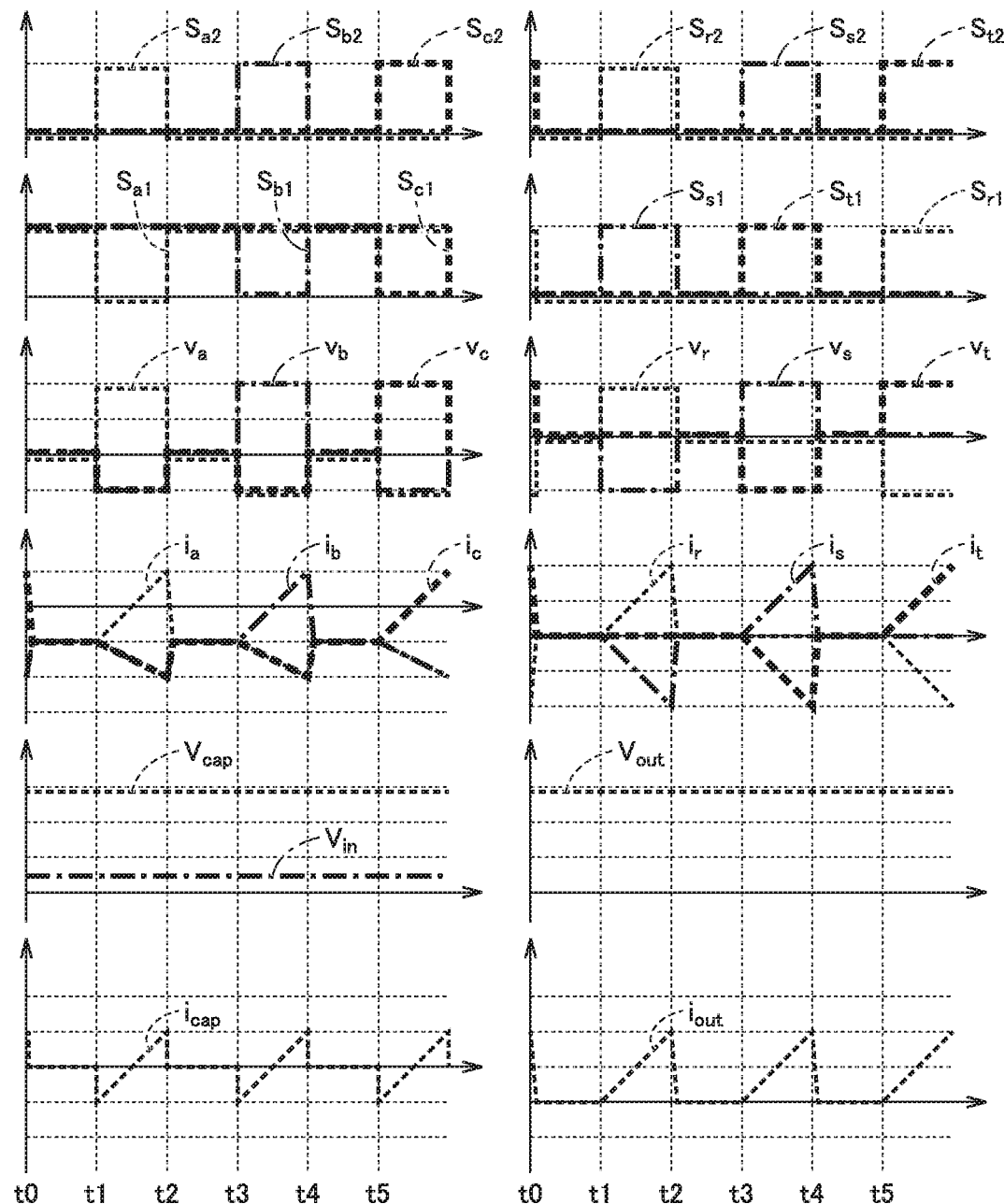
FIG. 27 is an operation waveform diagram in powered operation in which a lagging phase shift is applied (Duty=16.7%).
Figure 28:
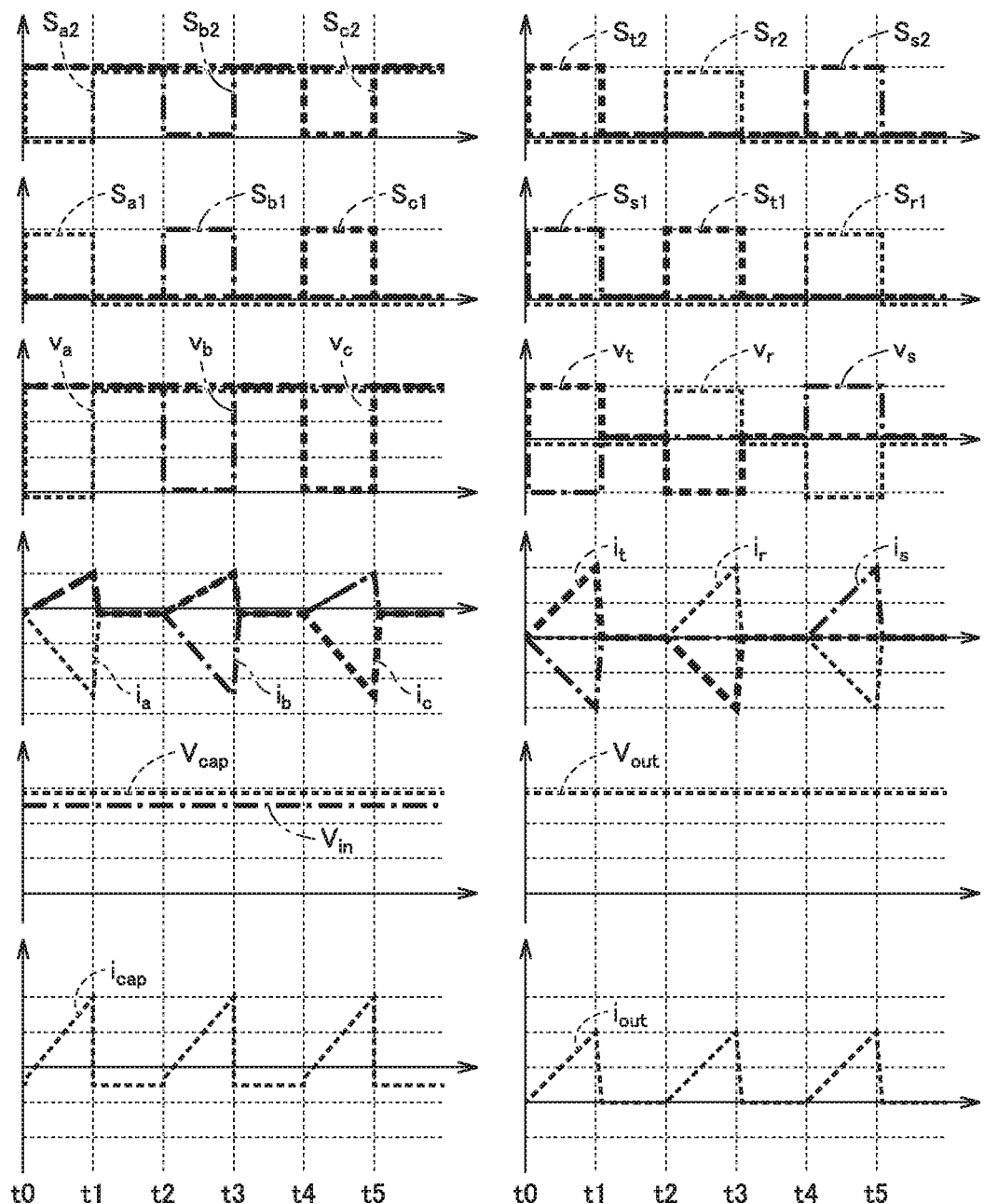
FIG. 28 is an operation waveform diagram in powered operation in which a lagging phase shift is applied (Duty=83.3%).

FIG. 26 to FIG. 28 are operation waveforms in powered operation in which a lagging phase shift is applied. The waveform with duty ratio 50% is shown in FIG. 26, the waveform with duty ratio 16.7% is shown in FIG. 27, and the waveform with duty ratio 83.3% is shown in FIG. 28.

Figure 29:
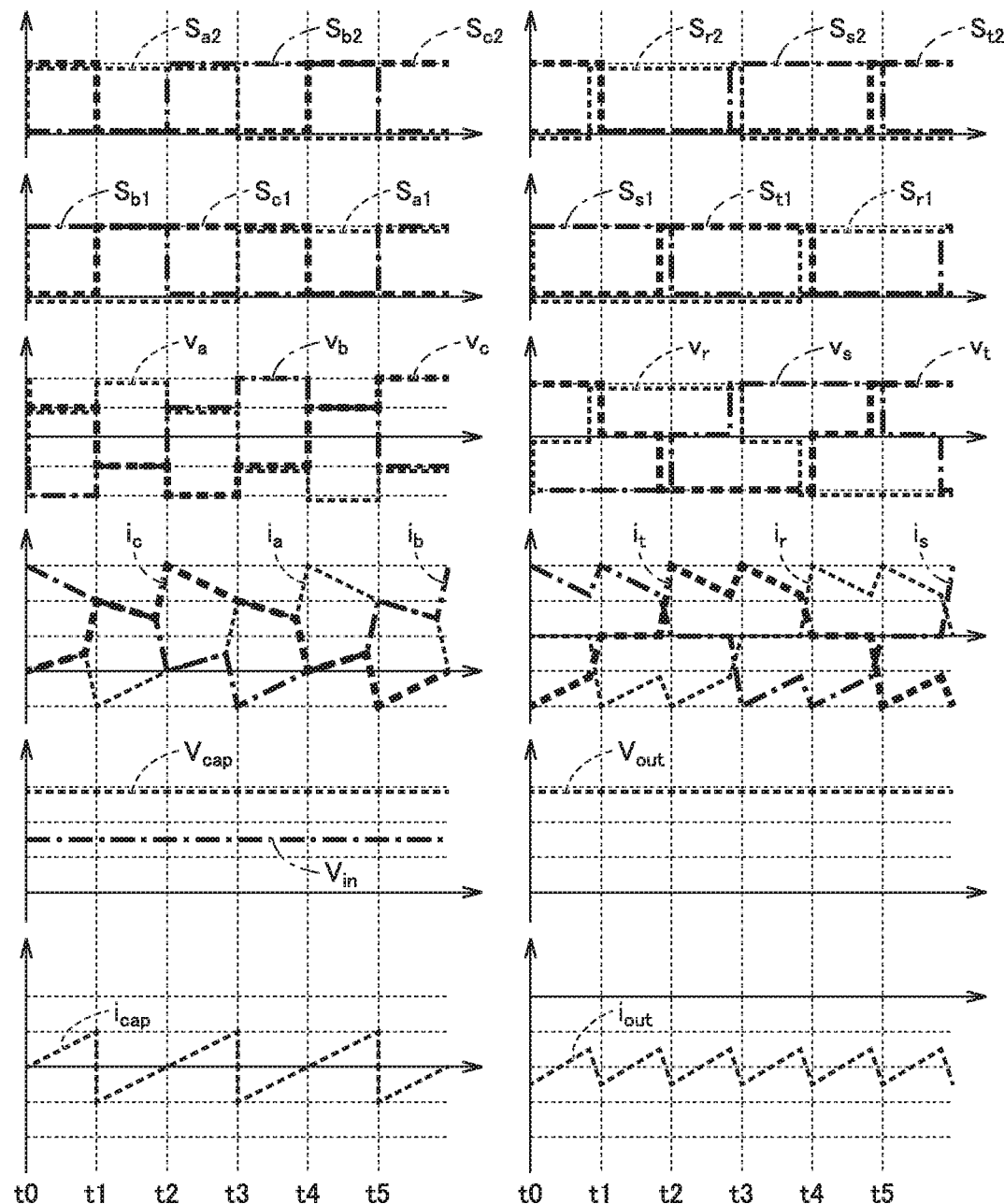
FIG. 29 is an operation waveform diagram in regenerative operation in which a leading phase shift is applied (Duty=50%).
Figure 30:
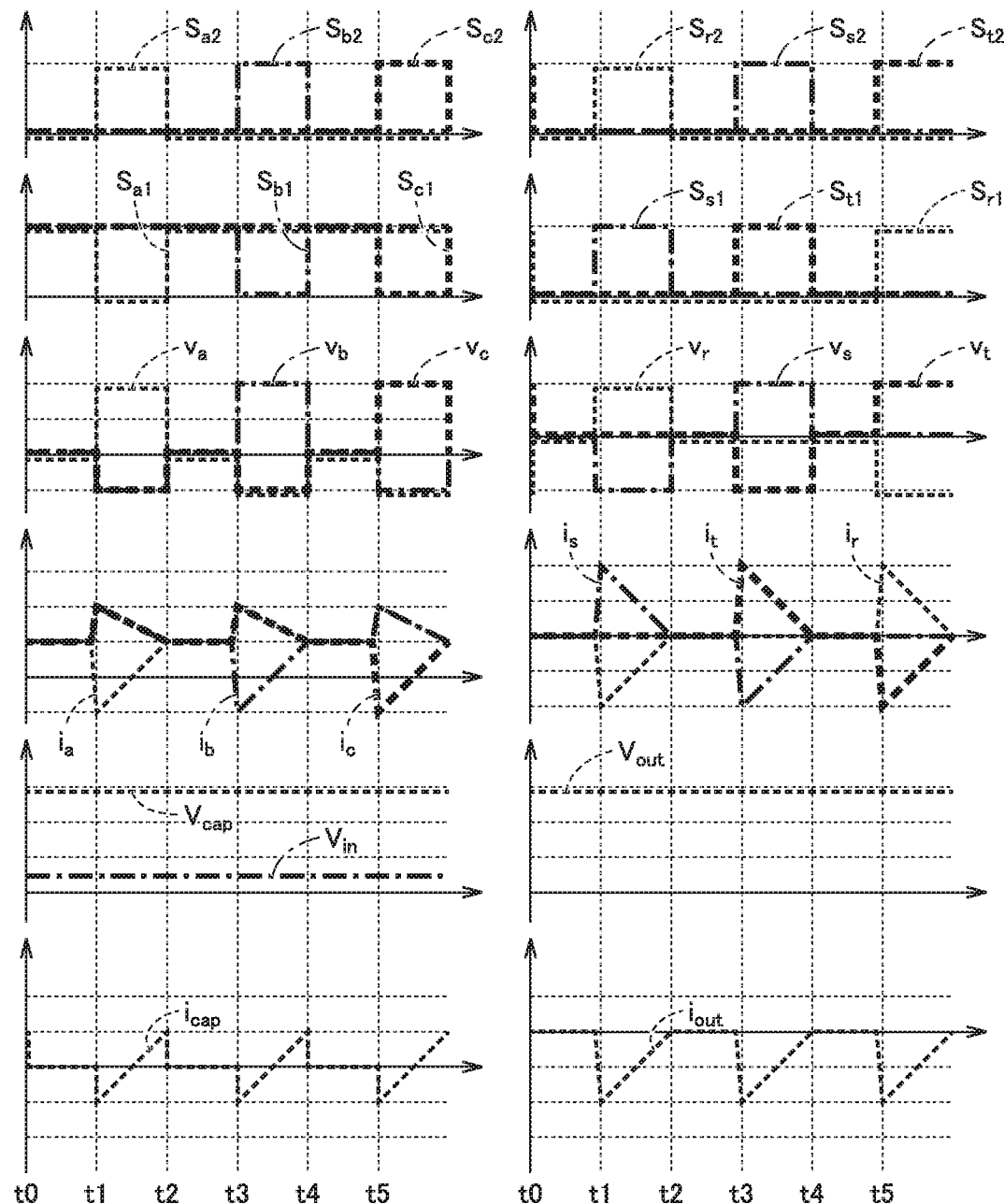
FIG. 30 is an operation waveform diagram in regenerative operation in which a leading phase shift is applied (Duty=16.7%).
Figure 31:
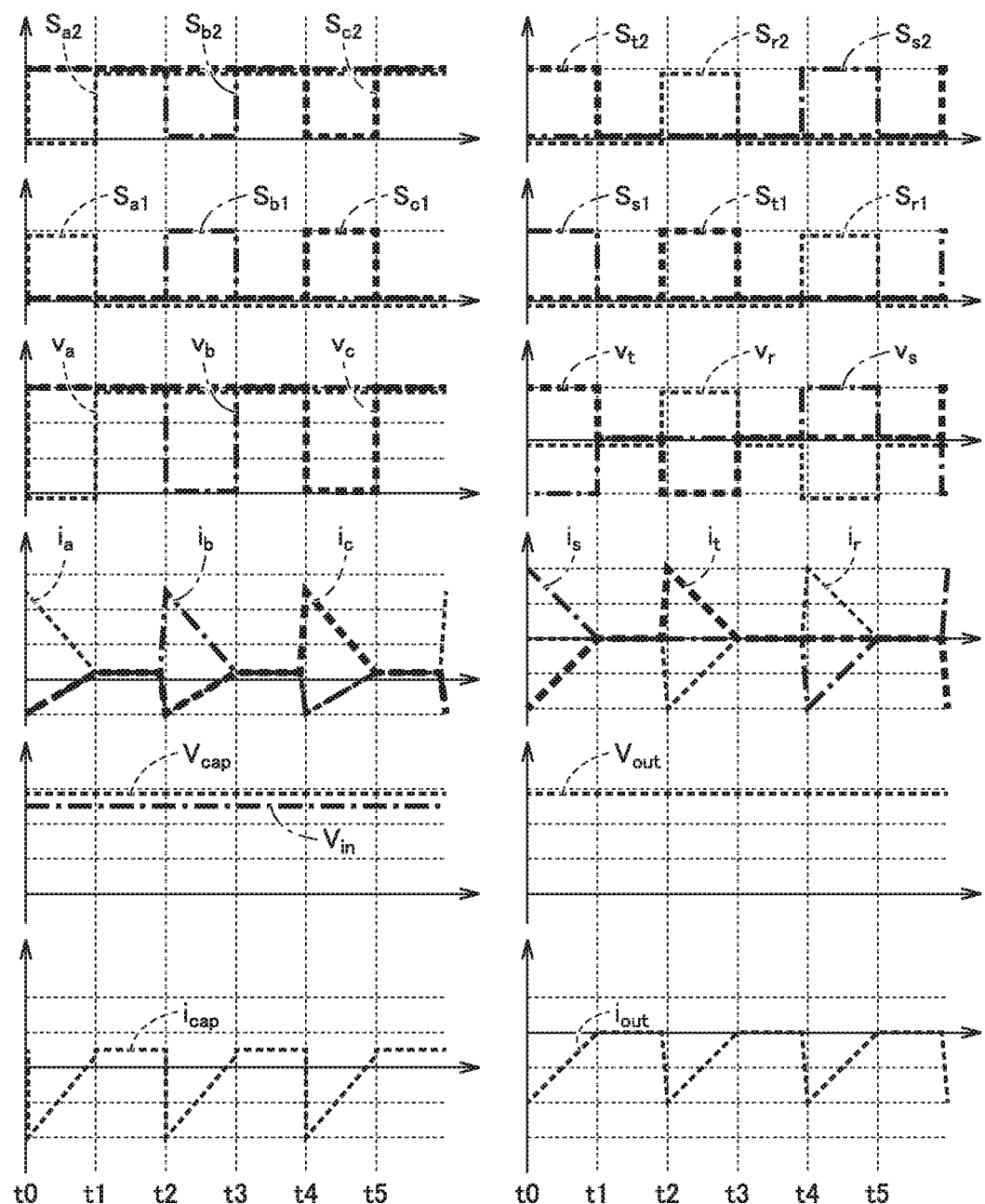
FIG. 31 is an operation waveform diagram in regenerative operation in which a leading phase shift is applied (Duty=83.3%).

FIG. 29 to FIG. 31 are operation waveforms in regenerative operation in which a leading phase shift is applied. The waveform with duty ratio 50% is shown in FIG. 29, the waveform with duty ratio 16.7% is shown in FIG. 30, and the waveform with duty ratio 83.3% is shown in FIG. 31.

Figure 32:
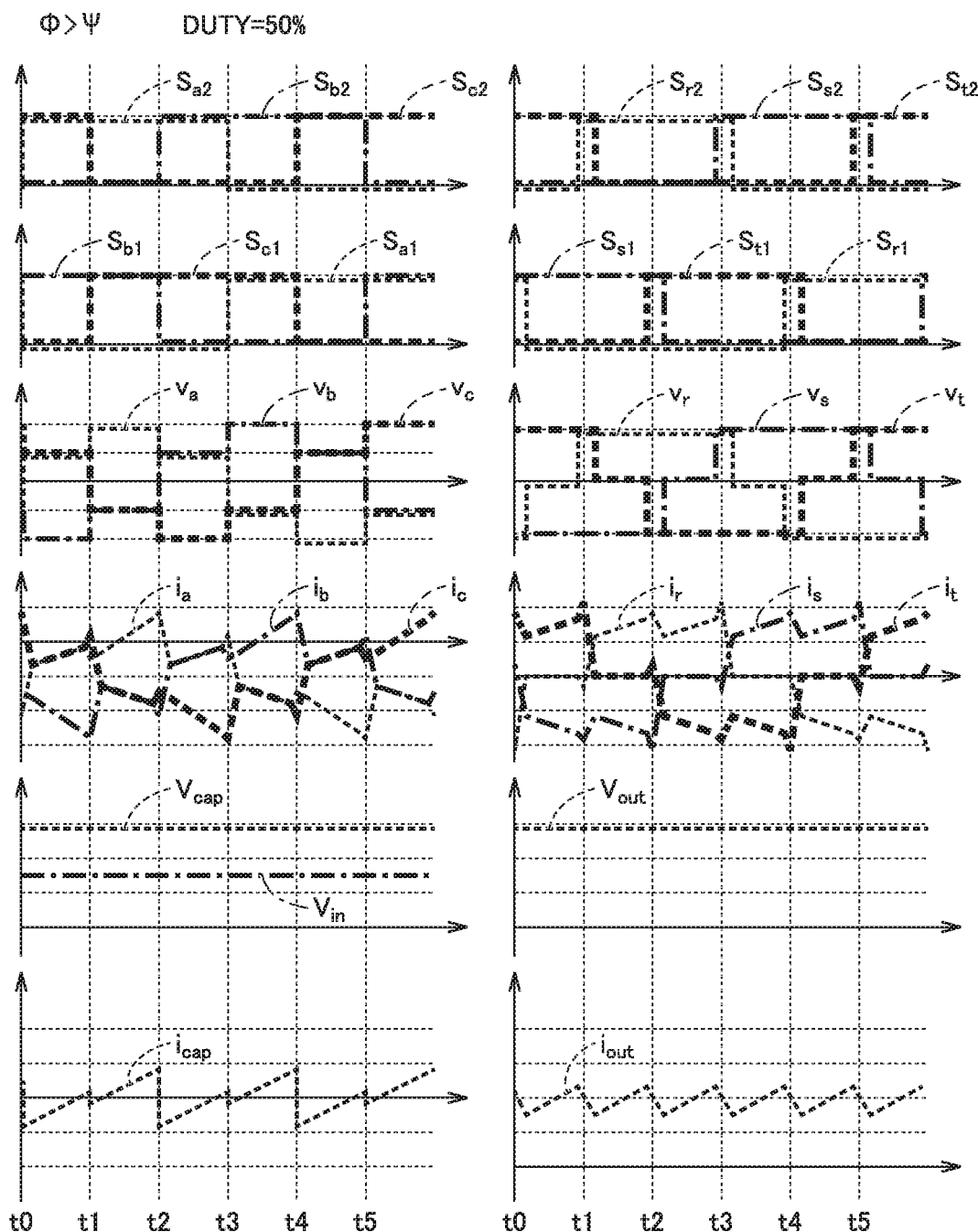
FIG. 32 is an operation waveform diagram in powered operation in which a lagging phase shift and a relatively smaller amount of leading phase shift are applied (Duty=50%).
Figure 33:
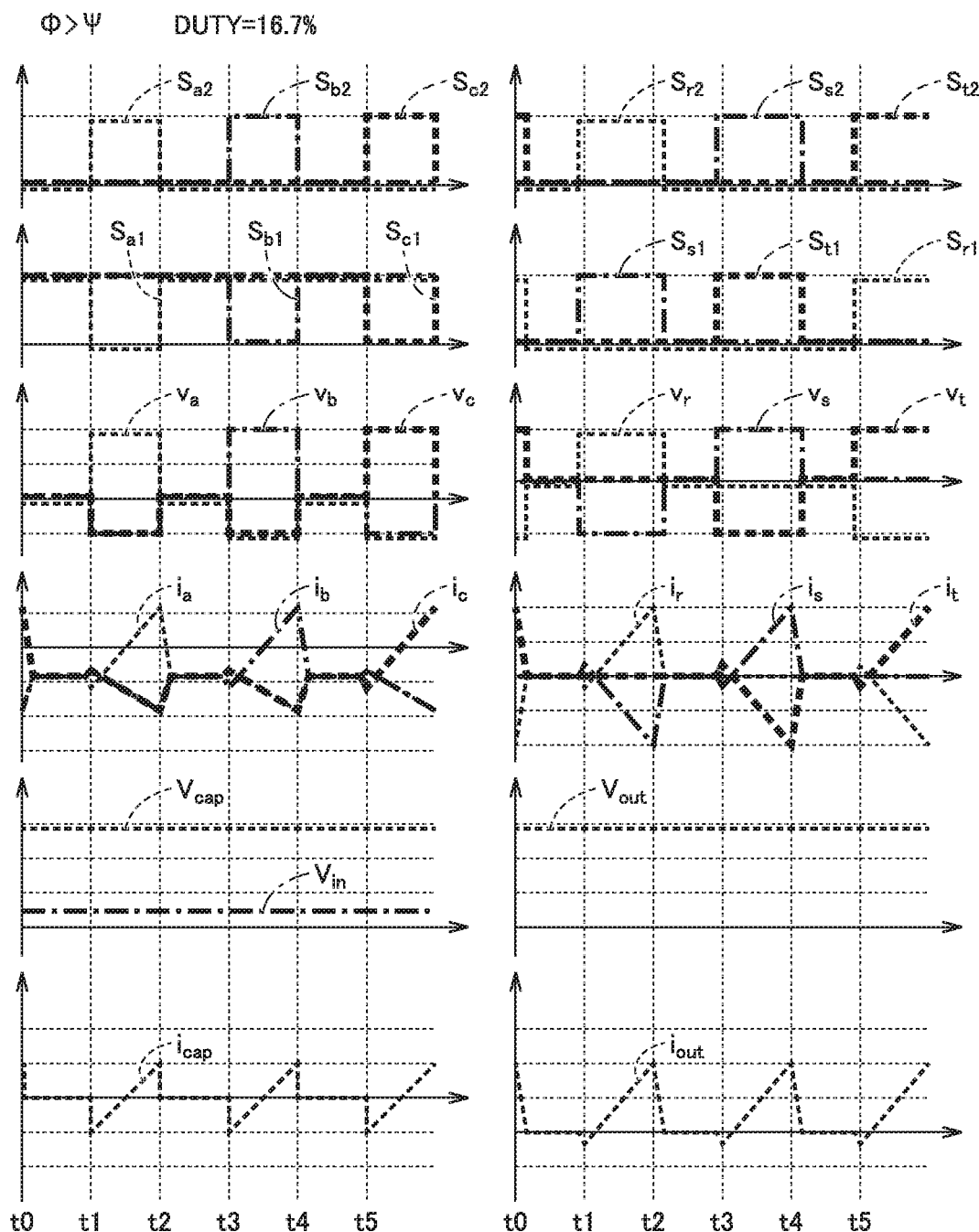
FIG. 33 is an operation waveform diagram in powered operation in which a lagging phase shift and a relatively smaller amount of leading phase shift are applied (Duty=16.7%).
Figure 34:
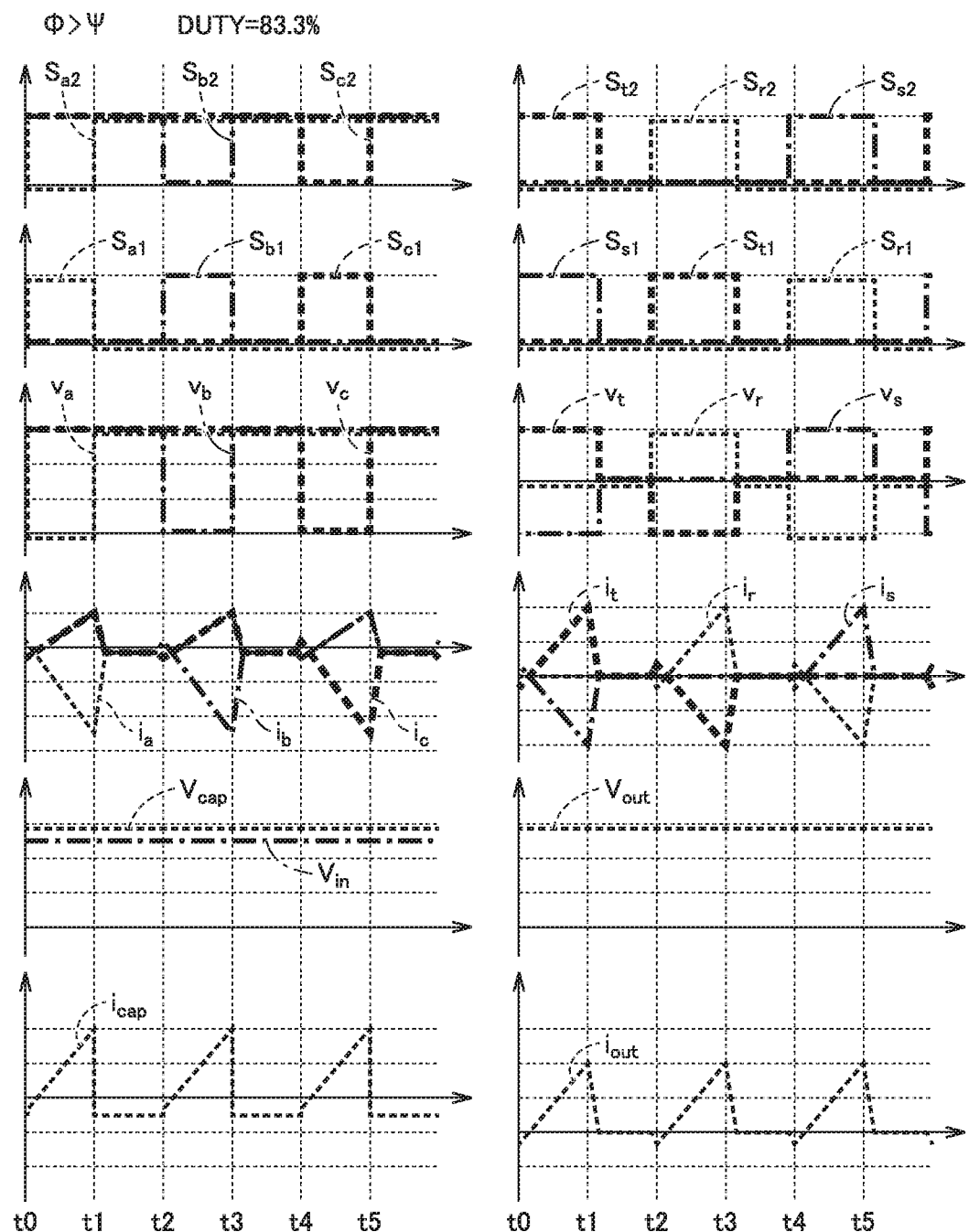
FIG. 34 is an operation waveform diagram in powered operation in which a lagging phase shift and a relatively smaller amount of leading phase shift are applied (Duty=83.3%).

FIG. 32 to FIG. 34 are operation waveforms in powered operation in which a lagging phase shift and a relatively smaller amount of leading phase shift are applied. The waveform with duty ratio 50% is shown in FIG. 32, the waveform with duty ratio 16.7% is shown in FIG. 33, and the waveform with duty ratio 83.3% is shown in FIG. 34.

Figure 35:
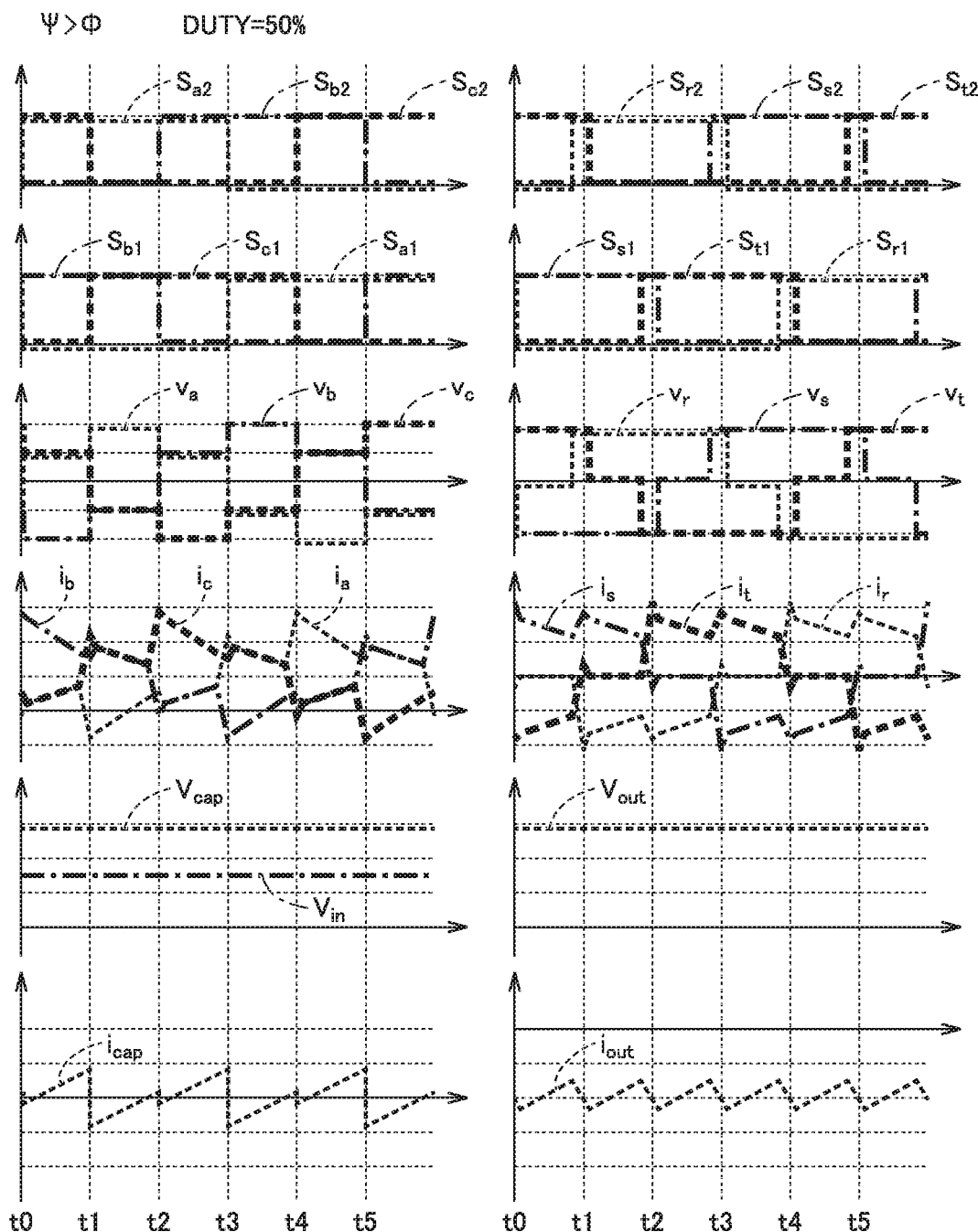
FIG. 35 is an operation waveform diagram in regenerative operation in which a leading phase shift and a relatively smaller amount of lagging phase shift are applied (Duty=50%).
Figure 36:
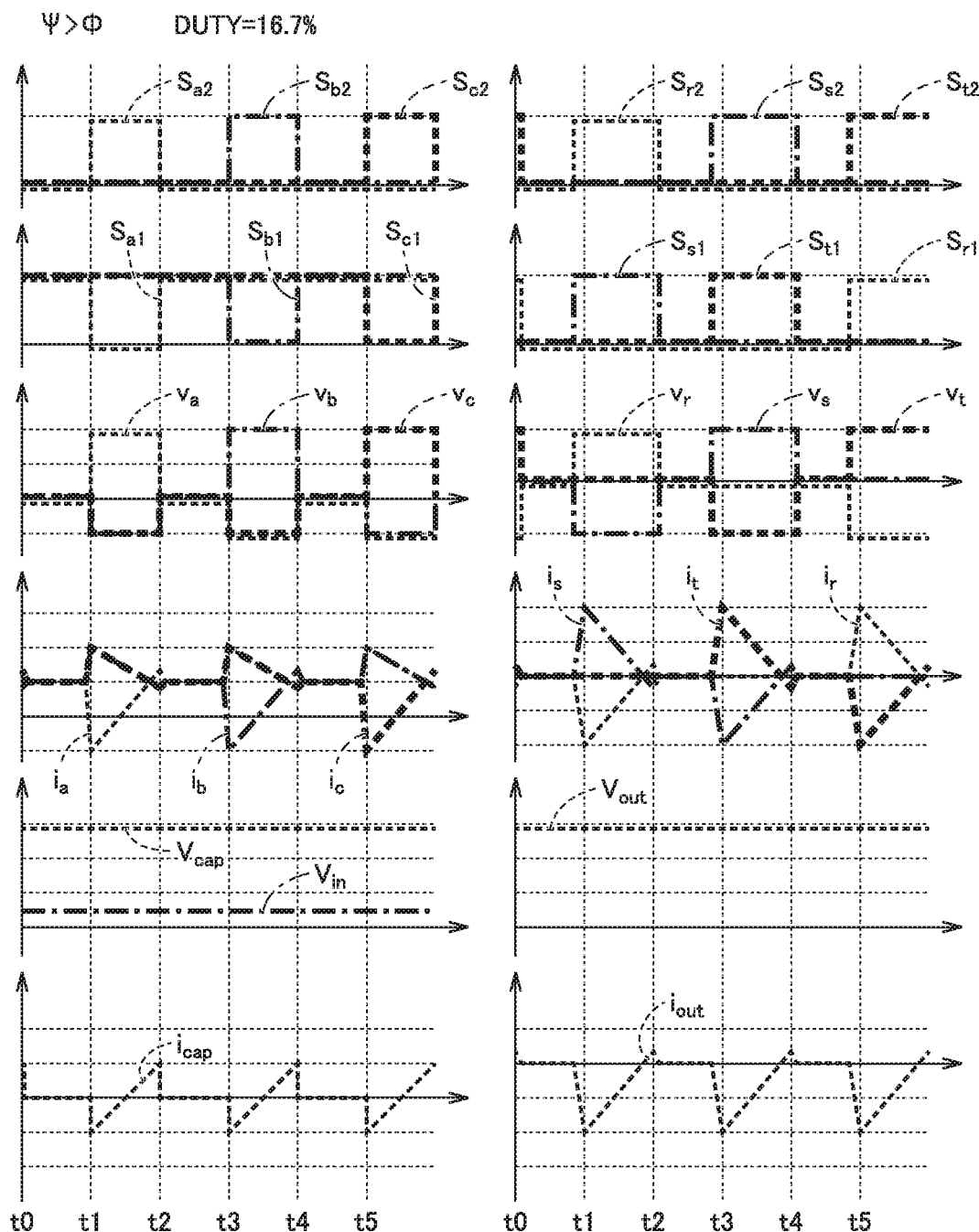
FIG. 36 is an operation waveform diagram in regenerative operation in which a leading phase shift and a relatively smaller amount of lagging phase shift are applied (Duty=16.7%).
Figure 37:
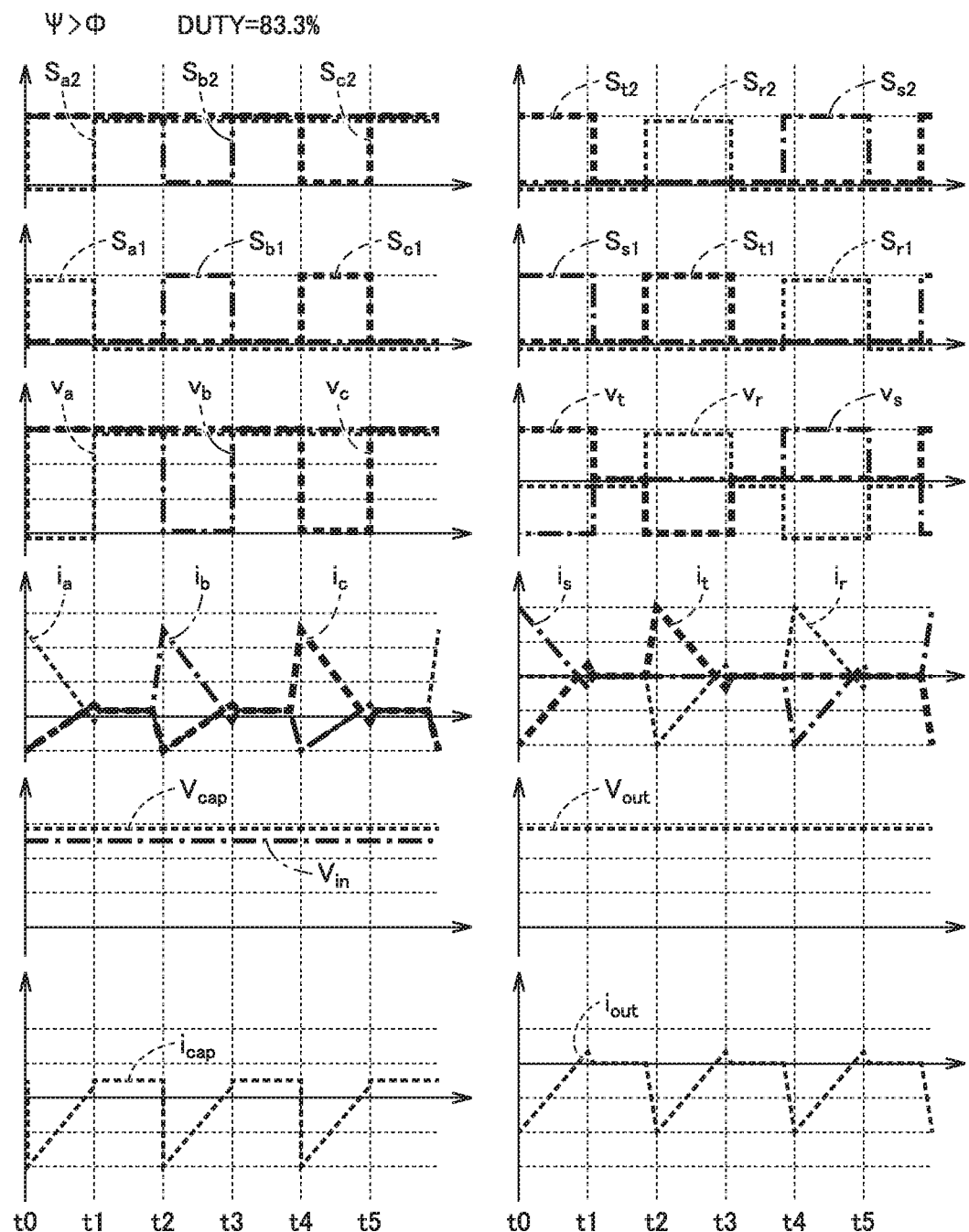
FIG. 37 is an operation waveform diagram in regenerative operation in which a leading phase shift and a relatively smaller amount of lagging phase shift are applied (Duty=83.3%).

FIG. 35 to FIG. 37 are operation waveform diagrams in regenerative operation in which a leading phase shift and a relatively smaller amount of lagging phase shift are applied. The waveform with duty ratio 50% is shown in FIG. 35, the waveform with duty ratio 16.7% is shown in FIG. 36, and the waveform with duty ratio 83.3% is shown in FIG. 37.

In the case where the same amount of electric power is transmitted, current at a moment when first bridge circuit 12 is switched changes and current suitable for ZVT increases when a lagging phase shift and a relatively smaller amount of leading phase shift are applied (FIG. 32 to FIG. 34), compared with when a lagging phase shift is merely applied in powered operation (FIG. 26 to FIG. 28).

Current at a moment when first bridge circuit 12 is switched changes and current suitable for ZVT increases when a leading phase shift and a relatively smaller amount of lagging phase shift are applied (FIG. 35 to FIG. 37), compared with when a leading phase shift is applied in regenerative operation (FIG. 29 to FIG. 31).

These phenomena can be regarded as partial regenerative operation occurring during powered operation as a whole or partial powered operation occurring during regenerative operation as a whole. This produces circulating power not contributing to the amount of transmission power as a whole, which moves back and forth in the transformer 30, and part of energy of this circulating power can be used for soft switching.

By using both of the leading and lagging phase shift amounts, current in a direction suitable for performing switching by ZVT can flow through first bridge circuit 12, and switching of the switches by soft switching can be performed. Current does not flow in the second bridge circuit 22 during turning-on or turning-off, and switching of the switches can be performed by soft switching (ZCS).

In the present embodiment, even when the duty ratio of first bridge circuit 12 fluctuates, power transmission can be continued. That is, even when voltage of primary-side power supply 60 changes, power transmission to/from secondary-side power supply 70 can be continued by changing the duty ratio.

In the zigzag-Y connection type, the upper limit of boost ratio between the voltage of primary-side power supply 60 and the voltage of secondary-side power supply 70 can be represented by Expression (5) below.

[Expression 5]

$$\frac{V_{out}}{V_{in}} \le \frac{4}{3} \cdot \frac{n}{D} \quad (5)$$

In the Y-Δ connection, the upper limit of boost ratio between the voltage of primary-side power supply 60 and the voltage of secondary-side power supply 70 can be represented by Expression (6) below.

[Expression 6]

$$\frac{V_{out}}{V_{in}} \le \frac{2}{3} \cdot \frac{n}{D} \quad (6)$$

When power transmission is performed between primary-side storage unit 11 and secondary-side storage unit 21, the voltage of primary-side storage unit 11 rises. Equality holds in Expression (5) or (6) above when the phase shift amount is not superimposed on second bridge circuit 22 and power transmission is not performed between primary-side storage unit 11 and secondary-side storage unit 21.

As an operation example of the present embodiment, the operation waveform shown in FIG. 23 will be described in detail based on the switching pattern shown in FIG. 15. In the switching pattern shown in FIG. 15, a leading phase shift and a lagging phase shift in the same amount are applied, and first bridge circuit 12 performs switching during the period of switching phase of second bridge circuit 22 (PH.2-3, PH.3-4, PH.4-5, PH.5-6, PH.6-7).

Second bridge circuit 22 has a switching state corresponding to the vector potential output by first bridge circuit 12. In general, a commutation period is provided before and after the switching state of first bridge circuit 12 is switched, and second bridge circuit 22 outputs a switching pattern corresponding to a commutation path.

At the start of commutation, ZCS turn-on is used, in which semiconductor devices turn on in a state in which no current flows. At the end of commutation, ZCS turn-off is used, in which semiconductor devices turn off in a state in which no current flows.

When ZCS turn-on allows second bridge circuit 22 to make a transition to a switching phase, the voltages of the primary-side phase terminals (connection points a, b, c) and the secondary-side phase terminals (connection points r, s, t) of transformer 30 become out of phase, so that current flows through transformer 30 in accordance with voltage across both ends.

With the switching phase of second bridge circuit 22 as a reference, the phases at both ends of the transformer are matched and balanced when the potential of the connection point in the switching target leg in first bridge circuit 12 is a neutral point. Therefore, during the period of leading phase shift, voltage is applied such that forward current of the switches flows more to the switching target leg, and current necessary for performing ZVT using soft switching increases.

When the switches in first bridge circuit 12 are switched by ZVT, the phase of voltage applied to both ends of transformer 30 changes, and the current path in the phase immediately before the switching phase naturally disappears, changing into a stable state. In this state, like the phase immediately before the switching phase, the vector potential of first bridge circuit 12 and the vector potential of second bridge circuit 22 are matched in phase and balanced.

When the current path disappears, the semiconductor device (preferably diode) turns off when the flowing current becomes zero, and ZCS turn-off is performed.

In powered operation, when the switch state of first bridge circuit 12 is Ph.2 and the switch state of second bridge circuit 22 is PH.2, the current path of first bridge circuit 12 is the overlapping of the following two current paths Ph.2(1) and Ph.2(2).

Current path Ph.2(1): (primary-side storage unit 11)→(connection point d)→(switch SW12)→(connection point a)→(transformer 30)→(connection point b)→(switch SW13)→(connection point e)→(primary-side storage unit 11)

Current path Ph.2(2): (primary-side storage unit 11)→(connection point d)→(switch SW12)→(connection point a)→(transformer 30)→(connection point c)→(switch SW15)→(connection point e)→(primary-side storage unit 11)

Current is fed to current path Ph.2(1) and current path Ph.2(2) above in parallel, whereby first bridge circuit 12 sends electric power to the secondary-side or receives electric power from the secondary-side.

In this case, current path PH.2 of second bridge circuit 22 is as follows. Current path PH.2: (secondary-side power supply 70)→(connection point v)→(switch SW23)→(connection point s)→(transformer 30)→(connection point r)→(switch SW22)→(connection point u)→(secondary-side power supply 70)

Current is fed to the above current path PH.2, whereby second bridge circuit 22 receives electric power from the primary-side or sends electric power to the primary-side.

When the switch state of first bridge circuit 12 is Ph.3 and the switch state of second bridge circuit 22 is PH.3, the current path of first bridge circuit 12 is the overlapping of the following two current paths Ph.3(1) and Ph.3(2).

Current path Ph.3(1): (primary-side storage unit 11)→(connection point d)→(switch SW12)→(connection point b)→(transformer 30)→(connection point c)→(switch SW15)→(connection point e)→(primary-side storage unit 11)

Current path Ph.3(2): (primary-side storage unit 11)→(connection point d)→(switch SW14)→(connection point a)→(transformer 30)→(connection point c)→(switch SW15)→(connection point e)→(primary-side storage unit 11)

Current is fed to current path Ph.3(1) and current path Ph.3(2) above in parallel, whereby first bridge circuit 12 sends electric power to the secondary-side or receives electric power from the secondary-side.

In this case, current path PH.3 of second bridge circuit 22 is as follows.

Current path PH.3: (secondary-side power supply 70)→(connection point v)→(switch SW25)→(connection point t)→(transformer 30)→(connection point r)→(switch SW22)→(connection point u)→(secondary-side power supply 70)

Current is fed to the above current path PH.3, whereby second bridge circuit 22 receives electric power from the primary-side or sends electric power to the primary-side.

When the switch state of first bridge circuit 12 is Ph.2 or Ph.3 and the switch state of second bridge circuit 22 is PH.2-3, current flows through the path in which current path PH.2 and current path PH.3 overlap in second bridge circuit 22, and commutation occurs from current path PH.2 to current path PH.3.

When the switch state of first bridge circuit 12 switches from Ph.2 to Ph.3, the switch SW13 conducting state changes to the SW14 conducting state.

Current path Ph.2(2) and current path Ph.3(1) are the same path.

The balance of transmission power between primary-side power supply 60 and primary-side storage unit 11 and between primary-side storage unit 11 and secondary-side storage unit 21 is automatically achieved when the switching state corresponding to a lagging phase shift extends or shrinks in accordance with the diode conducting period, if a larger amount of leading phase shift is applied.

Figure 38:
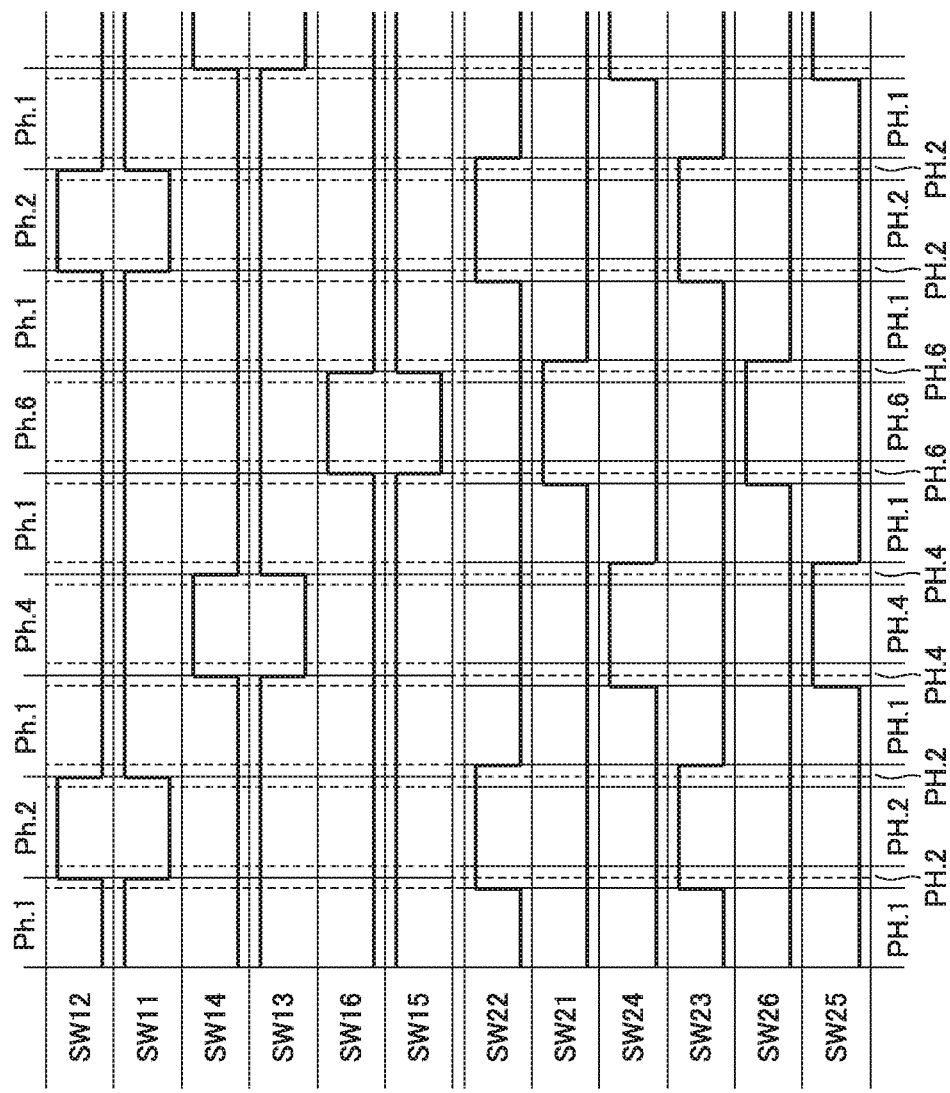
FIG. 38 is a diagram showing the order of operation phases of primary-side bridge circuit 10 and secondary-side bridge circuit 20 changing in accordance with the duty ratio (first example) of primary-side bridge circuit 10.
Figure 39:
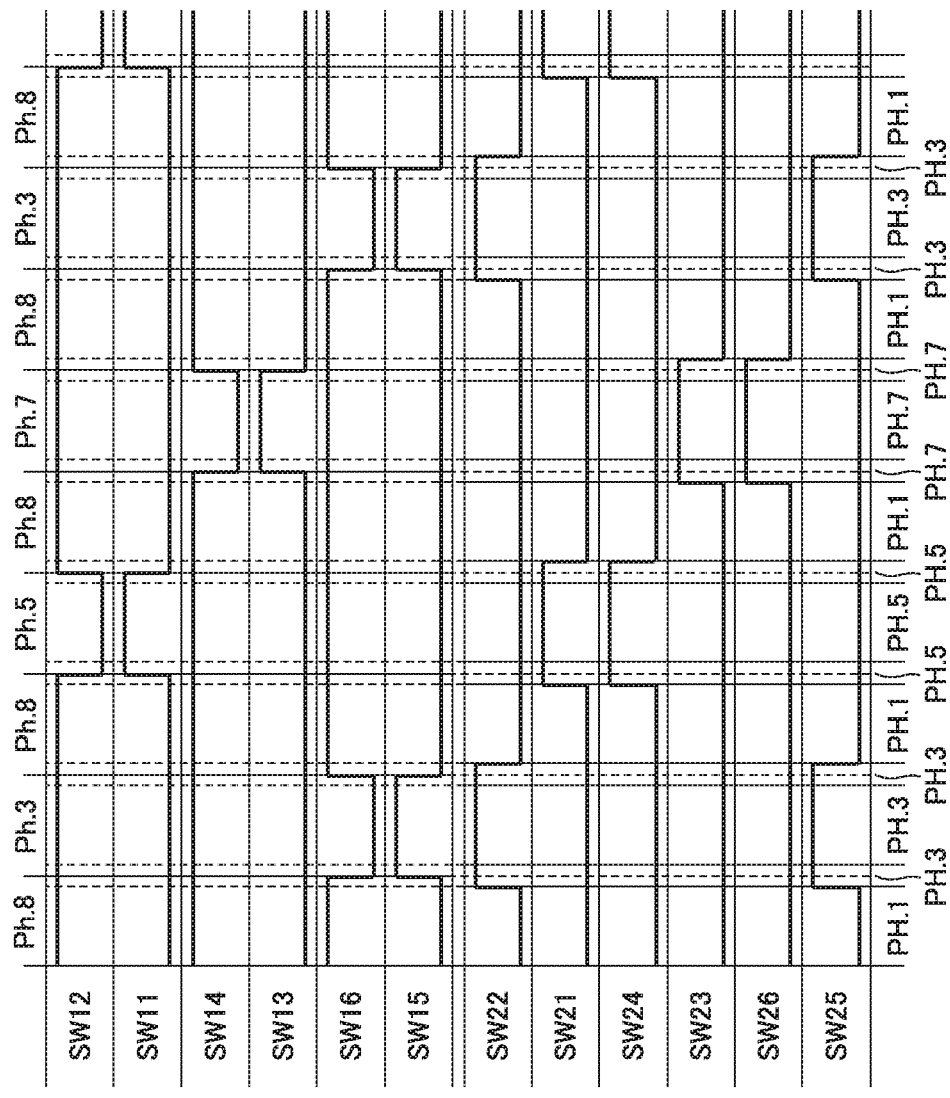
FIG. 39 is a diagram showing the order of operation phases of primary-side bridge circuit 10 and secondary-side bridge circuit 20 changing in accordance with the duty ratio (second example) of primary-side bridge circuit 10.

The pattern of the switching of current paths changes in accordance with the duty ratio. FIG. 38 and FIG. 39 are diagrams showing the order of operation phases of primary-side bridge circuit 10 and secondary-side bridge circuit 20 changing from FIG. 15 in accordance with the duty ratio of primary-side bridge circuit 10.

In the operation shown in FIG. 15, primary-side bridge circuit 10 performs switching during the period of PH7-2, PH2-3, PH3-4, PH4-5, PH5-6, PH6-7 of secondary-side bridge circuit 20. Secondary-side bridge circuit 20 performs ZCS turns-on of the leg brought into the OFF-OFF state in the immediately preceding phase, at the start of PH7-2, PH2-3, PH3-4, PH4-5, PH5-6, PH6-7. At the end of PH7-2, PH2-3, PH3-4, PH4-5, PH5-6, PH6-7, the current path in the immediately following phase is ensured because of the voltage relation between primary-side bridge circuit 10 and secondary-side bridge circuit 20, and the current path in the immediately preceding current phase disappears.

The switch is turned off at the moment when the current path disappears and current becomes zero, thereby achieving ZCS turn-off. Although it is difficult to turn off the switch exactly at the point of current zero, ZCS turn-off can be achieved practically with no problem by using the function of the antiparallel diode. For example, when synchronous rectification operation is performed in the MOSFET, the reverse current of the MOSFET is turned off (ZVS-OFF) prior to ZCS turn-off and is commutated to the anti-parallel diode, whereby zero current turn-off can be achieved by the function of the anti-parallel diode.

When the switch or the diode is cut off, the leg makes a transition to the OFF-OFF state. In a series of operations, zero current switching is established in the switching of secondary-side bridge circuit 20, zero voltage switching is established in the switching of primary-side bridge circuit 10, and soft switching operation can be established at all the time points of phase switching.

In the operation shown in FIG. 38, when PH.1 changes to PH.2, PH.4, PH.6, secondary-side bridge circuit 20 performs turn-on operation with zero current. The phase of secondary-side bridge circuit 20 switches prior to primary-side bridge circuit 10, whereby current increases in the direction in which electric power is transmitted from secondary-side bridge circuit 20 to primary-side bridge circuit 10, and current advantageous to ZVT flows through primary-side bridge circuit 10, thereby achieving soft switching by ZVT. When the primary-side bridge circuit switches from Ph.1 to Ph.2, Ph.4, Ph.6, current increases in the direction in which electric power is transmitted from primary-side bridge circuit 10 to secondary-side bridge circuit 20. At this point of time, the voltage output by primary-side bridge circuit 10 and secondary-side bridge circuit 20 to the transformer is not zero and the voltage is matched in phase, and electric power is exchanged between primary-side bridge circuit 10 and secondary-side bridge circuit 20 through the transformer in the powering or regenerative direction. After the phase of primary-side bridge circuit 10 is switched, current increases in the direction in which electric power is transmitted from secondary-side bridge circuit 20 to primary-side bridge circuit 10, and the switches of secondary-side bridge circuit 20 are turned off at the point of time when current becomes zero, whereby the phase of secondary-side bridge circuit 20 switches from PH.2, PH.4, PH.6 to PH.1.

In the operation shown in FIG. 39, when PH.1 changes to PH.3, PH.5, PH.7, secondary-side bridge circuit 20 performs turn-on operation with zero current. The phase of secondary-side bridge circuit 20 switches prior to primary-side bridge circuit 10, whereby current increases in the direction in which electric power is transmitted from secondary-side bridge circuit 20 to primary-side bridge circuit 10, and current advantageous to ZVT flows through primary-side bridge circuit 10, thereby achieving soft switching by ZVT. When the primary-side bridge circuit switches from Ph.1 to Ph.2, Ph.4, Ph.6, current increases in the direction in which electric power is transmitted from primary-side bridge circuit 10 to secondary-side bridge circuit 20. At this point of time, the voltage output by primary-side bridge circuit 10 and secondary-side bridge circuit 20 to the transformer is not zero and the voltage is matched in phase, and electric power is exchanged between primary-side bridge circuit 10 and secondary-side bridge circuit 20 through the transformer in the powering or regenerative direction. After the phase of primary-side bridge circuit 10 switches, current increases in the direction in which electric power is transmitted from secondary-side bridge circuit 20 to primary-side bridge circuit 10, and the switches of secondary-side bridge circuit 20 are turned off at the point of time when current becomes zero, whereby the phase of secondary-side bridge circuit 20 switches from PH.3, PH.5, PH.7 to PH.1.

In the foregoing description, in turning-off of second bridge circuit 22, the ZCS turn-off operation is done at the point of time when current flowing through each switch becomes zero.

However, it is often difficult in practice to detect the point of time when current flowing through the switch is exactly zero and to switch the operation. It is also difficult to control such that the amount of transmission power from primary-side power supply 60 to primary-side storage unit 11 as controlled by first bridge circuit 12 is exactly balanced with the amount of transmission power from primary-side storage unit 11 to secondary-side storage unit 21, in terms of errors in a sensor or passive device, control deviation, and the like.

Preferably, current flowing through the anti-parallel diode in the forward direction before current flowing through the switch becomes zero can be used to solve the problem in turning-off of second bridge circuit 22 in which it is difficult to strictly set the timing.

First of all, with the amount of power transmitted from primary-side power supply 60 to primary-side storage unit 11 as a reference, only lagging variable $\varphi$ is increased in the case of powered operation or only leading variable $\psi$ is increased in the case of regenerative operation, and a switching pattern by which power transmission is performed from primary-side storage unit 11 to secondary-side storage unit 21 is created. In doing so, a switching pattern is defined for transmitting power that is computationally balanced with the amount of transmission power from primary-side power supply 60 to primary-side storage unit 11.

Then, leading variable $\psi$ is increased, and the value obtained by reducing the amount of transmission power in the powering direction by a few percent to a few tens of percent (that is, the value obtained by adding transmission power in the regenerative direction in regenerative operation) in accordance with the amount of transmission power is set as a command value of the amount of transmission power from primary-side storage unit 11 to secondary-side storage unit 21.

If switching is performed in this state, the switch in second bridge circuit 22 turns off in a state in which forward current of the anti-parallel diode flows, and commutation from the switch to the diode due to ZVS occurs depending on the kind of switches. At this moment, the voltage of the connection point with transformer 30 does not change and the substantial lagging phase period prolongs. At the point of time when the flowing current becomes zero, the diode is disconnected to cause switching, resulting in ZCS operation by the anti-parallel diode.

In the foregoing description of embodiments, an ideal state free from voltage drop in switching elements and diodes in the circuit, wiring resistance, inductance, parasitic capacitance, magnetizing inductance of the transformer, and the like has been described for the sake of clarity of the spirit of the present invention. However, in the actual circuit, these are present to some extent. Various types of additional circuits for compensating for these resistance components, capacitance components, and inductance components have been known, and addition of these additional circuits to the configuration of the present invention and modification of the circuit in the equivalent range are made as appropriate.

As described above, according to the first embodiment, the operation is adapted to power supply voltage fluctuation by adjusting the duty ratio of first bridge circuit 12 in accordance with voltage fluctuation of primary-side power supply 60.

Furthermore, since the switching pattern of second bridge circuit 22 is configured by handling the leading phase shift and the lagging phase shift at the same time with reference to the switching pattern of first bridge circuit 12, soft switching can be implemented even when the power transmission amount is small, leading to reduction in switching loss.

In addition, when it is difficult in practice to strictly define the phase shift amount, a larger amount of leading phase shift is set, and commutation to the anti-parallel diode is used to perform soft switching. This approach can be employed to flexibly cope with an error in practice, leading to reduction in switching loss.

In soft switching, exciting current of the transformer also can be used. For example, when the switch of the primary-side lower arm turns on, exciting current changes such that forward current flowing through the lower arm increases. Therefore, if there is no biased magnetization and the average value of exciting current is kept to zero, exciting current can be used for soft switching. Such soft switching operation using exciting current of the transformer has already been examined in LLC circuits and the like and in practical use in some applications.

Figure 51:
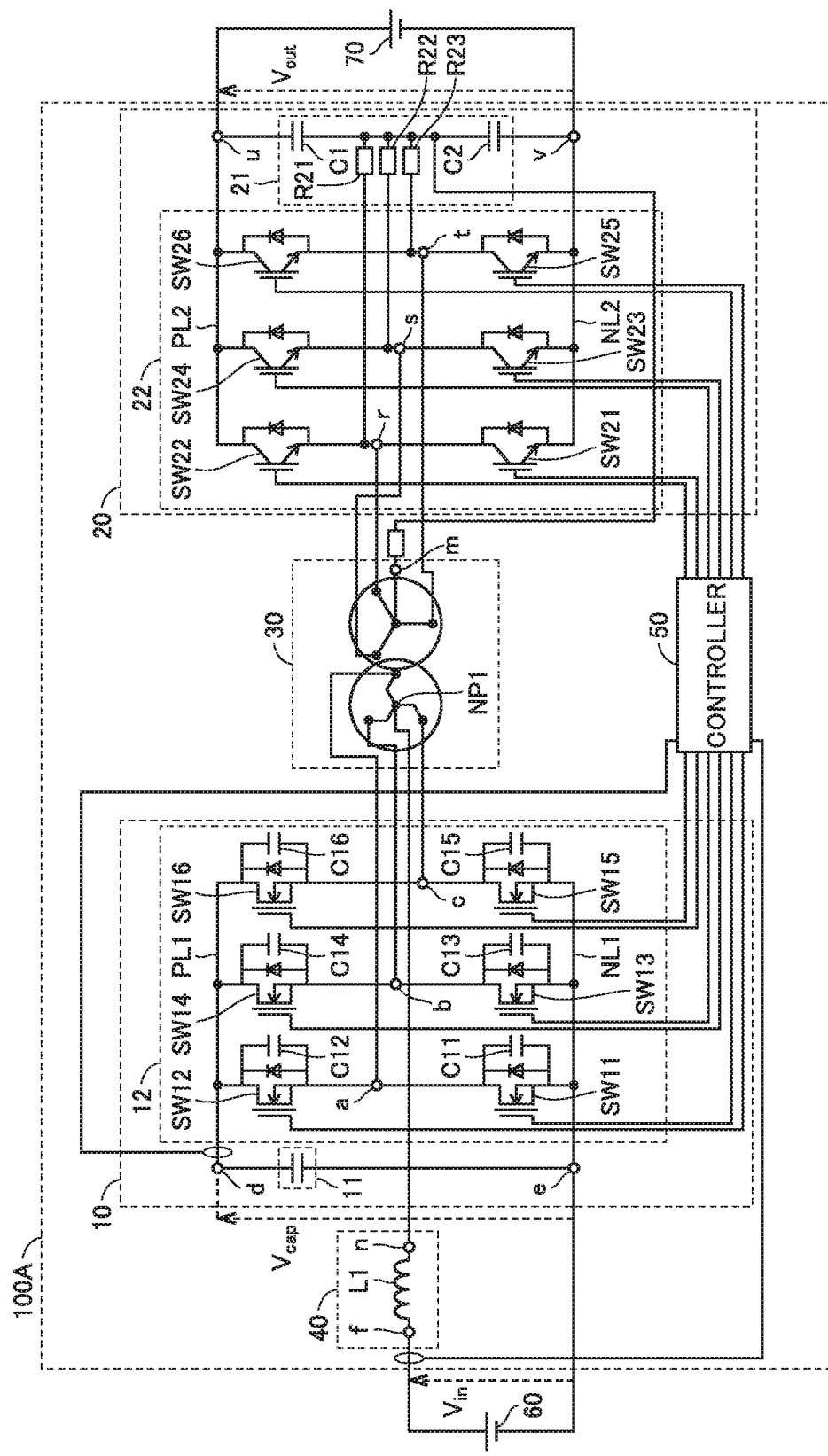
FIG. 51 is a diagram showing the positions of resistors for suppressing voltage oscillation.

In a period of time in which a set of switches or diodes of the upper and lower arms of secondary-side bridge circuit 20 is in the OFF-OFF state, the connection point of the upper and lower arms of secondary-side bridge circuit 20 is connected only with the phase terminal of transformer 30 in the electrical circuit and electrically isolated form other wiring. In this state, at the connection point of the upper and lower arms of secondary-side bridge circuit 20, voltage may easily fluctuate with minute current flowing into the connection point or minute current flowing out of the connection point. This state may cause, for example, a resonance phenomenon due to the parasitic capacitance component of the switches or diodes of the upper and lower arms of secondary-side bridge circuit 20 and the leakage inductance component of transformer 30. Triggered by such a resonance phenomenon, the voltage of the connection point of the upper and lower arms of secondary-side bridge circuit 20 violently oscillates to cause a problem of electromagnetic radiation noise. When this problem is unacceptable in terms of EMC, for example, resistors such as resistors R21, R22, R23 in FIG. 51 are added to DC/DC converter circuit 100 according to the first embodiment to form a DC/DC converter circuit 100A, thereby suppressing oscillation of voltage. When resistors are added, the addition of resistors causes loss. Therefore, the resistance is judged based on the range in which the oscillation phenomenon or other problems are acceptable, and it is preferable to set a resistance as large as possible.

Second Embodiment

In the first embodiment, when only a lagging phase shift is adopted, the switching element of secondary-side bridge circuit 20 merely operates in synchronization with the anti-parallel diode. In a second embodiment, the switching elements of secondary-side bridge circuit 20 are replaced by diodes.

(Description of Overall Configuration)

Figure 40:
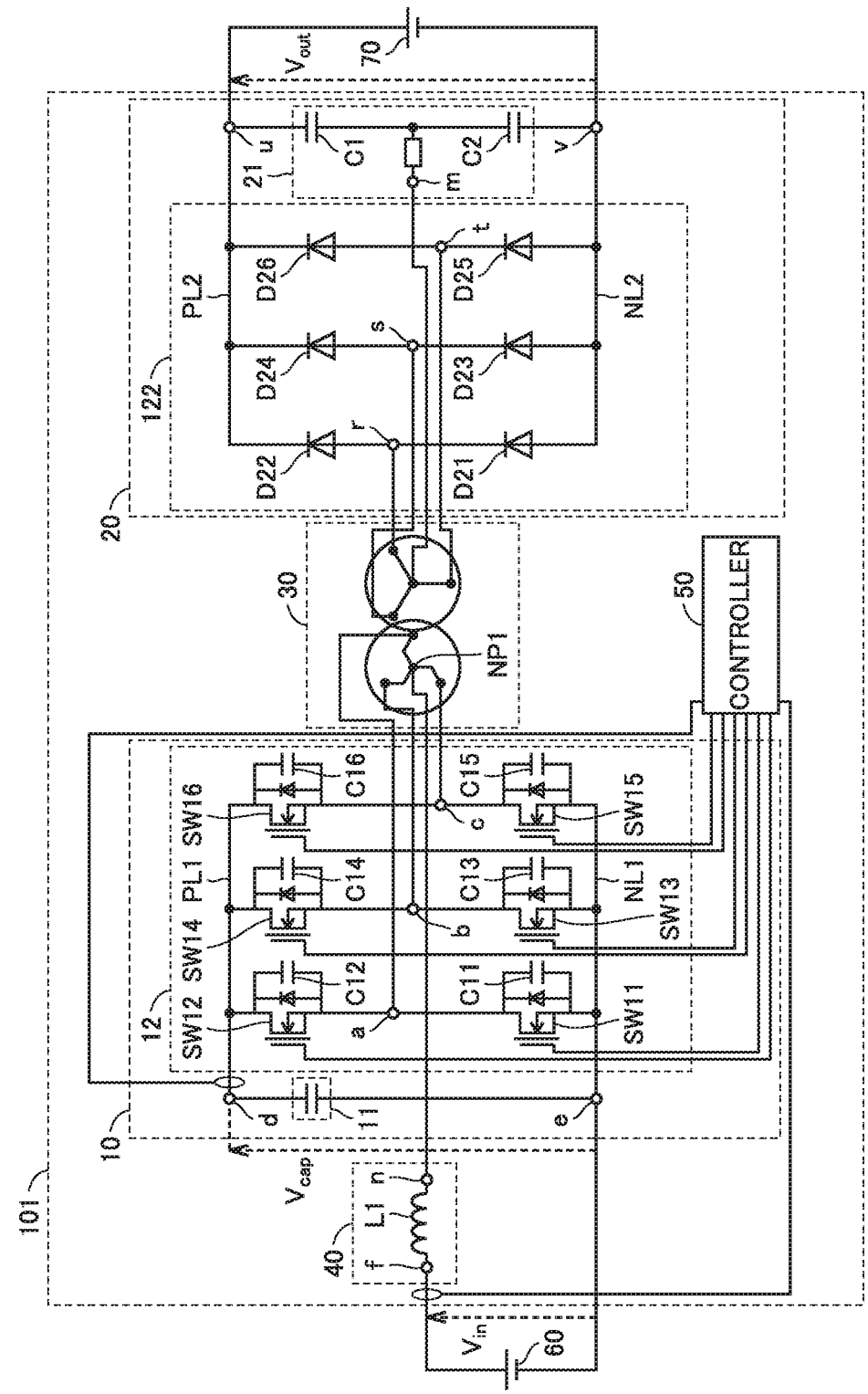
FIG. 40 is a main circuit configuration diagram of DC/DC converter 101 in a second embodiment.

FIG. 40 is a main circuit configuration diagram of a DC/DC converter 101 of the second embodiment. FIG. 40 shows a modification in which the switching elements in secondary-side bridge circuit 20 in the first embodiment are replaced by diodes. In this case, the power transmission direction is unidirectional from the primary-side toward the secondary-side.

DC/DC converter 101 in the second embodiment includes a primary-side bridge circuit 10, a secondary-side bridge circuit 20, a transformer 30, a reactor unit 40, and a controller 50.

DC/DC converter 101 is connected between a direct-current primary-side power supply 60 and a direct-current secondary-side power supply 70.

One terminal f of reactor unit 40 is connected to the high voltage side of primary-side power supply 60. Low voltage-side terminal e of primary-side bridge circuit 10 is connected to the low voltage side of primary-side power supply 60. The other terminal n of reactor unit 40 is connected to neutral point NP1 of transformer 30.

Primary-side storage unit 11 is connected between low voltage-side terminal e and high voltage-side terminal d of primary-side bridge circuit 10. Primary-side storage unit 11 includes an energy storing element such as capacitor or battery and has the function as a voltage source.

High voltage-side terminal u of secondary-side bridge circuit 20 is connected to the high voltage side of secondary-side power supply 70. Low voltage-side terminal v of secondary-side bridge circuit 20 is connected to the low voltage side of secondary-side power supply 70.

Secondary-side storage unit 21 is connected to high voltage-side terminal u of secondary-side bridge circuit 20 and low voltage-side terminal v of secondary-side bridge circuit 20.

Secondary-side storage unit 21 includes an energy storing element such as capacitor or battery and has the function as a voltage source. Secondary-side storage unit 21 is connected to the secondary-side neutral point terminal of transformer 30 at connection point m.

Primary-side bridge circuit 10 has a first bridge circuit 12. First bridge circuit 12 has six switching elements SW11, SW12, SW13, SW14, SW15, and SW16 and capacitors C11, C12, C13, C14, C15, and C16 connected in parallel with the respective switching elements. However, external capacitors C11, C12, C13, C14, C15, C16 are not always necessary and can be substituted with parasitic capacitances of the switching elements at equivalent positions in the circuit configuration.

In FIG. 40, the switching elements are depicted by the symbol of MOSFET or IGBT. However, the switching elements as depicted in the circuit diagram are not necessarily used. A variety of switching elements can be applied as desired, and not only silicon-based elements but also SiC-MOSFETs and GaN-HEMTs based on wideband gap semiconductor such as SiC and GaN may be used as switching elements.

At connection point a, the high voltage side of switching element SW11 and the low voltage side of switching element SW12 are connected. At connection point b, the high voltage side of switching element SW13 and the low voltage side of switching element SW14 are connected. At connection point c, the high voltage side of switching element SW15 and the low voltage side of switching element SW16 are connected.

First bridge circuit 12 is connected to the primary-side phase terminals of transformer 30 at connection point a, connection point b, and connection point c.

In the second embodiment, secondary-side bridge circuit 20 has a second bridge circuit 122. Second bridge circuit 122 has six diodes D21, D22, D23, D24, D25, and D26.

The cathode of diode D21 and the anode of diode D22 are connected at connection point r. The cathode of diode D23 and the anode of diode D24 are connected at connection point s. The cathode of diode D25 and the anode of diode D26 are connected at connection point t.

Second bridge circuit 122 is connected to the secondary-side phase terminals of transformer 30 at connection point r, connection point s, and connection point t.

The configuration method of the three-phase transformer will now be described. Transformer 30 is configured such that zero-phase current when Clarke transformation ($\alpha\beta 0$ transformation) is performed on phase currents on the primary side does not induce magnetic flux inside the core of the transformer, and has a phase difference between the primary side and the secondary side.

Figure 41:
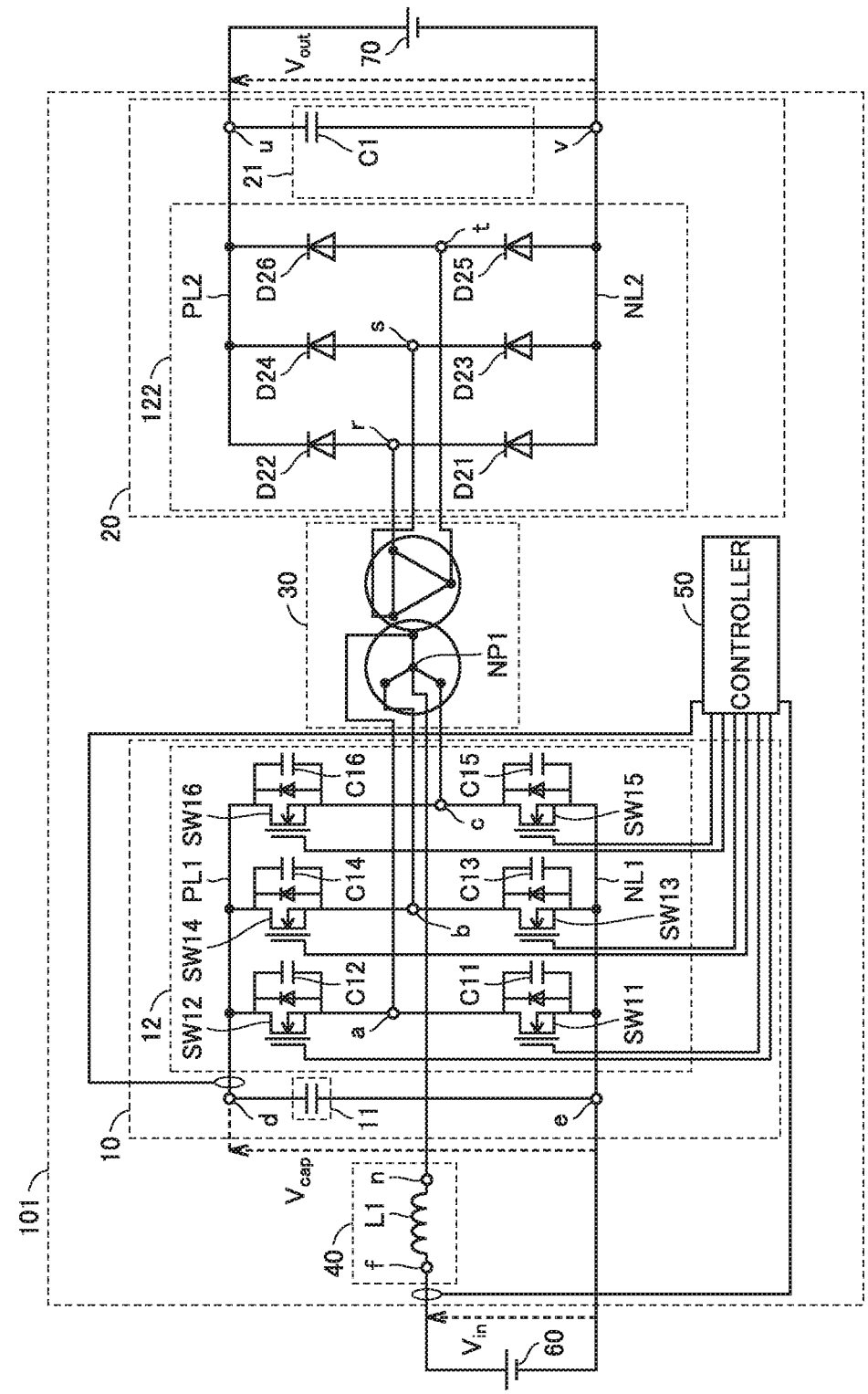
FIG. 41 is a main circuit configuration diagram of a first modification of DC/DC converter 101 in the second embodiment.

FIG. 41 is a main circuit configuration diagram of a first modification of DC/DC converter 101 in the second embodiment. FIG. 40 shows a case where transformer 30 is configured in the zigzag-Y connection type, whereas FIG. 41 shows a circuit diagram in a case where transformer 30 is configured in the Y-$\Delta$ connection type. The other part of the configuration in the modification in FIG. 41 is similar to the DC/DC converter in FIG. 40 and a description is not repeated.

The configuration of transformer 30 is susceptible to other modifications in addition to the configuration shown in FIG. 41. The configuration of a combination of a plurality of cores (toroidal cores) as shown in FIG. 3 or FIG. 4, the configuration using a core with a symmetric magnetic circuit as shown in FIG. 5, or the configuration implemented with a three-pillar-shaped core such as a three-phase transformer with commercial frequency as illustrated in FIG. 6 or FIG. 7 may be employed. Connection points a, b, c, n, r, s, t in FIG. 4 to FIG. 7 respectively correspond to connection points a, b, c, n, r, s, t in FIG. 40 or FIG. 41.

When cores are magnetically coupled to each other, a symmetric configuration of a magnetic circuit as shown in FIG. 5 is desirable. Alternatively, as shown in FIG. 6 or FIG. 7, a three-pillar-shaped core such as a three-phase transformer with commercial frequency may be used to cancel magnetic flux produced by zero-phase current.

Specifically, when a Y-$\Delta$ configuration as shown in FIG. 4 is employed using a plurality of cores, a magnetic field produced by zero-phase current flowing through the primary-side winding induces current in the secondary-side winding, and a magnetic field produced by circulating current flowing in the $\Delta$ connection of the secondary-side winding and a magnetic field produced by current flowing in the primary-side winding are balanced, so that flux linkage caused by zero-phase current flowing through the primary-side winding is canceled.

As shown in FIG. 3 or FIG. 6, when a transformer is configured in the zigzag-Y connection type in which the primary-side winding is divided into plural parts, currents flowing through the primary-side winding can cancel magnetic flux and therefore zero-phase current does not induce current in the secondary-side winding, advantageously reducing copper loss. In the secondary-side winding, a neutral point is created, which is electrically connected to the neutral point of the secondary-side bus voltage, thereby suppressing common mode potential oscillation of the secondary-side winding.

As shown in FIG. 4 or FIG. 7, when a transformer is configured in the Y-$\Delta$ connection type, a two-winding transformer having a simple structure or an open-end connection three-phase transformer can be used. This configuration is advantageous in that design and manufacturing are easy. However, since circulating current flowing inside the $\Delta$ connection occurs in proportion to zero-phase current in the primary-side winding, copper loss increases and, in addition, there are disadvantages such as the possibility of causing biased magnetization due to voltage drop of winding resistance. When cores are magnetically coupled to configure a single core, induction of secondary-side winding current by zero-phase current in the primary-side winding does not occur even in the Y-$\Delta$ configuration.

In order to suppress magnetic flux induced by zero-phase current of the primary-side terminal, a matching magnetic field may be induced on the magnetic path of a magnetic field produced in the core, or magnetic resistance may be equivalently increased by an open magnetic path to prevent magnetic flux. Both of these methods are examples of the method of preventing a magnetic field produced in the core by zero-phase current of the primary-side terminal from inducing magnetic flux, and any other configurations that achieve a similar function may be employed.

The method of cancelling magnetic flux produced by zero-phase current and the method of shifting a phase between the primary-side winding and the secondary-side winding have been long discussed commonly in the field of three-phase transformers with commercial frequency.

For the configuration of a transformer and a peripheral auxiliary element (for example, an externally inserted reactor supplementing leakage inductance), change equivalent to the configuration in an electric circuit or a magnetic circuit or an electric/magnetic circuit combination may be made as appropriate.

When magnetic flux produced by zero-phase current is canceled, the potential of terminal n connected to neutral point NP1 of transformer 30 is the average of potentials applied to connection point a, connection point b, and connection point c connected to the primary-side phase terminals of transformer 30, because of energy limitation.

In practice, voltage caused by the leakage inductance component is present between the terminals of transformer 30, and the magnetic flux is not always canceled completely due to error in winding. Therefore, the potential of terminal n does not always agree with the average of potentials of connection point a, connection point b, and connection point c. In the following description, it is assumed that the potential of terminal n agrees with the average of potentials applied to connection point a, connection point b, and connection point c, for the sake of simplicity, although the present invention is not limited thereto.

(Description of Operation)

The operation of the DC/DC converter will now be described. The following description is premised on an ideal state with no variation in leakage inductance.

In an ideal state with no variation in leakage inductance, with no individual differences among switching elements, and with no variation in wiring impedance, the switching element of each phase of first bridge circuit 12 operates with the same duty ratio.

As shown in FIG. 10, assume that the leg of each phase of first bridge circuit 12 is switching based on the same duty ratio. The timings when the phase legs of first bridge circuit 12 switch the switches are shifted by ⅓ of the switching period T, and the voltages applied to connection point a, connection point b, and connection point c are rectangular wave voltages with phases shifted by 120°.

The operation of first bridge circuit 12 as described above is called multiphase operation or carrier phase shift operation in a parallel-driven bidirectional chopper circuit and is similar to commonly known methods.

In FIG. 10, the waveforms of the phases are phase-shifted by ⅓ of the switching period with reference to the rise time of voltages of the connection points of the phases. This is an example of phase shift methods, and the voltage fall time may be used as a reference, or the center of the upper arm ON time or the center of the lower arm ON time may be used as a reference.

In a common PWM method using triangular wave carrier, the phase of triangular wave carrier for generating a switching pattern is phase-shifted by 1200 to implement a similar multiphase operation.

However, when leakage inductance or the number of turns of the transformer varies, an asymmetric distortion between the phases occurs in current that transmits electric power on the primary side and the secondary side, in a coordinate space when phase voltages and phase currents of transformer 30 undergo αβ0 transformation. This current distortion is produced by the difference between the primary-side voltage and the secondary-side voltage, and in order to correct this, it is necessary to adjust voltage output by first bridge circuit 12 or second bridge circuit 122 or both. In this case, it is not always necessary to phase-shift exactly by 120° and it is possible to adjust the amount of phase shift for correction.

As shown in FIG. 10, when first bridge circuit 12 outputs a voltage phase-shifted by 120° to each connection point of transformer 30, the average value of voltages applied to connection point a, connection point b, and connection point c is output to neutral point NP1 of transformer 30, and rectangular wave voltage Vne with amplitude ⅓ and three times frequency is output to terminal n of reactor L1.

Since primary-side power supply 60 is connected to one terminal f of reactor unit 40 and neutral point NP1 of transformer 30 is connected to the other terminal n, the difference between power supply voltage Vin of primary-side power supply 60 and the average value of output voltage of first bridge circuit 12 is applied to reactor L1.

The duty ratio of each phase of first bridge circuit 12 is increased/reduced and adjusted by the same amount for all of three phases, whereby voltage applied to reactor L1 can be controlled irrespective of unbalanced voltage between phases responsible for biased magnetization of transformer 30.

In other words, current flowing through reactor L1 can be controlled by adjusting the average value of the phase duty ratios of first bridge circuit 12. Primary-side zero-phase current of transformer 30 connected to first bridge circuit 12 is determined by the average value of output duty ratios of the phases of first bridge circuit 12.

Ideally, first bridge circuit 12 can control zero-phase current only by controlling the average value of output duty ratios. However, when biased magnetization occurs in transformer 30, the biased magnetization phenomenon can be suppressed by changing the balance of duty ratios of the phases.

First bridge circuit 12 performs multiphase operation (carrier phase shift operation). Therefore, when the phase currents of transformer 30 flow to primary-side storage unit 11, a period of time in which current of only one of the a phase, the b phase, and the c phase flows exists at the time out of phase by 120° during one period of switching, or a period of time in which current of only one of the a phase, the b phase, and the c phase does not flow exists at the time out of phase by 120 during one period of switching.

Therefore, when current flowing through primary-side storage unit 11 is detected in controller 50, it is detected while the phase during one period of switching is shifted by 120°, whereby variation in phase currents of transformer 30 can be detected. That is, primary-side storage unit 11 is provided with a current detecting sensor to detect biased magnetization current of transformer 30.

As a matter of course, it is also possible to detect biased magnetization current by detecting all of the phase currents of the three-phase transformer.

In general, since the magnetizing inductance of a transformer is extremely large, the response speed necessary for suppressing biased magnetization is sufficiently slower than the response speed of current control of reactor L1. Furthermore, when αβ0 transformation is performed in the range from terminal f connected to the high voltage side of primary-side power supply 60 to primary-side connection point a, connection point b, and connection point c of transformer 30, biased magnetization current and zero-phase current can be separated and considered independently (FIG. 11). At this moment, it is the average value of the phase duty ratios that affects the zero-phase current, and it is a deviation of the phase duty ratios from the average value that affects the biased magnetization current.

Here, in current control for reactor L1, PI control is performed such that current of reactor L1 follows a command value, where current flowing through reactor L1 or zero-phase current of transformer 30 is a detected value and the average duty ratio of first bridge circuit 12 is the amount of operation. By contrast, in control of suppressing biased magnetization current, PI control is performed such that biased magnetization current becomes zero, where biased magnetization current is a detected value and a deviation from the average value of the phase duty ratios is the amount of operation. Accordingly, the current control for reactor L1 and the control of suppressing biased magnetization current can be considered independently.

In an ideal state free from biased magnetization, current passing through reactor L1 is divided equally into three and flows through the primary-side winding of transformer 30 as zero-phase current. However, in actuality, since biased magnetization current flows through the three-phase transformer, current of reactor L1 is not divided into exactly three equal parts.

The zero-phase current flowing through the primary-side winding does not transmit electric power to second bridge circuit 122. When only the zero-phase current is extracted based on the principle of superposition, primary-side bridge circuit 10 behaves as if it is a three-parallel bidirectional chopper circuit. This three-parallel bidirectional chopper circuit functions as a transformer by partially coupling the reactors of bidirectional chopper circuits connected in parallel and cancelling magnetic flux, in which the volume of the magnetic element as a whole is reduced compared with no coupling.

The power transmission amount between primary-side power supply 60 and primary-side storage unit 11 can be controlled by controlling current of reactor L1 by the duty ratio of first bridge circuit 12.

First bridge circuit 12 can perform soft switching by using exciting current flowing through the transformer 30 and the phase currents.

In the present embodiment, the switching pattern of first bridge circuit 12 is kept whereby the voltage of primary-side storage unit 11 goes up and down. The voltage of primary-side storage unit 11 goes up and down whereby the amount of electric power flowing from first bridge circuit 12 to second bridge circuit 122 through transformer 30 goes up and down. Therefore, electric power can be sequentially transmitted from primary-side power supply 60 to secondary-side power supply 70.

(Description of Operation Effect)

The operation effect of the DC/DC converter according to the second embodiment will now be described.

First bridge circuit 12 performs normal switching by triangular wave carrier. By contrast, the diodes of second bridge circuit 122 are conducting with a phase shift in the lagging direction.

In the present embodiment, transformer 30 generates a phase difference of 30° between the primary-side phase terminals and the secondary-side phase terminals, first bridge circuit 12 outputs a vector potential shown in FIG. 16, and second bridge circuit 122 outputs a vector potential shown in FIG. 17, whereby electric power is exchanged between primary-side storage unit 11 and secondary-side storage unit 21.

The symbols shown in FIG. 16 indicate as follows: "1" refers to the upper arm ON and the lower arm OFF, and "−1" refers to the upper arm OFF and the lower arm ON. For example, Ph.2(1, −1, −1) corresponds to the main operation phase Ph.2 in FIG. 12. Ph.2(1, −1, −1) means the upper arm ON and the lower arm OFF in the leg having connection point a, the upper arm OFF and the lower arm ON in the leg having connection point b, and the upper arm OFF and the lower arm ON in the leg having connection point c.

The vector potential shown in FIG. 17 has a point corresponding to a state in which the leg of second bridge circuit 122 outputs a neutral point potential (PH.2-3, PH.3-4, PH.4-5, PH.5-6, PH.6-7, PH.7-2).

In the circuit in FIG. 40, since second bridge circuit 122 is unable to output a neutral point potential, the OFF-OFF state of the diodes of second bridge circuit 122 (defined as a state in which the upper and lower diodes of the leg are both OFF) is regarded as a state in which the leg outputs a neutral point potential.

In the circuit in FIG. 40, the symbols shown in FIG. 17 indicate as follows: "1" refers to the upper arm ON and the lower arm OFF, "−1" refers to the upper arm OFF and the lower arm ON, and "0" refers to the upper arm and the lower arm OFF. For example, PH.2(1, −1, 0) corresponds to the main operation phase PH.2 in FIG. 13 and indicates the upper arm ON and the lower arm OFF in the leg having connection point r, the upper arm OFF and the lower arm ON in the leg having connection point s, and the upper arm and the lower arm OFF in the leg having connection point t.

In operation of DC/DC converter 101, it is necessary to apply a vector potential with the same phase to transformer 30 having a phase difference of 30° between the primary-side phase terminals and the secondary-side phase terminals.

Transformer 30 has a phase difference of 30° between the primary-side phase terminals and the secondary-side phase terminals. The state in which a vector potential with the same phase is applied to the primary-side phase terminals and the secondary-side phase terminals of transformer 30 corresponds to a state in which the connection point potential of one leg of first bridge circuit 12 or second bridge circuit 122 attains a neutral point potential.

Thus, the leg of second bridge circuit 122 has the OFF-OFF state which corresponds to the state of outputting a neutral point potential. The connection point potential of the leg in the OFF-OFF state in second bridge circuit 122 is determined by the vector potential output by first bridge circuit 12. When the switching state of first bridge circuit 12 is Ph.2, Ph.3, Ph.4, Ph.5, Ph.6, Ph.7, if the switching state of second bridge circuit 122 is PH.2, PH.3, PH.4, PH.5, PH.6, PH.7 correspondingly, the phases of both ends of transformer 30 are matched, and the connection point of the leg in the OFF-OFF state attains a neutral point potential.

However, variation in leakage inductance and unintended coupling inductance, and a parasitic component exist in the three-phase transformer. Therefore, the vector potential output by first bridge circuit 12 is not always transmitted as it is to second bridge circuit 122, and the connection point potential of the leg in the OFF-OFF state is not always a neutral point potential. It is definitely possible that the potential of the leg in the OFF-OFF state is shifted from the neutral point potential or the potential oscillates due to switching.

Possible approaches for suppressing the effect due to variation in transformer 30 include a method of enhancing the coupling of the three-phase transformer and separately inserting a reactor at a position corresponding to leakage inductance and a method of adjusting the amount of each phase shift between the secondary-side phases.

Current does not flow in the leg in the OFF-OFF state. Therefore, current flows through the switches in the ON state in the remaining two legs not in the OFF-OFF state in second bridge circuit 122, whereby power transmission occurs between primary-side storage unit 11 and secondary-side storage unit 21.

(Description of Operation Effect)

Figure 43:
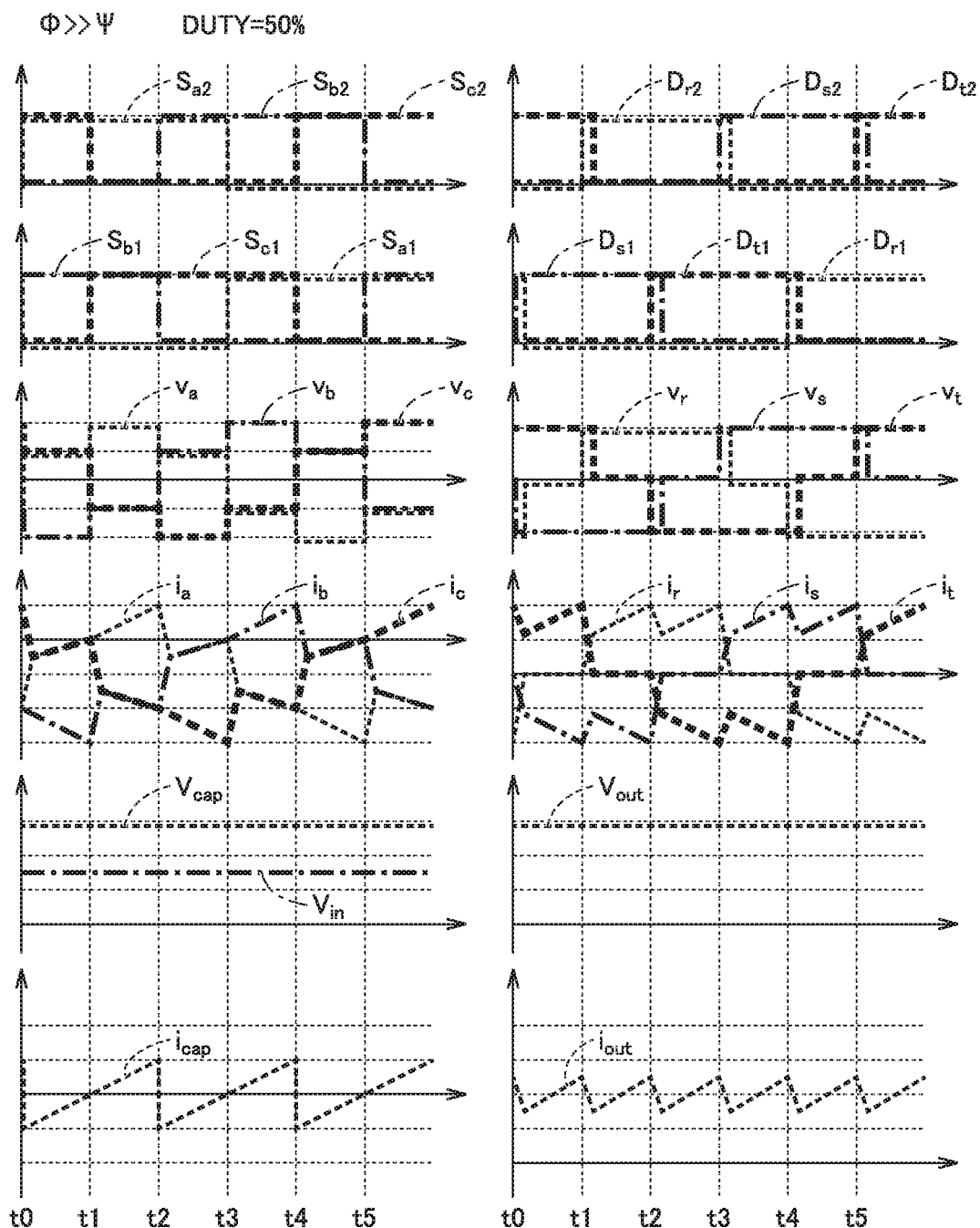
FIG. 43 is a diagram showing an example of the switching pattern in the second embodiment (Duty=50%).

The operation effect of the DC/DC converter will now be described in more detail. FIG. 43 is a diagram showing an example of the switching pattern in the second embodiment. The switching pattern shown in FIG. 43 shows a state in which diodes of second bridge circuit 122 are conducting, behind first bridge circuit 12.

Figure 44:
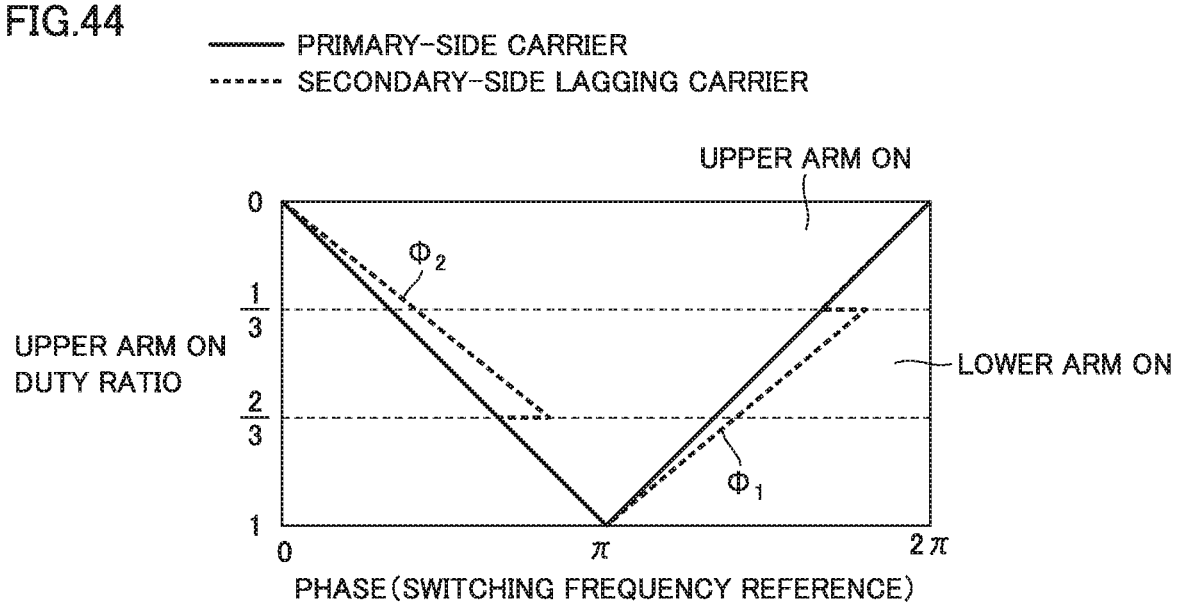
FIG. 44 is a diagram for explaining a lagging phase shift amount in the second embodiment.

The amount of phase shift to be applied between the primary-side carrier and the secondary-side carrier is determined with reference to the primary-side carrier. A variety of methods for determining the applied amount of phase shift for secondary-side bridge circuit 22 are possible. For example, the lagging phase shift amount is defined as Expression (7) to (8) below. Here, lagging variable φ is defined, and the average value of the on duty ratio of the upper arm of first bridge circuit 12 is denoted as D. Then, the relation between the primary-side carrier and the secondary-side carrier is as shown in FIG. 44. In FIG. 44, the state in which the phase shift amount is zero refers to a state in which the secondary-side carrier overlaps the primary-side carrier as a reference.

[Expression 7]

$$\Phi_1 = \begin{cases} 0 & \left(\frac{2}{3} < D < 1\right) \\ D \cdot \phi & \left(0 < D < \frac{2}{3}\right) \end{cases} \quad (7)$$

[Expression 8]

$$\Phi_2 = \begin{cases} (1-D) \cdot \phi & \left(\frac{1}{3} < D < 1\right) \\ 0 & \left(0 < D < \frac{1}{3}\right) \end{cases} \quad (8)$$

Figure 45:
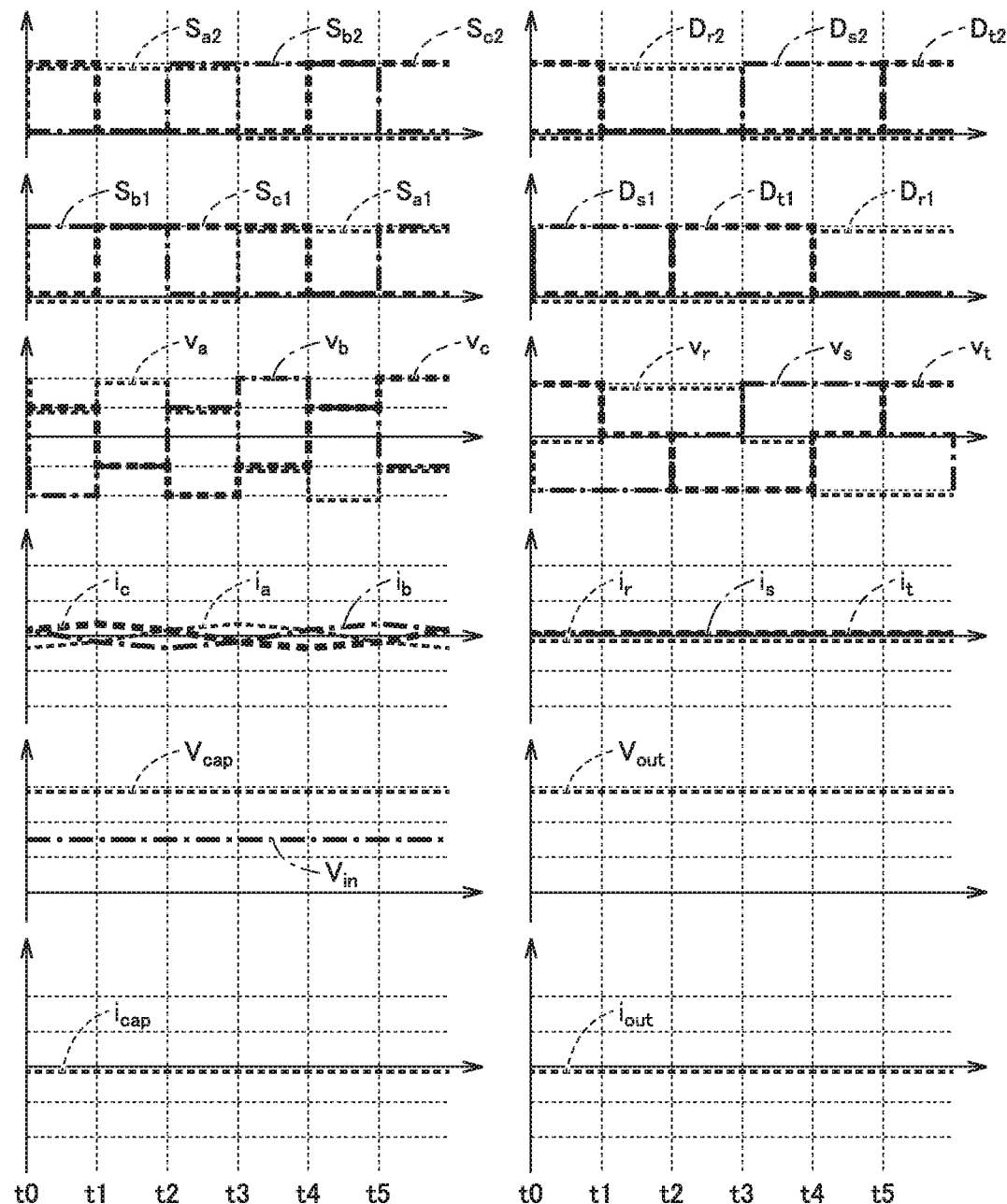
FIG. 45 is an operation waveform diagram with no transmission power (Duty=50%).
Figure 46:
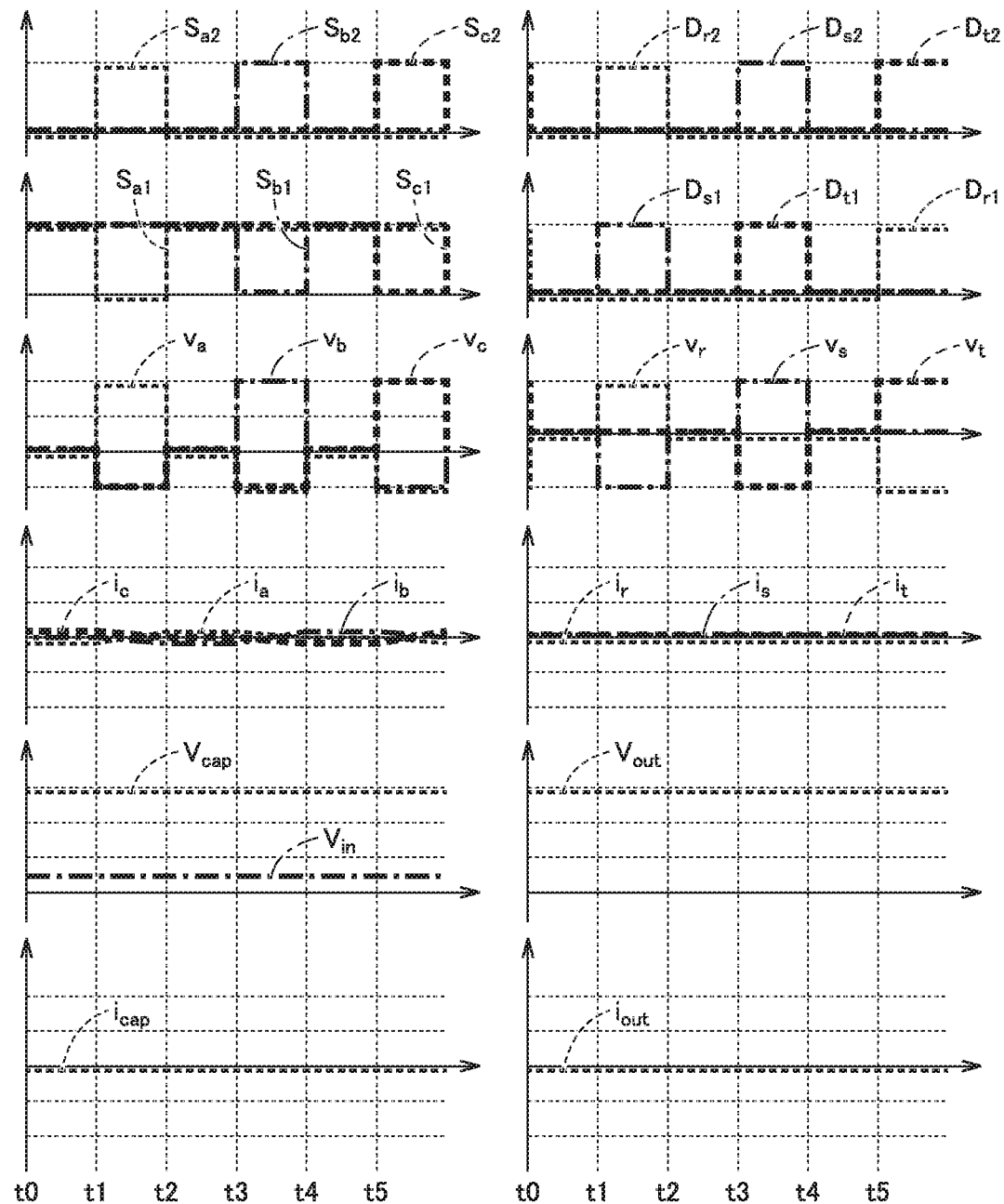
FIG. 46 is an operation waveform diagram with no transmission power (Duty=16.7%).
Figure 47:
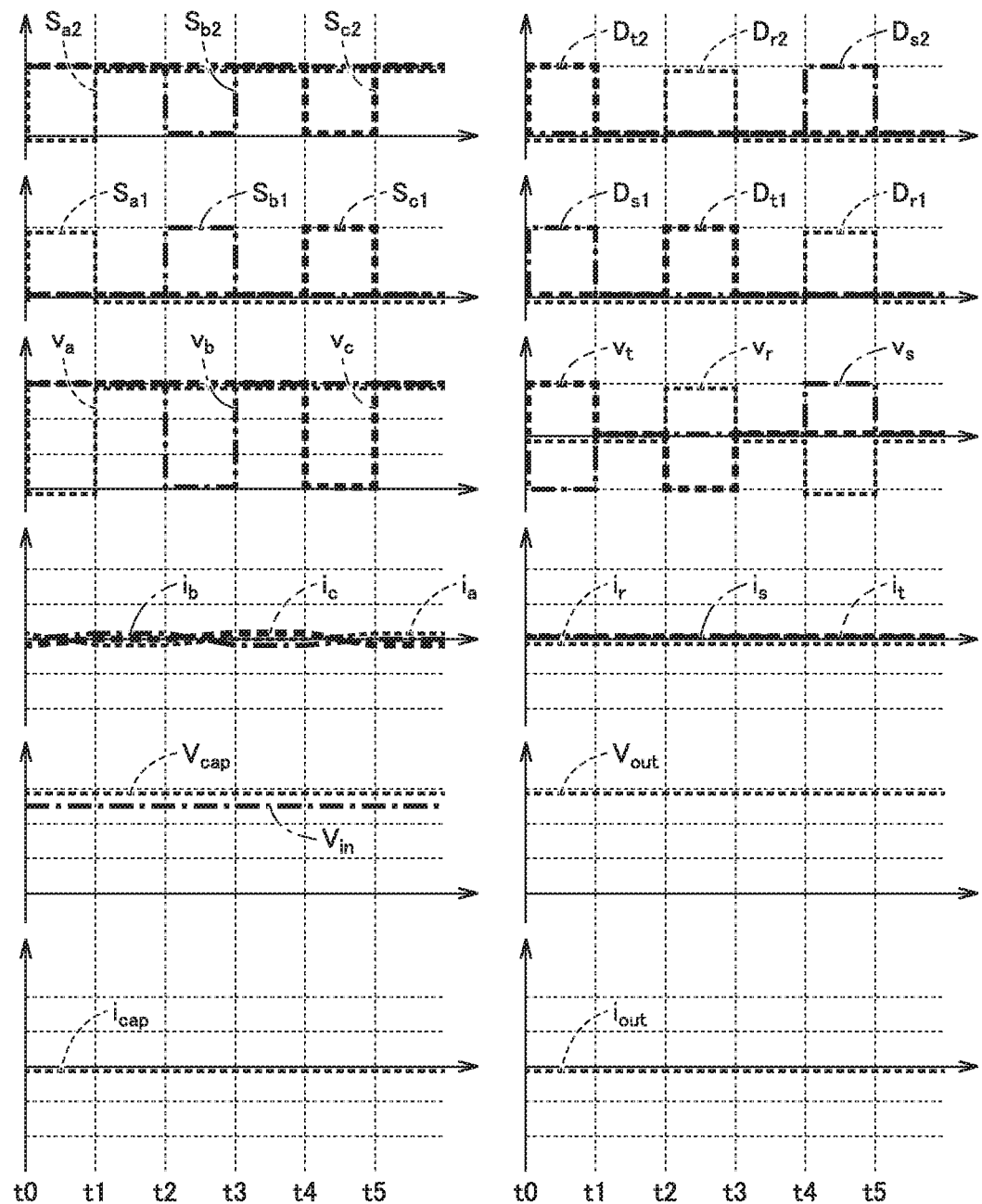
FIG. 47 is an operation waveform diagram with no transmission power (Duty=83.3%).

FIG. 45 to FIG. 47 are waveform diagrams in the absence of transmission power. First bridge circuit 12 and second bridge circuit 122 output vector potentials in a correspondence relation to each other. FIG. 45 shows a waveform when the on duty ratio of the upper arm in first bridge circuit 12 is 50%, FIG. 46 shows a waveform when the duty ratio is 16.7%, and FIG. 47 shows a waveform when the duty ratio is 83.3%.

When voltage is applied to transformer 30 by first bridge circuit 12 (Ph.2, Ph.3, Ph.4, Ph.5, Ph.6, Ph.7), the state (PH.2, PH.3, PH.4, PH.5, PH.6, PH.7) in which two legs are conducting that corresponds to each case in second bridge circuit 122 is the "vector potentials in a correspondence relation".

When all of three legs of first bridge circuit 12 are in the upper arm ON state or the lower arm ON state (Ph.1, Ph.8), voltage is not applied to transformer 30. In this case, the diodes of second bridge circuit 122 enter the OFF-OFF state (PH.1) in all of the legs.

In FIG. 45, FIG. 46, and FIG. 47, the ratio between the voltage of primary-side storage unit 11 and the voltage of secondary-side storage unit 21 is 1:4n/3 when the turns ratio of the three-phase transformer with the zigzag-Y connection shown in FIG. 40 is 1:n, and 1:2n/3 when the turns ratio of the three-phase transformer with Y-Δ connection shown in FIG. 41 is 1:n.

These states with no power transmission are defined as a state in which the voltage of primary-side storage unit 11 and the voltage of secondary-side storage unit 21 are balanced. In the present embodiment, power transmission occurs through transformer 30 when the DC/DC converter operates in a state in which the voltage of primary-side storage unit 11 is higher than the balanced state.

In the zigzag-Y connection type, the upper limit of boost ratio between the voltage of primary-side power supply 60 and the voltage of secondary-side power supply 70 can be represented by Expression (9) below.

[Expression 9]

$$\frac{V_{out}}{V_{in}} \leq \frac{4}{3} \cdot \frac{n}{D} \quad (9)$$

In the Y-Δ connection, the upper limit of boost ratio between the voltage of primary-side power supply 60 and the voltage of secondary-side power supply 70 can be represented by Expression (10) below.

[Expression 10]

$$\frac{V_{out}}{V_{in}} \leq \frac{2}{3} \cdot \frac{n}{D} \quad (10)$$

When power transmission is performed between primary-side storage unit 11 and secondary-side storage unit 21, the voltage of primary-side storage unit 11 rises. Therefore, equality holds in the expression above when power transmission is not performed between primary-side storage unit 11 and secondary-side storage unit 21.

Figure 42:
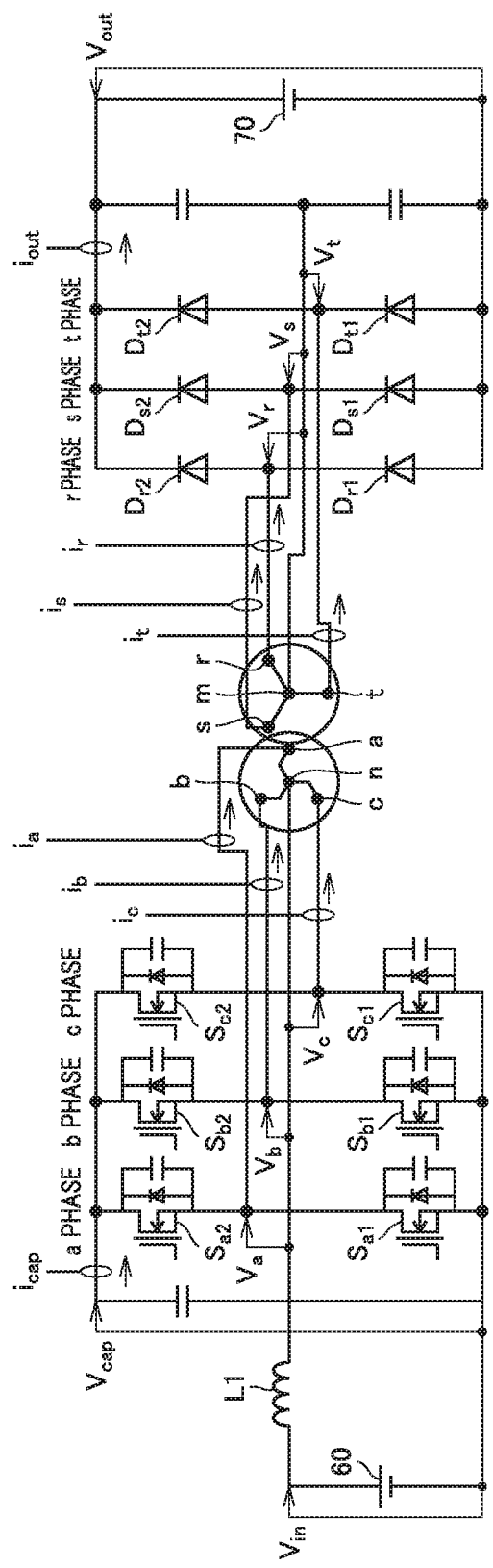
FIG. 42 is a circuit diagram used for explanation of power transmission in the second embodiment.

The operation in the case where power transmission is performed will now be described. FIG. 42 is a circuit diagram used for explanation of power transmission in the second embodiment. FIG. 45 to FIG. 48 show the waveforms under each condition of duty ratio and phase shift.

In FIG. 45 to FIG. 48, current of primary-side power supply 60, which is obvious from the phase currents of transformer 30 according to Kirchhoff's current law, and voltage of neutral connection point n, which is obvious from the phase voltages of transformer 30 according to Kirchhoff's voltage law, are not illustrated.

First bridge circuit 12 performs ZVT operation when switching the upper and lower switches, for example, by using capacitors connected in parallel with the switches.

Of the operation waveforms with no transmission power, the waveform with the on duty ratio of the upper arm of 50% is shown in FIG. 45, the waveform with the duty ratio of 16.7% is shown in FIG. 46, and the waveform with the duty ratio of 83.3% is shown in FIG. 47. In FIG. 45, FIG. 46, and FIG. 47, exciting current of the three-phase transformer is exaggerated. Because of exciting current of the three-phase transformer, current in a direction suitable for performing switching by ZVT flows through first bridge circuit 12, so that switching of the switches by soft switching can be performed.

Figure 48:
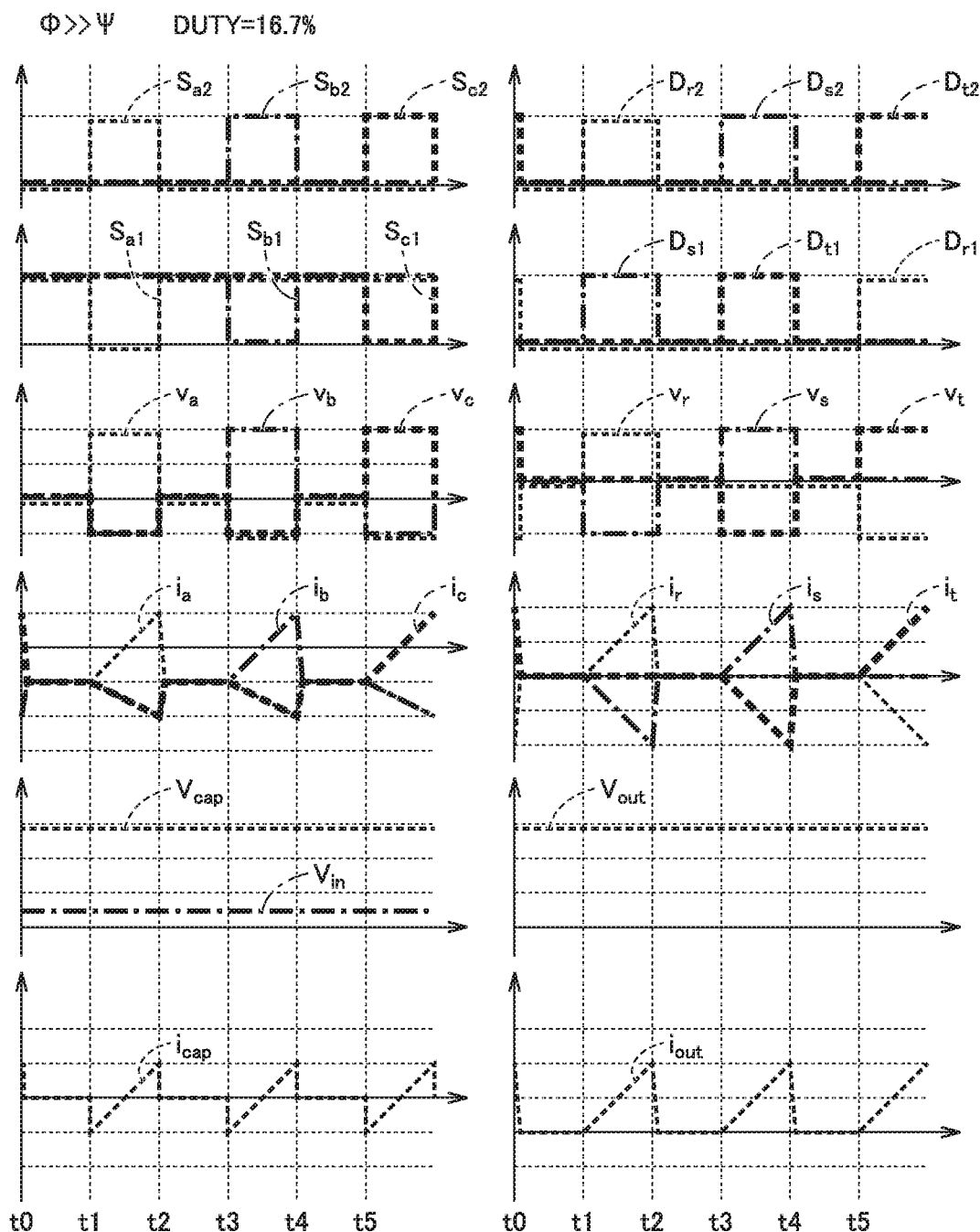
FIG. 48 is an operation waveform diagram when power transmission is performed in the powering direction and a lagging phase shift occurs (Duty=16.7%).
Figure 49:
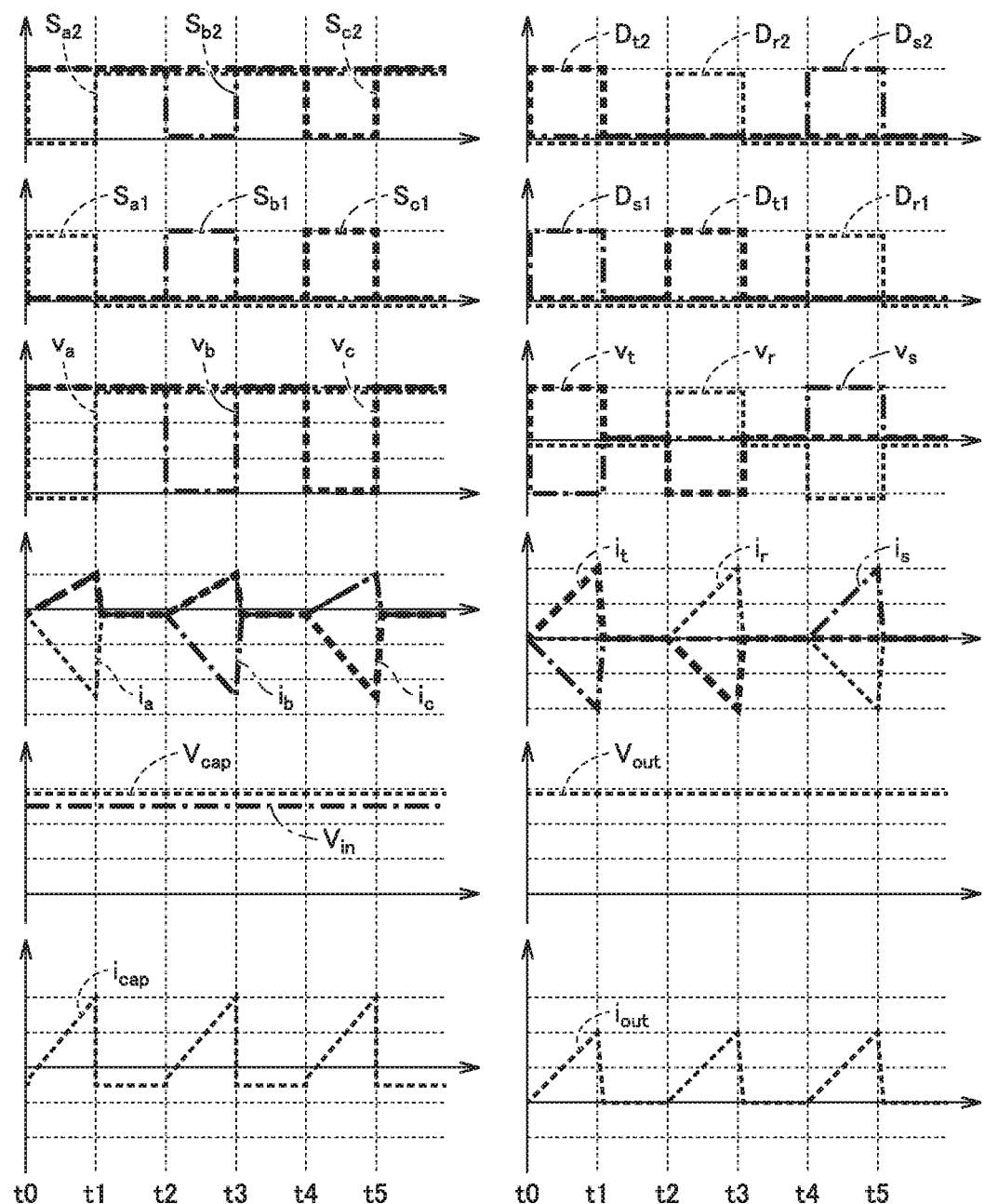
FIG. 49 is an operation waveform diagram when power transmission is performed in the powering direction and a lagging phase shift occurs (Duty=83.3%).

FIG. 43, FIG. 48, and FIG. 49 are operation waveform diagrams when power transmission is performed in the powering direction and a lagging phase shift occurs. The waveform with duty ratio 50% is shown in FIG. 43, the waveform with duty ratio 16.7% is shown in FIG. 48, and the waveform with duty ratio 83.3% is shown in FIG. 49.

FIG. 43, FIG. 48, and FIG. 49 show the states with no exciting current. Considering the effect of exciting current, current suitable for the leg performing switching to perform ZVT increases at the timing when first bridge circuit 12 switches, and it is possible to perform operation by soft switching in the entire range of rated current by defining the range of rated current and setting the amount of exciting current appropriately.

In the present embodiment, even when the duty ratio of first bridge circuit 12 varies, power transmission can be continued. That is, even when voltage of primary-side power supply 60 changes, power transmission to/from secondary-side power supply 70 can be continued by changing the duty ratio.

Second bridge circuit 122 has a switching state corresponding to the vector potential output by first bridge circuit 12. In general, a commutation period exists after the switching state of first bridge circuit 12 is switched, and second bridge circuit 122 outputs a switching pattern corresponding to a commutation path.

When the diodes are conducting and second bridge circuit 122 makes a transition to a commutation period, the voltages of the primary-side phase terminals and the secondary-side phase terminals of transformer 30 become out of phase, so that current flows through transformer 30 in accordance with voltage across both ends.

When the switches in first bridge circuit 12 are switched by ZVT, the phase of voltage applied to both ends of transformer 30 changes, and the commutation path naturally disappears. Then, the state changes to a stable state in which the vector potential of first bridge circuit 12 and the vector potential of second bridge circuit 122 are in the same phase, in the same manner as before the transition to the switching phase.

In the foregoing description of embodiments, an ideal state free from voltage drop in switching elements and diodes in the circuit, wiring resistance, inductance, parasitic capacitance, magnetizing inductance of the transformer, and the like has been described for the sake of clarity of the spirit of the present invention. However, they are present to some extent in the actual circuit. Various types of additional circuits for compensating for these resistance components, capacitance components, and inductance components have been known, and addition of these additional circuits to the configuration of the present invention and modification of the circuit in the equivalent range are made as appropriate.

As described above, according to the second embodiment, the operation is adapted to power supply voltage fluctuation by adjusting the duty ratio of first bridge circuit 12 in accordance with voltage fluctuation of primary-side power supply 60.

In soft switching, exciting current of the transformer also can be used. For example, when the switch of the primary-side lower arm turns on, exciting current changes such that forward current flowing through the switch in the lower arm increases. Therefore, if there is no biased magnetization and the average value of exciting current is kept to zero, exciting current can be used for soft switching. Such soft switching operation using exciting current of the transformer has already been examined in LLC circuits and the like and in practical use in some applications.

By using exciting current of the transformer, current necessary for soft switching of first bridge circuit 12 can be increased, and it is also possible to make a setting such that soft switching operation is performed in the entire range of rated current.

Lastly, referring to the drawings again, the present first and second embodiments will be summarized.

DC/DC converter 100 shown in FIG. 1 at least includes transformer 30 having neutral point NP1 in the primary-side winding, first reactor L1 connected between neutral point NP1 and primary-side power supply 60, a first bus pair configured with first positive line PL1 and first negative line NL1, storage unit 11 connected between first positive line PL1 and first negative line NL1, first bridge circuit 12 connected to first bus pair (PL2, NL2) and the primary-side winding, a second bus pair configured with second positive line PL2 and second negative line NL2, and second bridge circuit 22 connected between the secondary-side winding of transformer 30 and the second bus pair. Secondary-side power supply 70 serving as a load circuit is connected to the second bus pair (PL2, NL2).

In such a configuration, the voltage-time product applied to reactor L1 can be reduced using the winding on the primary side of transformer 30, thereby reducing the core volume and the number of turns of reactor L1 through which current of the primary-side power supply (assuming low voltage and large current) flows.

Preferably, first bridge circuit 12 includes a first leg connected between first positive line PL1 and first negative line NL1. The first leg includes first switching element SW11 and second switching element SW12 connected in series between first positive line PL1 and first negative line NL1. The DC/DC converter further includes controller 50 that controls the switching duty ratio of first switching element SW11 and second switching element SW12. Controller 50 determines the switching duty ratio in accordance with change in voltage Vin of primary-side power supply 60. Preferably, controller 50 determines the switching duty ratio in accordance with the ratio between voltage Vin of primary-side power supply 60 and voltage Vcap of storage unit 11.

Preferably, first bridge circuit 12 includes a first leg, a second leg, and a third leg connected in parallel between first positive line PL1 and first negative line NL1. The first leg includes first switching element SW11 and second switching element SW12 connected in series between first positive line PL1 and first negative line NL1. The second leg includes third switching element SW13 and fourth switching element SW14 connected in series between first positive line PL1 and first negative line NL1. The third leg includes fifth switching element SW15 and sixth switching element SW16 connected in series between first positive line PL1 and first negative line NL1. DC/DC converter 100 further includes controller 50 that controls the switching duty ratio of first to sixth switching elements SW11 to SW16. Controller 50 determines the switching duty ratio in accordance with change in voltage Vin of primary-side power supply 60. Preferably, controller 50 determines the switching duty ratio in accordance with the ratio between voltage Vin of primary-side power supply 60 and voltage Vcap of storage unit 11.

For example, controller 50 determines the switching duty ratio of first to sixth switching elements SW11 to SW16 such that when voltage Vin of primary-side power supply 60 lowers, voltage Vcap of the primary-side bus pair is suppressed from lowering and becomes stable in the vicinity of a target voltage. Conversely, controller 50 determines the switching duty ratio of first to sixth switching elements SW11 to SW16 such that when voltage Vin of primary-side power supply 60 rises, voltage Vcap of the primary-side bus pair is suppressed from rising and becomes stable in the vicinity of a target voltage. With the control as described above, in a dual active bridge circuit in which the ratio between voltage of the primary-side bus pair and voltage of the secondary-side bus pair significantly affects the operation and efficiency, DC/DC conversion operation can be performed while the ratio between voltage of the primary-side bus pair and voltage of the secondary-side bus pair is kept well even when the ratio between voltage of primary-side power supply 60 and voltage of secondary-side power supply 70 changes, thereby achieving resistance to fluctuation in power supply voltage.

Preferably, transformer 30 has a phase difference between primary-side input/output and secondary-side input/output. With the provision of a phase difference, different currents flow through the semiconductor switches of primary-side first bridge circuit 12 and secondary-side second bridge circuit 22 and can be used for soft switching operation.

More preferably, as shown in FIG. 1, FIG. 3, and FIG. 6, the winding of transformer 30 is the zigzag-Y connection type. In the transformer in the zigzag-Y connection type compared with the Y-Δ connection type, with the same boost ratio, the number of turns of the primary-side circuit having large current is smaller and the winding resistance is smaller.

As shown in FIG. 3, transformer 30 includes first core 321, second core 322, and third core 323, first winding 301, second winding 302, and third winding 303 that constitute a primary-side winding, and fourth winding 304, fifth winding 305, and sixth winding 306 that constitute a secondary-side winding. First winding 301 is divided into a first winding portion 301-1 and a second winding portion 301-2, second winding 302 is divided into a third winding portion 302-1 and a fourth winding portion 302-2, and third winding 303 is divided into a fifth winding portion 303-1 and a sixth winding portion 303-2. First winding portion 301-1, sixth winding portion 303-2, and fourth winding 304 are wound on first core 321. Second winding portion 301-2, third winding portion 302-1, and fifth winding 305 are wound on second core 322. Fourth winding portion 302-2, fifth winding portion 303-1, and sixth winding 306 are wound on third core 323.

With such a configuration in FIG. 3, a three-phase transformer having a phase difference in the coupling of the primary side and the secondary side can be configured by arranging the winding type of a single-phase transformer using a toroidal core and the like.

Preferably, as shown in FIG. 2, FIG. 4, and FIG. 7, the winding of transformer 30 is the Y-Δ connection type. With the Y-Δ connection type, compared with the zigzag-Y connection type, the construction of the transformer is simpler and the designing and manufacturing of DC/DC converter 100 is easier.

Preferably, as shown in FIG. 8 and FIG. 9, DC/DC converter 100 further includes second reactors La, Lb, Lc inserted between the primary-side winding of transformer 30 and the output of first bridge circuit 12.

Such a configuration can suppress the effect of variation in leakage inductance of transformer 30 on the circuit operation.

More preferably, controller 50 of DC/DC converter 100 performs switching control of the switching elements in first bridge circuit 12 and second bridge circuit 22 such that ZCS turn-on is performed in second bridge circuit 22.

In this way, ZCS turn-on is performed to achieve soft switching of the switching elements in the secondary-side circuit, thereby reducing switching loss of DC/DC converter 100.

Preferably, controller 50 of DC/DC converter 100 performs switching control of the switching elements in first bridge circuit 12 and second bridge circuit 22 such that the ON/OFF switching of the upper and lower arms of first bridge circuit 12 is performed by zero voltage transition (ZVT) operation, using external capacitors C11 to C16 connected in parallel with switching elements SW12 to SW16 of first bridge circuit 12.

In this way, soft switching of the switching elements in the primary-side circuit is performed by ZVT operation, thereby reducing switching loss of DC/DC converter 100.

Preferably, as shown in FIG. 40 to FIG. 42, second bridge circuit 122 is a diode bridge circuit. DC/DC converter 101 performs unidirectional power transmission from primary-side power supply 60 to secondary-side power supply 70 as a load circuit.

In this configuration, the switching elements in the secondary-side circuit can be reduced, thereby reducing the cost of DC/DC converter 101.

More preferably, controller 50 of DC/DC converter 101 performs switching control of the switching elements in first bridge circuit 12 and second bridge circuit 22 such that the ON/OFF switching of the upper and lower arms of first bridge circuit 12 is performed by zero voltage transition operation, using external capacitors connected in parallel with the switching elements of first bridge circuit 12.

In this way, soft switching of the switching elements in the primary-side circuit is performed by ZVT operation, thereby reducing switching loss of DC/DC converter 101.

In DC/DC converter 101, soft switching operation can be implemented by using exciting current of transformer 30 even when there is no or little power transmission from the primary-side power supply to the secondary-side power supply. In particular, soft switching can be achieved even when the transmission power is small and in the absence of auxiliary operation by the secondary-side circuit.

Figure 52:
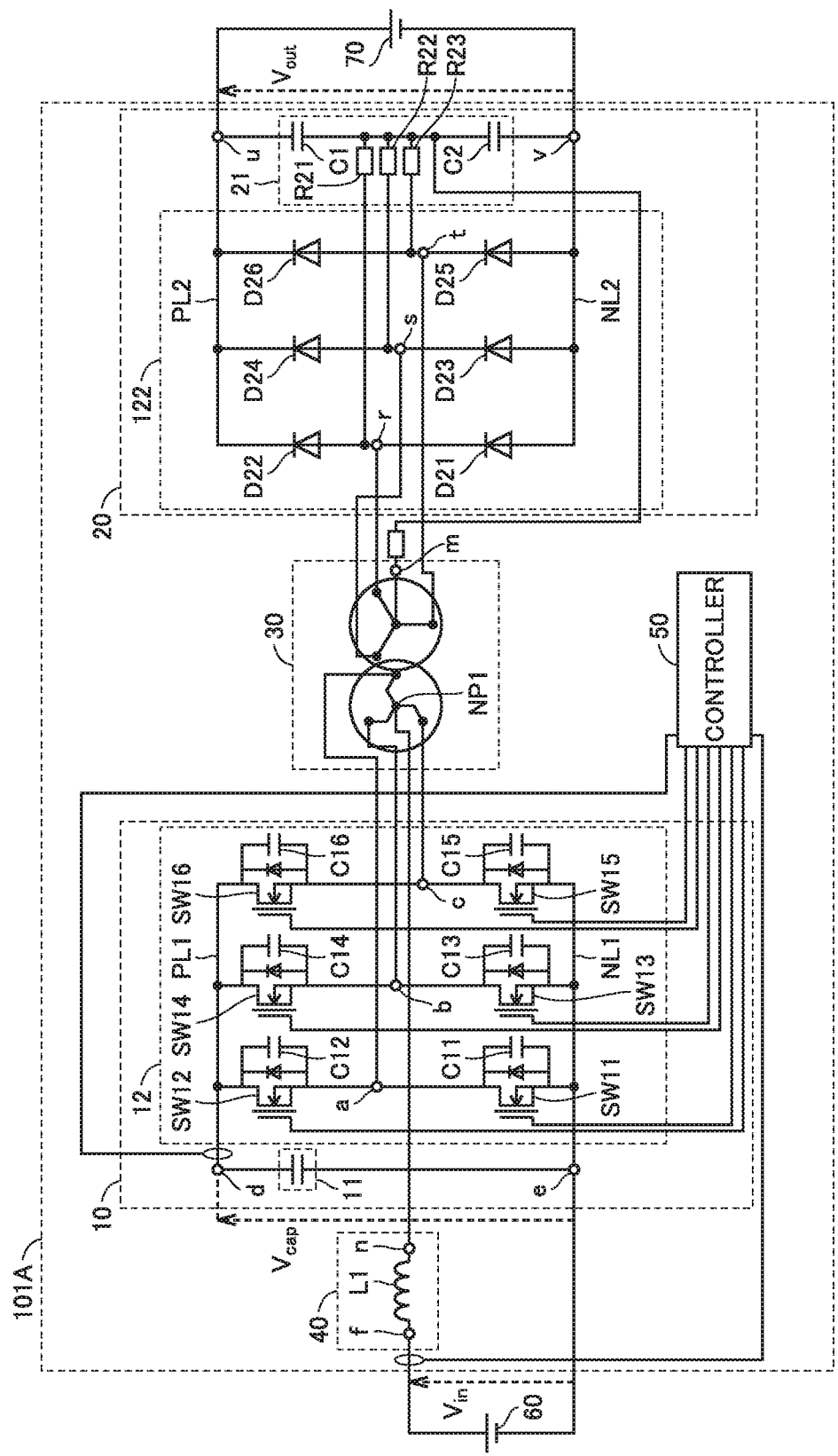
FIG. 52 is a diagram showing the positions of resistors for suppressing voltage oscillation.

In a period of time in which a set of switches or diodes of the upper and lower arms of secondary-side bridge circuit 20 is in the OFF-OFF state, the connection point of the upper and lower arms of secondary-side bridge circuit 20 is connected only with each phase terminal of transformer 30 in the electrical circuit and electrically isolated form other wiring. In this state, at the connection point of the upper and lower arms of secondary-side bridge circuit 20, voltage may easily fluctuate with minute current flowing into the connection point or minute current flowing out of the connection point. This state may cause, for example, a resonance phenomenon due to a parasitic capacitance component of the switches or diodes of the upper and lower arms of secondary-side bridge circuit 20 and a leakage inductance component of transformer 30. Triggered by such a resonance phenomenon, the voltage of the connection point of the upper and lower arms of secondary-side bridge circuit 20 violently oscillates to cause a problem of electromagnetic radiation noise. When this problem is unacceptable in terms of EMC, for example, resistors such as R21, R22, R23 in FIG. 52 are added to DC/DC converter circuit 101 according to the second embodiment to form a DC/DC converter circuit 101A, thereby suppressing oscillation of voltage. When resistors are added, the addition of resistors causes loss. Therefore, the resistance is judged based on the range in which the oscillation phenomenon or other problems are acceptable, and it is preferable to set a resistance as large as possible.

Third Embodiment

In a third embodiment, a control method to expand a soft switching operable region is described.

(Description of Overall Configuration)

The power conversion device according to the third embodiment includes the circuit configuration of DC/DC converter 100 shown in FIG. 1, similar to the first embodiment. Controller 50 is characterized by performing control such that the on state of a set of switches of the upper and lower arms of secondary-side bridge circuit 20 is instantaneously switched between the upper and lower sides, and in doing so, current flowing through the switching target leg is zero or close-to-zero current (10% or less of the maximum current flowing through the leg in rated operation).

An overall configuration of the DC/DC converter in the third embodiment will be described. FIG. 1 is a main circuit configuration diagram of a DC/DC converter 100 in the present embodiment.

DC/DC converter 100 includes a primary-side bridge circuit 10, a secondary-side bridge circuit 20, a transformer 30, a reactor unit 40, and a controller 50. DC/DC converter 100 is connected between a direct-current primary-side power supply 60 and a direct-current secondary-side power supply 70.

In DC/DC converter 100 of the present embodiment, one end of reactor L1 is connected to neutral point NP1 of transformer 30 having almost no effective flux linkage for zero-phase current when Clarke transformation is performed on current flowing through transformer 30, and the other end of reactor L1 is connected with primary-side power supply 60. Primary-side bridge circuit 10 and secondary-side bridge circuit 20 are connected to both ends of transformer 30, a storage unit 11 having a capacitor is connected to the buses (PL, NL1) of primary-side bridge circuit 10, and secondary-side power supply 70 is connected to the buses (PL2, NL2) of secondary-side bridge circuit 20. DC/DC converter 100 is characterized in that it can adjust the ratio between voltage of primary-side power supply 60 and bus voltage of secondary-side bridge circuit 20 by adjusting the ratio in voltage between primary-side power supply 60 and primary-side storage unit 11 by switching of primary-side bridge circuit 10.

One terminal f of reactor unit 40 is connected to the high voltage side of primary-side power supply 60. Low voltage-side terminal e of primary-side bridge circuit 10 is connected to the low voltage side of primary-side power supply 60. The other terminal n of reactor unit 40 is connected to neutral point NP1 of transformer 30.

Primary-side storage unit 11 is connected between low voltage-side terminal e and high voltage-side terminal d of primary-side bridge circuit 10. Primary-side storage unit 11 includes an energy storing element such as capacitor or battery and has the function as a voltage source.

High voltage-side terminal u of secondary-side bridge circuit 20 is connected to the high voltage side of secondary-side power supply 70. Low voltage-side terminal v of secondary-side bridge circuit 20 is connected to the low voltage side of secondary-side power supply 70.

Secondary-side storage unit 21 is connected to high voltage-side terminal u of secondary-side bridge circuit 20 and low voltage-side terminal v of secondary-side bridge circuit 20.

Secondary-side storage unit 21 includes an energy storing element such as capacitor or battery and has the function as a voltage source. Secondary-side storage unit 21 is connected to the secondary-side neutral point terminal of transformer 30 at connection point m.

Transformer 30 is a three-phase transformer, and primary-side bridge circuit 10 has a three-phase first bridge circuit 12. First bridge circuit 12 has six switching elements SW11, SW12, SW13, SW14, SW15, and SW16 and capacitors C11, C12, C13, C14, C15, and C16 connected in parallel with these switching elements. However, external capacitors C11, C12, C13, C14, C15, and C16 may be replaced by parasitic capacitances of the switching elements at equivalent positions in the circuit configuration.

In FIG. 1, the switching elements are depicted by the symbol of MOSFET (Metal-Oxide-Semiconductor Field-Effect Transistor) or IGBT (Insulated Gate Bipolar Transistor). However, the switching elements as depicted in the circuit diagram are not necessarily used. A variety of switching elements can be applied as desired, and not only silicon-based elements but also SiC-MOSFETs and GaN-HEMTs (High Electron Mobility Transistor) based on wideband gap semiconductor such as SiC and GaN may be used as switching elements.

At connection point a, the high voltage side of switching element SW11 and the low voltage side of switching element SW12 are connected. At connection point b, the high voltage side of switching element SW13 and the low voltage side of switching element SW14 are connected. At connection point c, the high voltage side of switching element SW15 and the low voltage side of switching element SW16 are connected.

Hereinafter, a set of two switches connected in series may be called a leg, each of the switches may be called an arm, specifically, the high voltage-side switch may be called an upper arm and the low voltage-side switch may be called a lower arm with respect to the connection point.

First bridge circuit 12 is connected to the primary-side phase terminals of transformer 30 at connection point a, connection point b, and connection point c.

Secondary-side bridge circuit 20 has a three-phase second bridge circuit 22. Second bridge circuit 22 has six switching elements SW21, SW22, SW23, SW24, SW25, and SW26.

At connection point r, the high voltage side of switching element SW21 and the low voltage side of switching element SW22 are connected. At connection point s, the high voltage side of switching element SW23 and the low voltage side of switching element SW24 are connected. At connection point t, the high voltage side of switching element SW25 and the low voltage side of switching element SW26 are connected.

Second bridge circuit 22 is connected to the secondary-side phase terminals of transformer 30 at connection point r, connection point s, and connection point t.

The configuration method of transformer 30 will now be described. FIG. 1 shows a case where transformer 30 is configured in the zigzag-Y connection type. Transformer 30 is configured such that zero-phase current when Clarke transformation ($\alpha\beta 0$ transformation) is performed on the phase currents on the primary side does not induce magnetic flux inside the core of the transformer, and has a phase difference between the primary side and the secondary side.

FIG. 2 is a main circuit configuration diagram of a first modification of DC/DC converter 100 in the first embodiment. FIG. 1 shows a case where transformer 30 is configured in the zigzag-Y connection type, whereas FIG. 2 shows a circuit diagram in a case where transformer 30 is configured in the Y-$\Delta$ connection type. The other part of the configuration in the modification in FIG. 2 is similar to the DC/DC converter in FIG. 1 and a description is not repeated.

The configuration of transformer 30 is susceptible to other modifications in addition to the configuration shown in FIG. 2. The configuration of a combination of a plurality of cores (toroidal cores) as shown in FIG. 3 or FIG. 4, the configuration using a core with a symmetric magnetic circuit as shown in FIG. 5, or the configuration implemented with a three-pillar-shaped core such as a three-phase transformer with commercial frequency as illustrated in FIG. 6 or FIG. 7 may be employed. Connection points a, b, c, n, r, s, t in FIG. 4 to FIG. 7 respectively correspond to connection points a, b, c, n, r, s, t in FIG. 1 or FIG. 2.

When cores are magnetically coupled to each other, a symmetric configuration of a magnetic circuit as shown in FIG. 5 is desirable. Alternatively, as shown in FIG. 6 or FIG. 7, a three-pillar-shaped core such as a three-phase transformer with commercial frequency may be used to cancel magnetic flux produced by zero-phase current.

Specifically, as shown in FIG. 4, when the Y-$\Delta$ connection type using a plurality of cores is employed, zero-phase current flowing through the primary-side winding produces a magnetic field. However, the magnetic field produced by zero-phase current flowing through the primary-side winding usually induces circulating current in the secondary-side winding, and the magnetic field produced by circulating current flowing in the Δ connection of the secondary-side winding and the magnetic field produced by zero-phase current flowing through the primary-side winding are balanced, so that flux linkage produced by zero-phase current flowing through the primary-side winding is canceled.

As shown in FIG. 3 or FIG. 6, when a transformer is configured in the zigzag-Y connection type in which primary-side winding is divided into plural parts, currents flowing through the primary-side winding can cancel magnetic flux and therefore zero-phase current does not induce current in the secondary-side winding, advantageously reducing copper loss. In the secondary-side winding, a neutral point is created, which is electrically connected to the neutral point of the secondary-side bus voltage, thereby suppressing common mode potential oscillation of the secondary-side winding.

As shown in FIG. 4 or FIG. 7, when a transformer is configured in the Y-Δ connection type, a two-winding transformer having a simple structure or an open-end connection three-phase transformer can be used. This configuration is advantageous in that design and manufacturing are easy. However, since circulating current flowing inside the Δ connection occurs in proportion to zero-phase current in the primary-side winding, copper loss increases and, in addition, there are disadvantages such as the possibility of causing biased magnetization due to voltage drop of winding resistance. When cores are magnetically coupled to configure a single core, induction of secondary-side winding current by zero-phase current in the primary-side winding does not always occur even in the Y-Δ construction.

In order to suppress magnetic flux induced by zero-phase current of the primary-side terminal, a matching magnetic field may be induced on the magnetic path of a magnetic field produced in the core, or magnetic resistance may be equivalently increased by an open magnetic path to prevent magnetic flux. Both of these methods are examples of the method of preventing a magnetic field produced in the core by zero-phase current of the primary-side terminal from inducing magnetic flux, and any other configurations that achieve a similar function may be employed.

The method of cancelling magnetic flux produced by zero-phase current and the method of shifting a phase between the primary-side winding and the secondary-side winding have been long discussed commonly in the field of three-phase transformers with commercial frequency. According to the present embodiment, a circuit configuration including transformer 30, reactor unit 40, first bridge circuit 12, and second bridge circuit 22 as main components makes the most of the degree of freedom of current path of transformer 30.

FIG. 8 is a main circuit configuration diagram of a second modification of DC/DC converter 100. In the configuration shown in FIG. 8, reactors La, Lb, Lc supplementing a leakage inductance component of transformer 30 are respectively inserted between transformer 30 and connection points a, b, c in the primary-side circuit portion. Although not shown, reactors supplementing a leakage inductance component of transformer 30 may inserted between transformer 30 and connection points r, s, t in the secondary-side circuit portion. Alternatively, three phase windings connected to neutral point NP1 of three-phase transformer 30 may be disconnected and three individual terminals newly formed may be connected to terminals n1, n2, n3 of reactors modified separately as shown in FIG. 9. In such examples, equivalent modifications may be made to transformer 30 and peripheral auxiliary elements in the electric circuit, magnetic circuit, or a combination of electric/magnetic circuits.

When magnetic flux produced by zero-phase current is canceled, the potential of terminal n connected to neutral point NP1 of transformer 30 is the average of potentials applied to connection point a, connection point b, and connection point c connected to the primary-side phase terminals of transformer 30, because of limitation in energy.

In practice, voltage caused by the leakage inductance component is present between the terminals of transformer 30, and the magnetic flux is not always canceled completely due to error in winding. Therefore, the potential of terminal n does not always agree with the average of potentials of connection point a, connection point b, and connection point c. In the following description, it is assumed that the potential of terminal n agrees with the average of potentials applied to connection point a, connection point b, and connection point c, for the sake of simplicity, although the present invention is not limited thereto.

(Description of Operation)

The operation of the DC/DC converter will now be described. The following description is premised on an ideal state with no variation in leakage inductance.

In an ideal state with no biased magnetization of the transformer, with no variation in leakage inductance, with no individual differences among switching elements, and with no variation in wiring impedance, the switching element of each phase of first bridge circuit 12 operates with the same duty ratio.

FIG. 10 is a waveform diagram showing an example of terminal-to-terminal voltage waveform of transformer 30 in FIG. 1. In FIG. 10, voltages Vae, Vbe, Vce, Vne are potential differences of connection points a, b, c and terminal n, respectively, with reference to terminal e. Voltages Van, Vbn, Vcn are potential differences of connection points a, b, c, respectively, with reference to terminal n. Voltage Vcap is a potential difference of terminal d with respect to terminal e.

The timings when the phase legs of first bridge circuit 12 switch the switches are shifted by ⅓ of the switching period T, and voltages Vae, Vbe, Vce applied to connection point a, connection point b, connection point c have waveforms with phases shifted by 120°.

The operation of first bridge circuit 12 as described above is called multi-phase operation or carrier phase shift operation in a multi-parallel driven chopper circuit and commonly known.

In FIG. 10, the waveforms of the phases are phase-shifted by ⅓ of the switching period with reference to the rise time of voltages Vae, Vbe, Vce of the connection points of the phases. This is an example of phase shift methods, and the voltage fall time may be used as a reference, or the center of the upper arm ON time or the center of the lower arm ON time may be used as a reference.

In a common PWM (Pulse Width Modulation) method using triangular wave carrier, the phase of triangular wave carrier for generating a switching pattern is phase-shifted by 1200 to implement a similar multiphase operation.

However, when leakage inductance or the number of turns of the transformer varies, a distortion that makes three phases asymmetric occurs in current that transmits electric power on the primary side and the secondary side, in a coordinate space when the phase voltages and the phase currents of transformer 30 undergo αβ0 transformation. In order to correct such a distortion of current, it is necessary to adjust voltage output from first bridge circuit 12 or second bridge circuit 22 or both. In this case, it is not always necessary to phase-shift the primary-side carrier by 120° but it may be preferable to adjust the phase shift amount for correction.

As shown in FIG. 10, when first bridge circuit 12 outputs a voltage phase-shifted by 120° to each connection point of transformer 30, the average value of voltages applied to connection point a, connection point b, and connection point c is output to neutral point NP1 of transformer 30, and rectangular wave voltage Vne with amplitude ⅓ and three times frequency is output to terminal n of reactor L1.

Since primary-side power supply 60 is connected to one terminal f of reactor unit 40 and neutral point NP1 of transformer 30 is connected to the other terminal n, the difference between power supply voltage Vin of primary-side power supply 60 and the average value of output voltage of first bridge circuit 12 is applied to reactor L1.

The duty ratio of each phase of first bridge circuit 12 is increased/reduced and adjusted by the same amount for all of three phases, whereby voltage applied to reactor L1 can be controlled irrespective of unbalanced voltage between phases responsible for biased magnetization of transformer 30.

In other words, current flowing through reactor L1 can be controlled by adjusting the average value of the phase duty ratios of first bridge circuit 12. That is, primary-side zero-phase current of transformer 30 connected to first bridge circuit 12 is determined by the average value of output duty ratios of the phases of first bridge circuit 12.

Ideally, zero-phase current can be controlled without causing biased magnetization only by controlling the average value of output duty ratios in first bridge circuit 12. However, when biased magnetization occurs in transformer 30 in practice for some reason, the biased magnetization phenomenon can be suppressed by changing the balance of duty ratios of the phases.

First bridge circuit 12 performs multiphase operation (carrier phase shift operation). Therefore, when the phase currents of transformer 30 flow to primary-side storage unit 11, a period of time in which current of only one of the a phase, the b phase, and the c phase flows exists at the time out of phase by 120° during one period of switching, or a period of time in which current of only one of the a phase, the b phase, and the c phase does not flow exists at the time out of phase by 120° during one period of switching.

Therefore, when current flowing through primary-side storage unit 11 is detected in controller 50, it is detected while the phase during one period of switching is shifted by 120°, whereby variation in phase currents of transformer 30 can be detected. That is, primary-side storage unit 11 is provided with a current detecting sensor to detect biased magnetization current of transformer 30.

As a matter of course, in addition to detection of all phase currents of the three-phase transformer, with detection points equal to or more than the number of degrees of freedom of current derived from Kirchhoff's current law, it is possible to detect biased magnetization current regardless of detection points and detection methods.

In general, since the magnetizing inductance of a transformer is extremely large, the response speed necessary for suppressing biased magnetization is sufficiently slower than the response speed of current control of reactor L1. Furthermore, when αβ0 transformation is performed on voltage from terminal f connected to the high voltage side of primary-side power supply 60 to connection point a, connection point b, connection point c on the primary side of transformer 30, a component contributing to biased magnetization current and a component contributing to zero-phase current can be separated and considered independently. FIG. 11 is a control block diagram in a case where the detected biased magnetization current and zero-phase current are independently input. This control block includes a sensor 54 detecting biased magnetization current, a sensor 55 detecting input current, subtractors 51 to 53 calculating difference current from command values iα*, iβ*, i0*, PI controllers 56 to 58 executing PI (proportional integral) control, an αβ0/abc transformer 59, a PWM controller 61, an abc/αβ0 transformer 62, and voltage-current converters 66 to 68.

It is the average of the phase duty ratios that affects zero-phase current, and it is a deviation of the phase duty ratios that affects biased magnetization current Here, in current control for reactor L1, PI controller 58 performs PI control such that current of reactor L1 follows command value i0*, where current flowing through reactor L1 or zero-phase current of transformer 30 is a detected value and the average duty ratio of first bridge circuit 12 is the amount of operation. By contrast, in control of suppressing biased magnetization current, PI controllers 56, 57 perform PI control such that biased magnetization current becomes zero, where the biased magnetization current of transformer 30 is a detected value and a deviation from the average value of the phase duty ratios is the amount of operation. Accordingly, the current control for reactor L1 and the control of suppressing biased magnetization current can be considered independently.

In an ideal state free from biased magnetization, current passing through reactor L1 is divided into three and flows through the primary-side winding of transformer 30 as zero-phase current.

The zero-phase current flowing through the primary-side winding does not transmit electric power to second bridge circuit 22, and when only the zero-phase current is extracted based on the principle of superposition, primary-side bridge circuit 10 behaves as if it is a three-parallel bidirectional chopper circuit. This three-parallel bidirectional chopper circuit functions as a transformer by partially coupling the reactors of bidirectional chopper circuits connected in parallel and cancelling magnetic flux, in which the volume of the magnetic element as a whole is reduced compared with no coupling.

The power transmission amount between primary-side power supply 60 and primary-side storage unit 11 can be controlled by controlling current of reactor L1 with the duty ratio of first bridge circuit 12.

(Description of Operation)

The power conversion device according to the third embodiment expands a soft switching operable region by instantaneously switching the on state of a set of switches of the upper and lower arms in secondary-side bridge circuit 20 between the upper and lower sides, and in doing so, controlling such that current flowing through the switching target leg is zero or close-to-zero current.

The power conversion device according to the first embodiment is characterized by having an operation mode in which controller 50 allows the switches in primary-side bridge circuit 10 and secondary-side bridge circuit 20 to operate in different orders in accordance with the voltage ratio between primary-side power supply 60 and storage unit 110 such as an intermediate capacitor, and in that all the operation modes have a period of time in the OFF-OFF state in which a set of switches of the upper and lower arms in secondary-side bridge circuit 20 simultaneously turns OFF.

When the on state of a set of switches of the upper and lower arms in secondary-side bridge circuit 20 is switched between the upper and lower sides, the power conversion device according to the first embodiment intentionally creates a period of time in which a set of switches in the upper and lower arms enters the OFF-OFF state between a period of time in which one of a set of switches of the upper and lower arms is in the on state and a period of time in which the other switch of a set of switches of the upper and lower arms is in the on state, and this is used to perform soft switching.

Accordingly, when the on state of a set of switches in the upper and lower arms in secondary-side bridge circuit 20 is switched between the upper and lower sides, a period of time in the OFF-OFF state need to exist during the switching operation of the on state of a set of switches in the upper and lower arms between the upper and lower sides. In the operation according to the first embodiment of DC/DC converter 100, a period of time in which the secondary-side leg is in the OFF-OFF state exists. By contrast, the operation according to the third embodiment of DC/DC converter 100 is characterized by instantaneous switching operation when the on state of a set of switches in the upper and lower arms of secondary-side bridge circuit 20 is switched between the upper and lower sides.

As used herein instantaneous switching operation refers to a state in which there is no OFF-OFF period excluding dead time and the state of the switches is switched instantaneously like the switching operation of a common bidirectional chopper circuit or a full bridge inverter circuit. Furthermore, the instantaneous switching operation in the third embodiment is performed at a point of time when current flowing from each phase terminal of transformer 30 connected to the connection point of the upper and lower arms to be switched is zero or close to zero. In order to implement this, controller 50 controls the order and timing of switching of the switches in primary-side bridge circuit 10 and secondary-side bridge circuit 20 and the bus voltage of primary-side bridge circuit 10 and secondary-side bridge circuit 20 such that current flowing through each phase terminal of transformer 30 connected to the connection point of the upper and lower arms is zero or close to zero in the instantaneous switching.

The state in which each phase current of three-phase transformer 30 connected to the connection point of the upper and lower arms of secondary-side bridge circuit 20 is zero can be represented as a point on a coordinate plane on a drawing sheet by performing coordinate transformation known as Clarke transformation/Park transformation on a vector of a set of currents flowing through each terminal of transformer 30.

The main part of operation of DC/DC converter circuit 100 can be represented by illustrating the phase currents excluding a zero-phase component from the current flowing through transformer 30, and the main part of operation of the DC/DC converter circuit can be represented by drawing the loci of the phase currents flowing through transformer 30 on a coordinate plane obtained by performing, for example, Clarke transformation/Park transformation as appropriate. The locus of current on the coordinate plane representing each phase current of DC/DC converter circuit 100 is a chart of a line that is broken at the timing when the on/off of the switch of primary-side bridge circuit 10 or secondary-side bridge circuit 20 is switched. The position on the coordinate plane of the point where the line illustrated on the coordinate plane is broken represents each phase current at the point of time of switching and serves as an important factor that determines whether soft switching on the primary side and the secondary side is successful.

Figure 50:
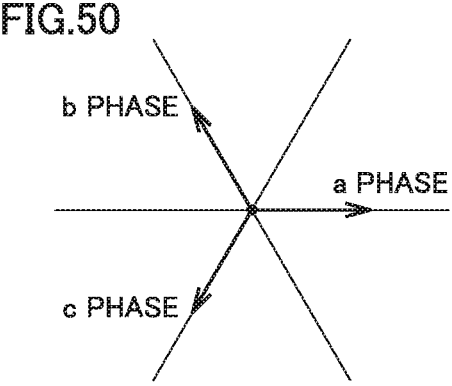
FIG. 50 is a diagram illustrating the loci of phase currents of transformer 30 on a plane with coordinate axes at intervals of 120°.

As shown in FIG. 50, when the locus of each phase current of transformer 30 is illustrated on a plane with coordinate axes at intervals of 120° indicating the directions showing the phase currents of the primary-side terminal of transformer 30, at a point where the locus of the current is present on any one of three coordinate axes, current flowing through the terminal of transformer 30 connected to the upper and lower arm connection point of the corresponding phase is zero among the phase currents flowing through the secondary side. This is derived from the relation between the phase terminals on the primary side and the phase terminals on the secondary side of three-phase transformer 30 having a phase difference.

In the power conversion device according to the third embodiment, controller 50 performs instantaneous switching of the upper and lower arms of secondary-side bridge circuit 20 when a point illustrating each phase current is present on or in the vicinity of the coordinate axes at intervals of 120° indicating the directions of the phase currents of the primary-side terminal of three-phase transformer 30, on the locus illustrating each phase current of three-phase transformer 30 on the coordinate plane.

In the third embodiment, when the secondary-side leg is instantaneously switched, it is necessary to perform operation such that the upper and lower switches on the secondary side are switched at a timing when the locus of transformer current is on the axis, by controlling the timing of switching on the primary side/secondary side and bus voltage. The factors that determine the shape of locus of current mainly include leakage inductance of the transformer, coupling inductance of the transformer, the timing of switching of the primary-side and secondary-side switches, the primary-side bus voltage, and the secondary-side bus voltage. In the third embodiment, switching of the secondary-side leg by zero current is implemented by detecting the bus voltage of primary-side bridge circuit 10, the bus voltage of secondary-side bridge circuit 20, and the phase currents of transformer 30, adjusting the phase currents of transformer 30 by adjusting the timing of switching of the primary-side and secondary-side switches, which is mainly manipulable, and controlling the primary-side bus voltage or/and the secondary-side bus voltage, and controlling the loci of the phase currents of transformer 30 when viewed on the coordinate axes.

In the switching operation according to the first embodiment, when there is a period of time in the OFF-OFF state, current flowing through the leg middle point is zero in principle, because of the absence of current destination, if parasitic capacitance and off resistance are ignored. The presence of a period of time in the OFF-OFF state enables switching of the secondary-side switches by zero current. By contrast, in the third embodiment, it is difficult to strictly null the current flowing through the leg middle point at the switching timing of the secondary-side switches. Switching in a state in which current flows to some extent in the vicinity of zero is quite possible, and an allowable tolerance to some extent should be taken into consideration in practice, for example, switching at 10% or less of the maximum current during rated operation is regarded as soft switching. When flowing current is not zero in a strict sense but the upper/lower switching in the secondary-side leg is performed at a smaller current compared with the maximum current in rated operation, for example, as the result of control, the effect of reducing switching loss of the secondary-side switch can be expected.

The power conversion device according to the first embodiment fails to operate by the switching pattern as explained, mainly when the average of the lower-side on duty ratio in the primary-side bridge circuit is in the vicinity of ⅓ or ⅔. For example, the power conversion device according to the third embodiment detects a case where inequality holds in Expressions (11), (12) below using the ratio between the primary-side bus voltage and the secondary-side bus voltage and enables the operation as DC/DC converter circuit 100 performing operation according to the third embodiment.

[Expression 11]

$$\tfrac{1}{2}d_0 \le D_0 \le 1-d_0 \tag{11}$$

[Expression 12]

$$d_0 \le D_0 \le 1-\tfrac{1}{2}d_0 \tag{12}$$

In the zigzag-Y winding, when the ratio obtained by dividing the number of turns on the primary side by the number of turns on the secondary side is n, $d_0$ is represented by Expression (13) below.

[Expression 13]

$$d_0 = \frac{1}{2n} \cdot \frac{V_{out}}{V_{cap}} \tag{13}$$

In the Y-Δ winding, when the ratio obtained by dividing the number of turns on the primary side by the number of turns on the secondary side is n, $d_0$ is represented by Expression (14) below.

[Expression 14]

$$d_0 = \frac{1}{n} \cdot \frac{V_{out}}{V_{cap}} \tag{14}$$

$D_0$ is represented by Expression (15) below.

[Expression 15]

$$D_0 = \frac{V_{in}}{V_{cap}} \tag{15}$$

Fourth Embodiment

In a fourth embodiment, a resistor for suppressing oscillation in the OFF-OFF period in the secondary-side bridge circuit is added.

The power conversion device according to the fourth embodiment includes, in addition to the configuration of DC/DC converter circuit 100 or DC/DC converter 101 illustrated in the first embodiment or the second embodiment, resistors R21, R22, R23 connecting a neutral point that divides the positive line of secondary-side bridge circuit 20 or the negative line of secondary-side bridge circuit 20 or the bus voltage of secondary-side bridge circuit 20 with the connection point of the upper and lower arms of each phase of secondary-side bridge circuit 20 (FIG. 51, FIG. 52). When a set of switches or diodes of the upper and lower arms of each phase of secondary-side bridge circuit 20 simultaneously enters the OFF state in the upper and lower sides, these resistors have the effect of suppressing oscillation of voltage that may occur at the upper and lower arm connection point, oscillation of current that may flow through the terminal of transformer 30 connected to the upper and lower arm connection point, or voltage oscillation or current oscillation that may occur on each wiring affected by a path through which current flowing through the terminal of transformer 30 connected to the upper and lower arm connection point flows.

In the power conversion device according to the first embodiment or the second embodiment, in a period of time in which a set of switches or diodes of the upper and lower arms of secondary-side bridge circuit 20 is in the OFF-OFF state, the upper and lower arm connection point in the secondary-side bridge circuit 20 is connected only with each phase terminal of transformer 30 in the electrical circuit and is electrically isolated from other wiring. In this state, at the connection point of the upper and lower arms of secondary-side bridge circuit 20, voltage may easily fluctuate with minute current flowing into the connection point or minute current flowing out of the connection point. This state may cause, for example, a resonance phenomenon due to a parasitic capacitance component of the switches or diodes of the upper and lower arms of secondary-side bridge circuit 20 and a leakage inductance component of transformer 30. Triggered by such a resonance phenomenon, the voltage of the connection point of the upper and lower arms of secondary-side bridge circuit 20 violently oscillates to cause a problem of electromagnetic radiation noise. When this problem is unacceptable in terms of EMC, the resistors as described above are added to DC/DC converter circuit 100 according to the first embodiment or DC/DC converter circuit 101 according to the second embodiment to suppress oscillation of voltage. When resistors are added, the addition of resistors causes loss. Therefore, the resistance is judged based on the range in which the oscillation phenomenon or other problems are acceptable, and it is preferable to set a resistance as large as possible.

The embodiments disclosed here should be understood as being illustrative in all respects and should not be construed as being limitative. Embodiments disclosed here should be understood as being illustrative rather than being limitative in all respects. The scope of the present invention is shown not in the foregoing description but in the claims, and it is intended that all modifications that come within the meaning and range of equivalence to the claims are embraced here.

REFERENCE SIGNS LIST

10 primary-side bridge circuit, 11, 21 storage unit, 12 first bridge circuit, 20 secondary-side bridge circuit, 22, 122 second bridge circuit, 30 transformer, 40 reactor unit, 50 controller, 51, 53 subtractor, 54, 55 sensor, 56 to 58 PI controller, 61 PWM controller, 59, 62 dq0-abc transformer, 60, 70 power supply, 66 to 68 voltage-current converter, 100, 101 converter, 301 first winding, 301-1 first winding portion, 301-2 second winding portion, 302 second winding, 302-1 third winding portion, 302-2 fourth winding portion, 303 third winding, 303-1 fifth winding portion, 303-2 sixth winding portion, 304 fourth winding, 305 fifth winding, 306 sixth winding, 321 first core, 322 second core, 323 third core, C1, C2, C1 to C16 capacitor, D21 to D26 diode, L1, La, Lb, Lc reactor, NL1 first negative line, NL2 second negative line, NP1 neutral point, PL1 first positive line, PL2 second positive line, SW11 to SW16, SW21 to SW26 switching element.

The invention claimed is:

1. A DC/DC converter comprising:
   a transformer having a neutral point at least in a primary-side winding;
   a first reactor connected between the neutral point and a high voltage side of a primary-side power supply;
   a first bus pair configured with a first positive line and a first negative line;
   a storage unit connected between the first positive line and the first negative line;
   a first bridge circuit connected between the first bus pair and the primary-side winding;
   a second bus pair configured with a second positive line and a second negative line; and
   a second bridge circuit connected between a secondary-side winding of the transformer and the second bus pair, wherein a load circuit is connected to the second bus pair, wherein
   the first bridge circuit includes a first leg, a second leg, and a third leg connected in parallel between the first positive line and the first negative line,
   the first leg includes a first switching element and a second switching element connected in series between the first positive line and the first negative line,
   the second leg includes a third switching element and a fourth switching element connected in series between the first positive line and the first negative line,
   the third leg includes a fifth switching element and a sixth switching element connected in series between the first positive line and the first negative line,
   the DC/DC converter further comprises a controller to control a switching duty ratio of the first to sixth switching elements, and
   the controller determines the switching duty ratio in accordance with change in voltage of the primary-side power supply.

2. The DC/DC converter according to claim 1, wherein a winding type of the transformer is a zigzag-Y connection type.

3. The DC/DC converter according to claim 2, wherein the transformer includes
   a first core, a second core, and a third core,
   a first winding, a second winding, and a third winding that constitute the primary-side winding, and
   a fourth winding, a fifth winding, and a sixth winding that constitute the secondary-side winding,
   the first winding is divided into a first winding portion and a second winding portion,
   the second winding is divided into a third winding portion and a fourth winding portion,
   the third winding is divided into a fifth winding portion and a sixth winding portion,
   the first winding portion, the sixth winding portion, and the fourth winding are wound on the first core,
   the second winding portion, the third winding portion, and the fifth winding are wound on the second core, and
   the fourth winding portion, the fifth winding portion, and the sixth winding are wound on the third core.

4. The DC/DC converter according to claim 1, further comprising a second reactor inserted between the primary-side winding of the transformer and an output of the first bridge circuit.

5. The DC/DC converter according to claim 1, wherein the DC/DC converter performs switching control of switching elements in the first bridge circuit and the second bridge circuit such that ZCS turn-on is performed in the second bridge circuit.

6. The DC/DC converter according to claim 1, wherein the DC/DC converter performs switching control of switching elements in the first bridge circuit and the second bridge circuit such that ON/OFF switching of upper and lower arms of the first bridge circuit is performed by zero voltage transition operation, using an external capacitor.

7. The DC/DC converter according to claim 6, wherein the DC/DC converter further comprises the external capacitor connected in parallel with a switching element in the first bridge circuit.

8. The DC/DC converter according to claim 1, wherein the second bridge circuit is a diode bridge circuit, and the DC/DC converter performs unidirectional power transmission from the primary-side power supply to the load circuit.

9. The DC/DC converter according to claim 1, wherein the DC/DC converter performs switching control of switching elements in the first bridge circuit and the second bridge circuit such that ON/OFF switching of upper and lower arms of the first bridge circuit is performed by zero voltage transition operation, using an external capacitor.

10. The DC/DC converter according to claim 9, wherein the DC/DC converter further comprises the external capacitor connected in parallel with a switching element in the first bridge circuit.

11. The DC/DC converter according to claim 1, wherein the DC/DC converter provides a dead time in switching of upper and lower arms in the second bridge circuit and performs upper and lower arm switching operation in a state in which current flowing through upper and lower arms in the second bridge circuit is zero or almost zero.

12. A DC/DC converter comprising:
    a transformer having a neutral point at least in a primary-side winding;
    a first reactor connected between the neutral point and a high voltage side of a primary-side power supply;
    a first bus pair configured with a first positive line and a first negative line;
    a storage unit connected between the first positive line and the first negative line;
    a first bridge circuit connected between the first bus pair and the primary-side winding;
    a second bus pair configured with a second positive line and a second negative line; and
    a second bridge circuit connected between a secondary-side winding of the transformer and the second bus pair, a load circuit is connected to the second bus pair, wherein the transformer has a phase difference between primary-side input/output and secondary-side input/output, and a winding type of the transformer is a zigzag-Y connection type,
    wherein the DC/DC converter comprises a resistor directly connecting an upper and lower arm connection point in the second bridge circuit with a neutral point generated by a positive line or a negative line of the second bridge circuit or a voltage-dividing capacitor and suppresses oscillation of voltage that occurs at the upper and lower arm connection point in the second bridge circuit.

* * * * *